March 11, 1930. J. H. BLAIR 1,749,968
EXCAVATING AND LOADING MACHINE
Filed April 26, 1926 45 Sheets-Sheet 1
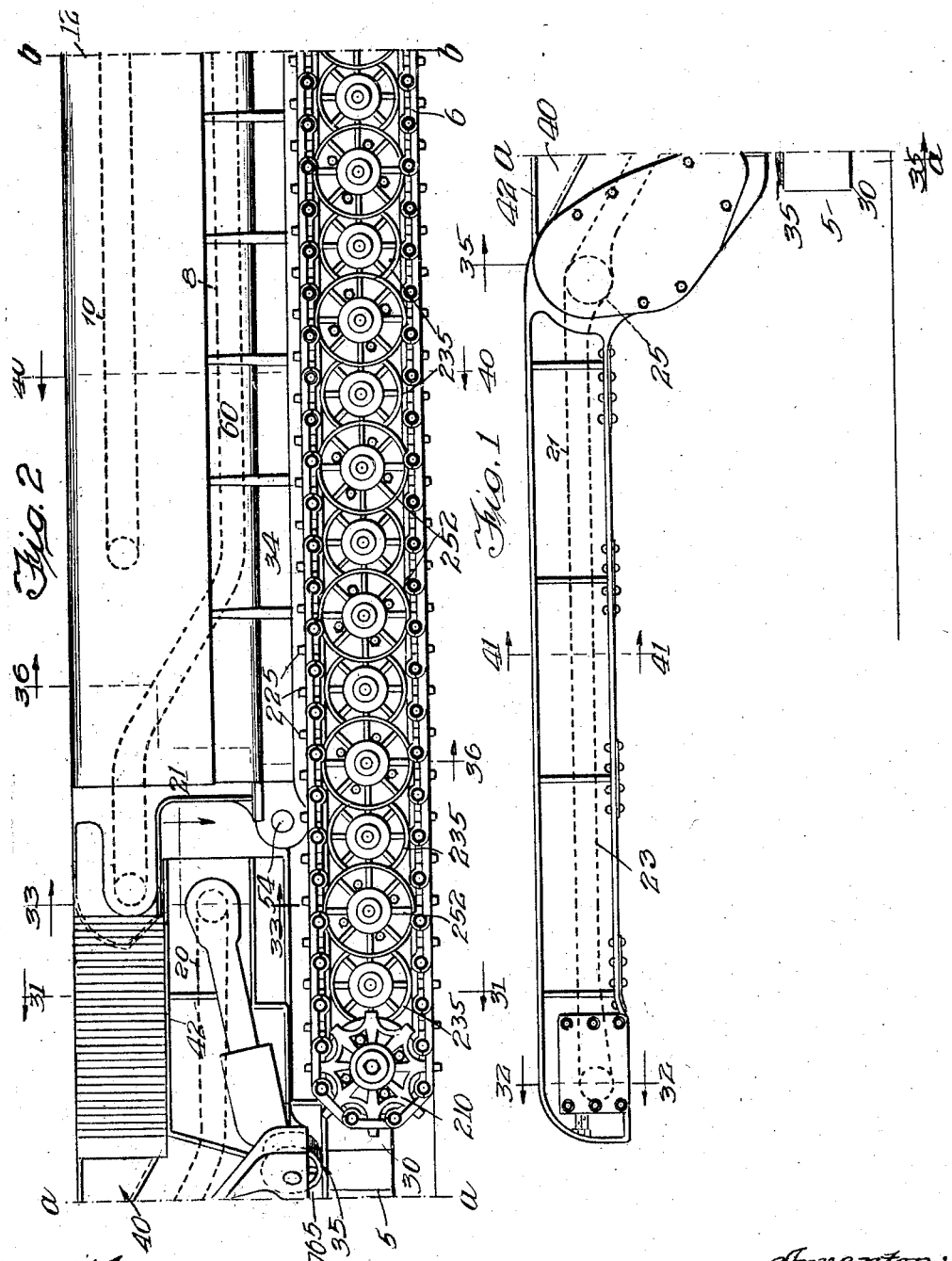

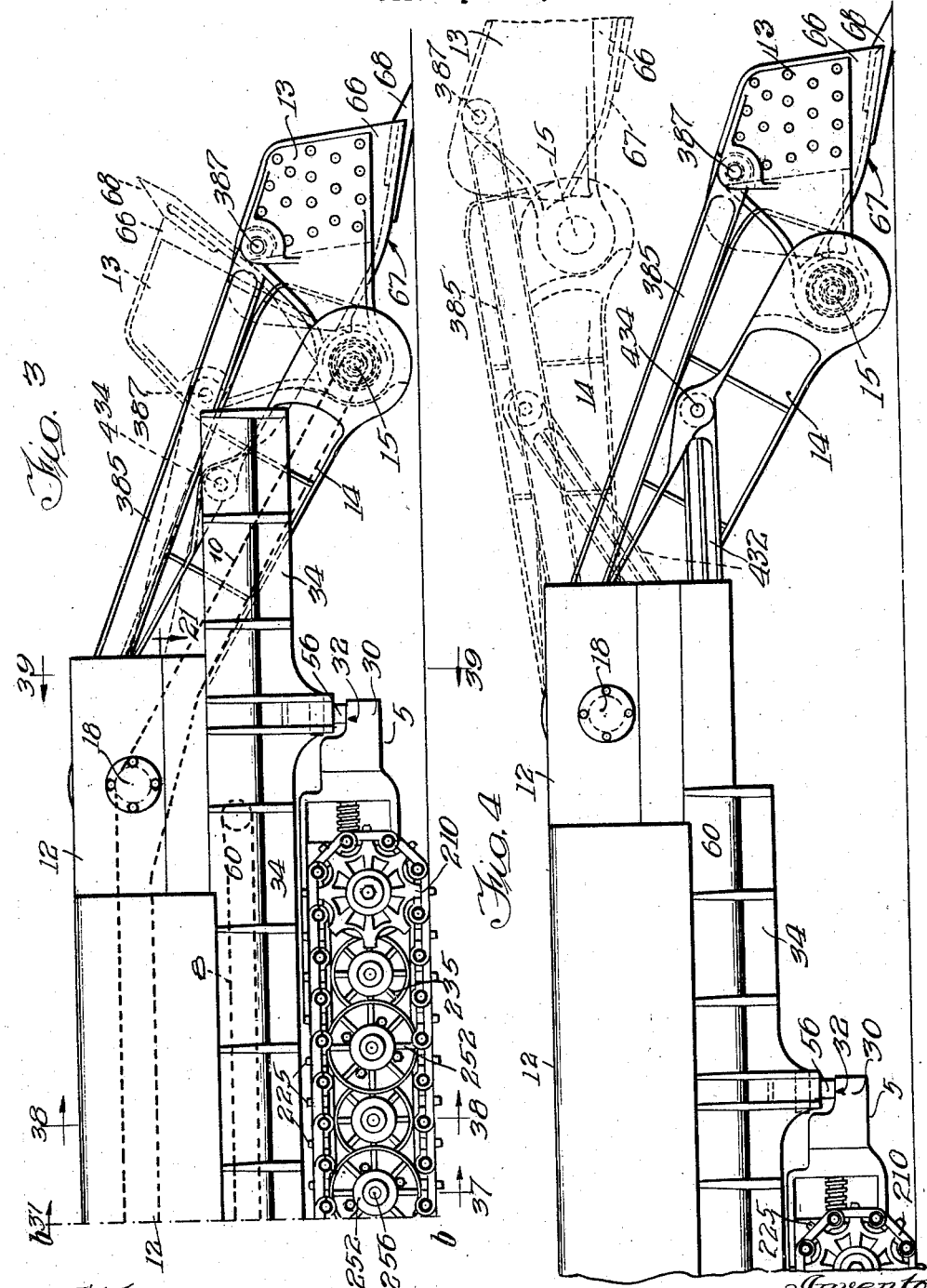

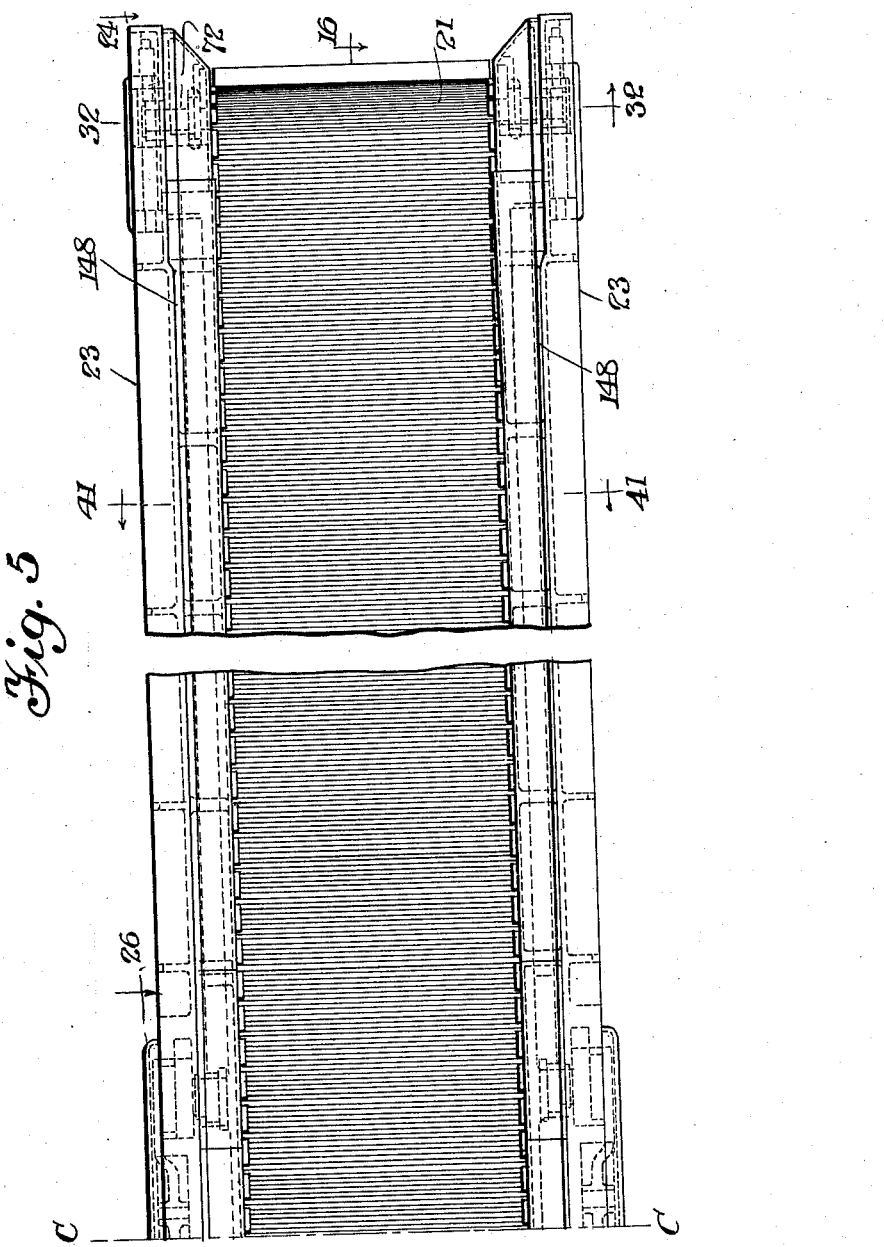

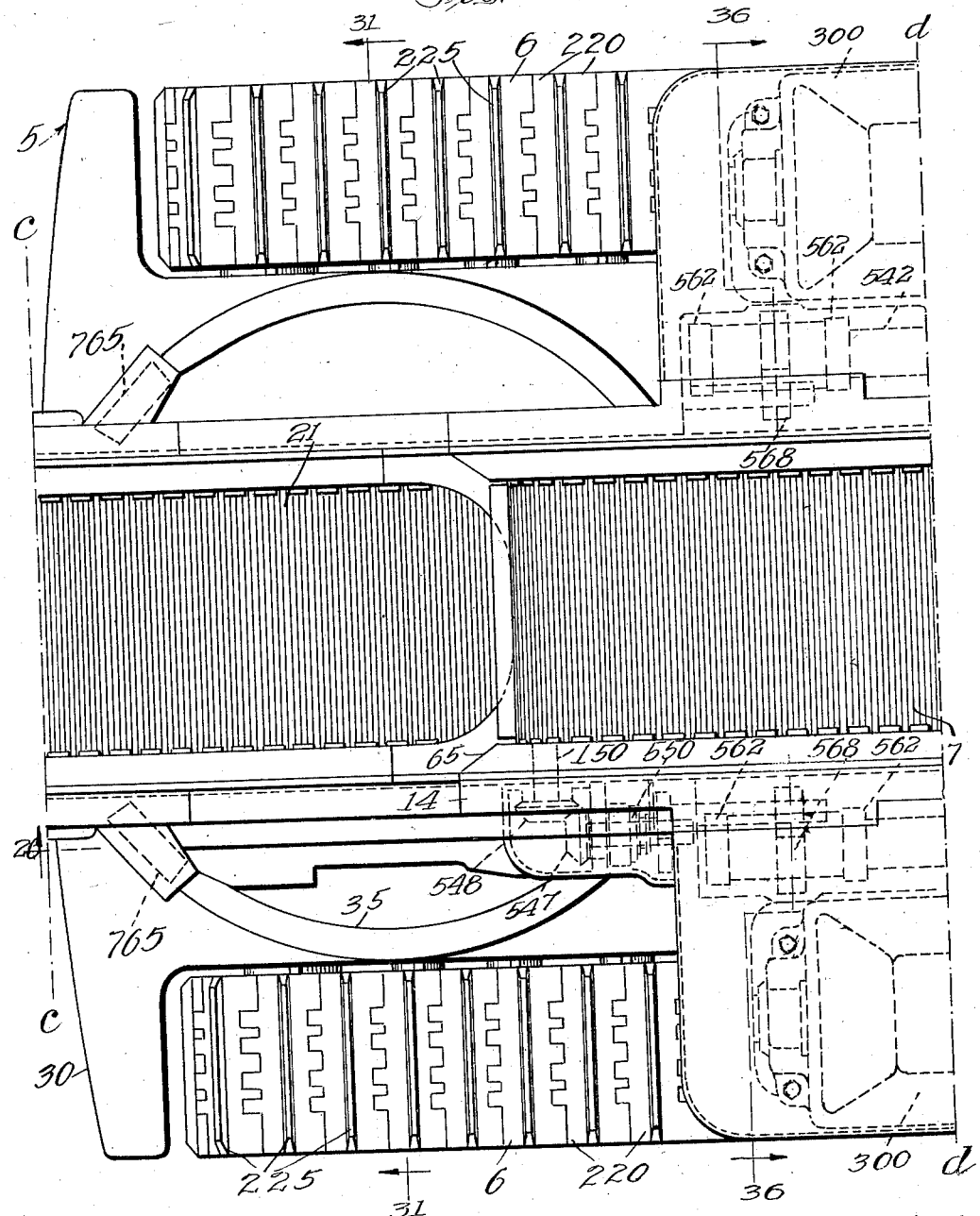

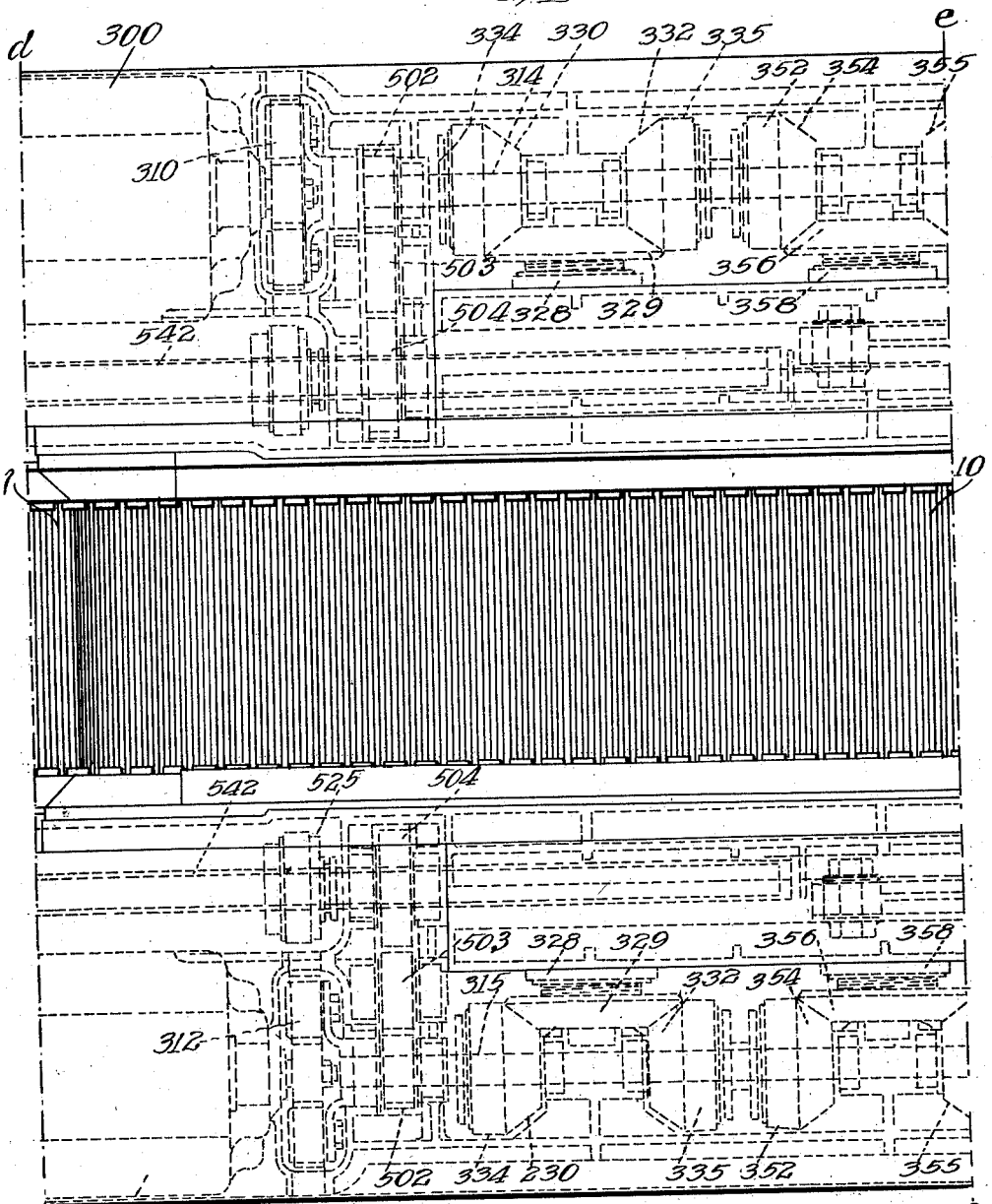

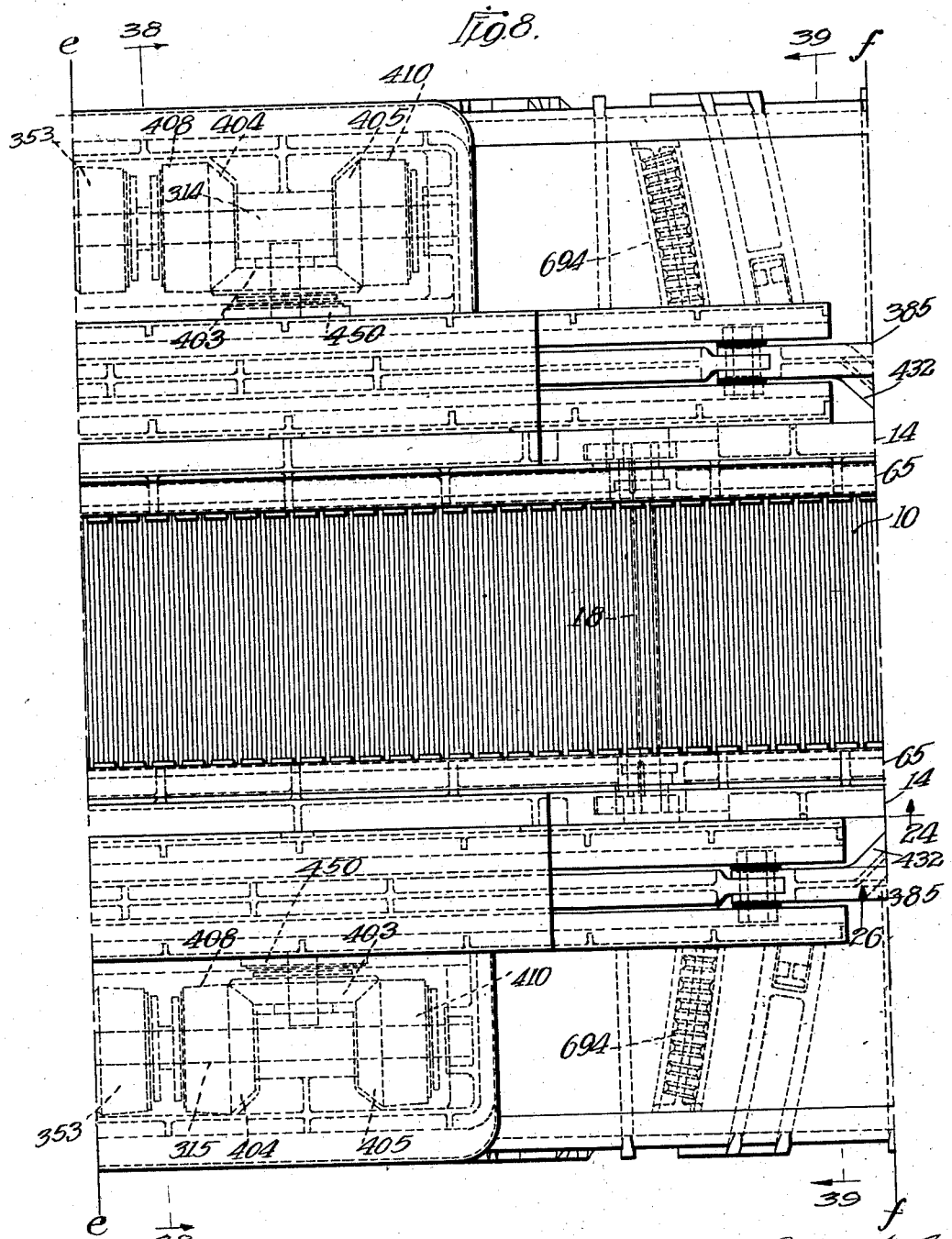

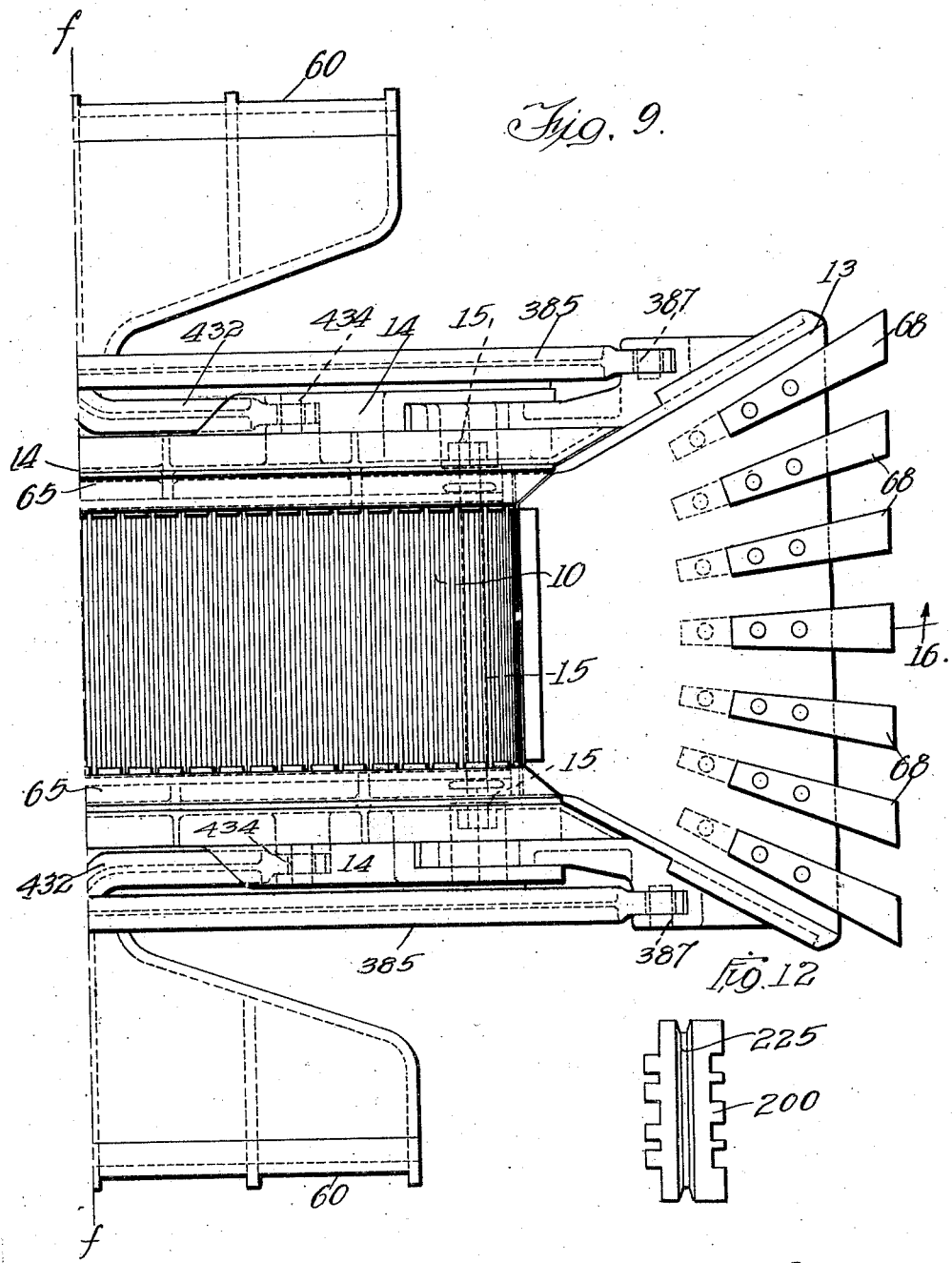

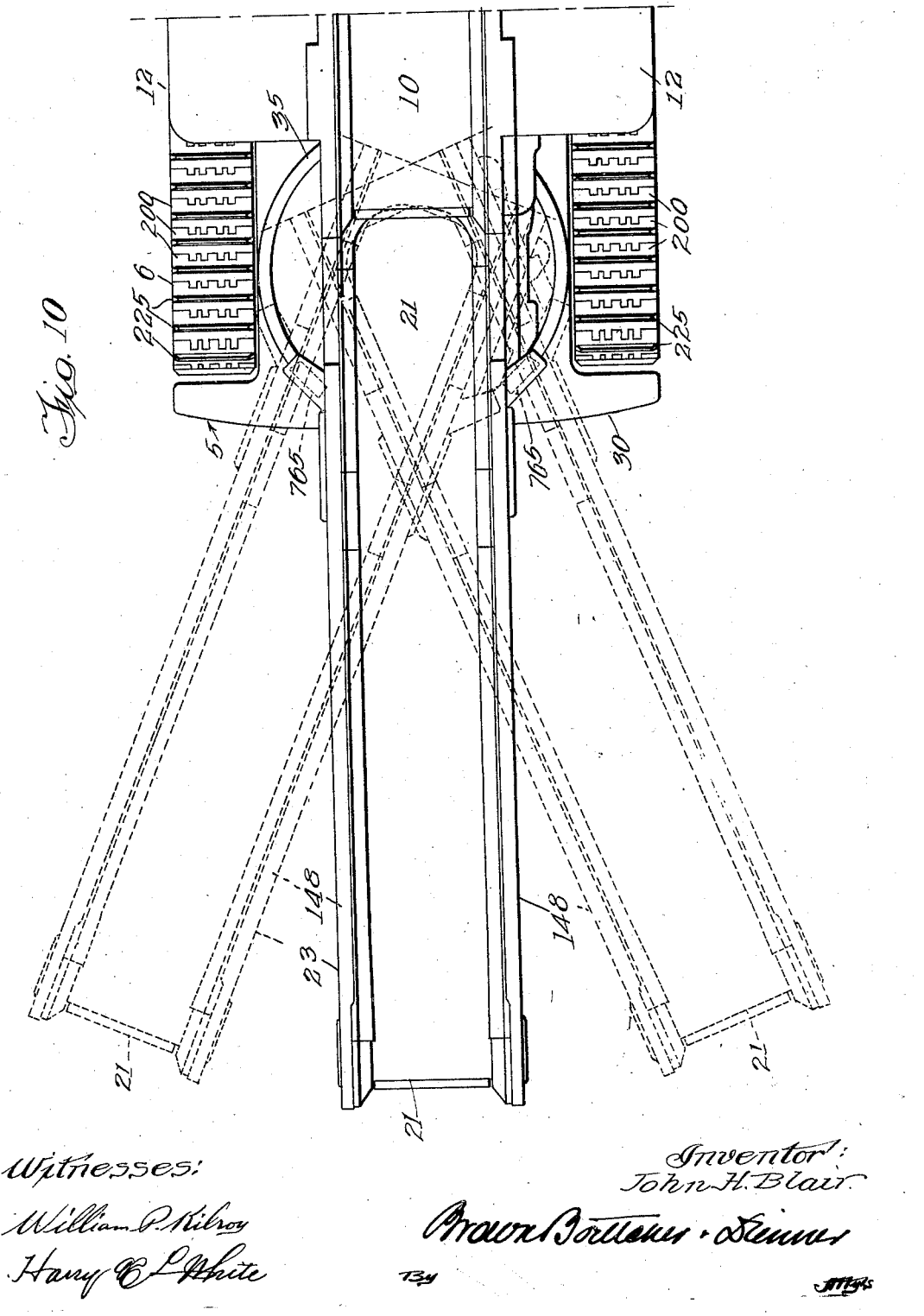

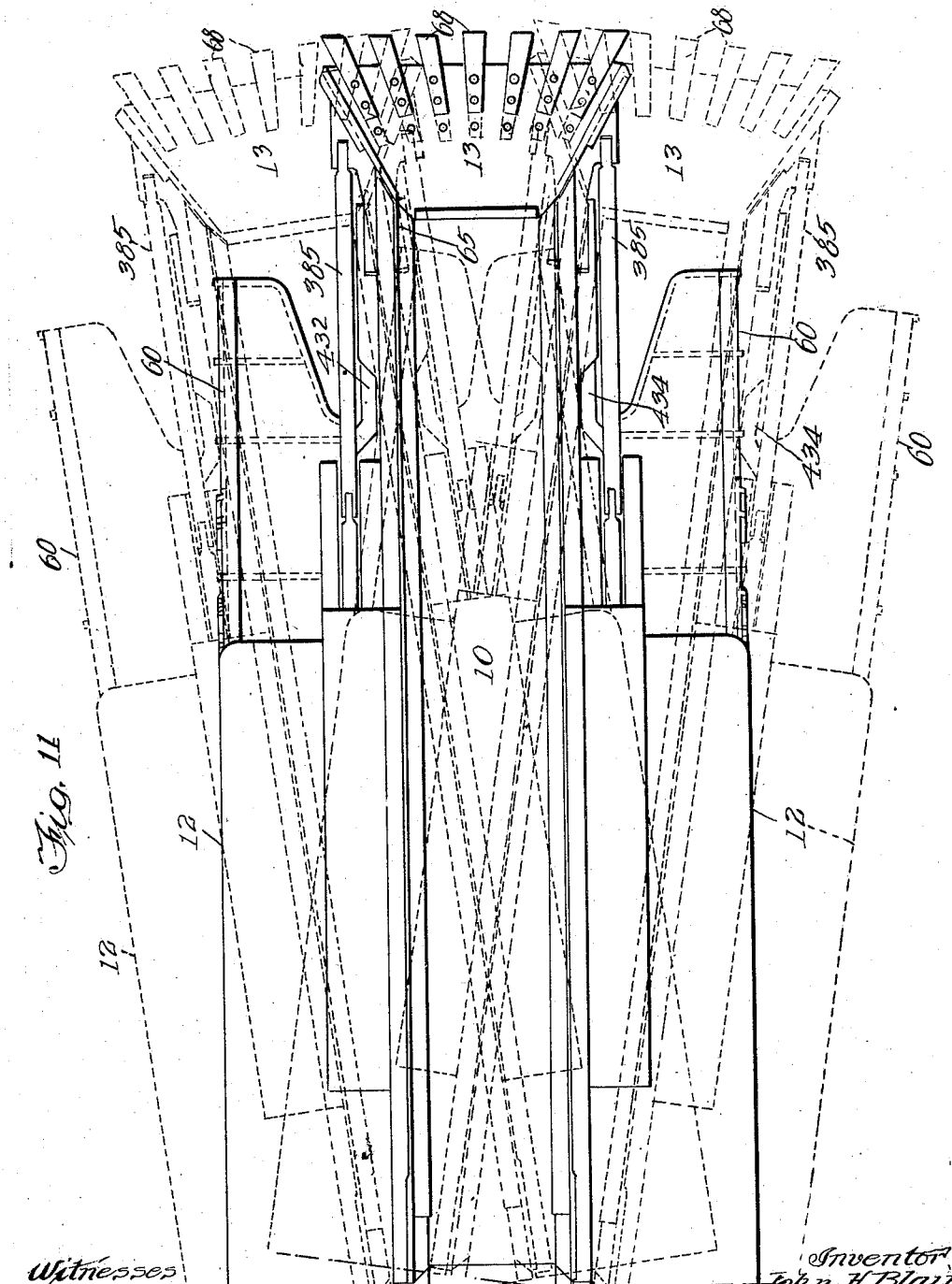

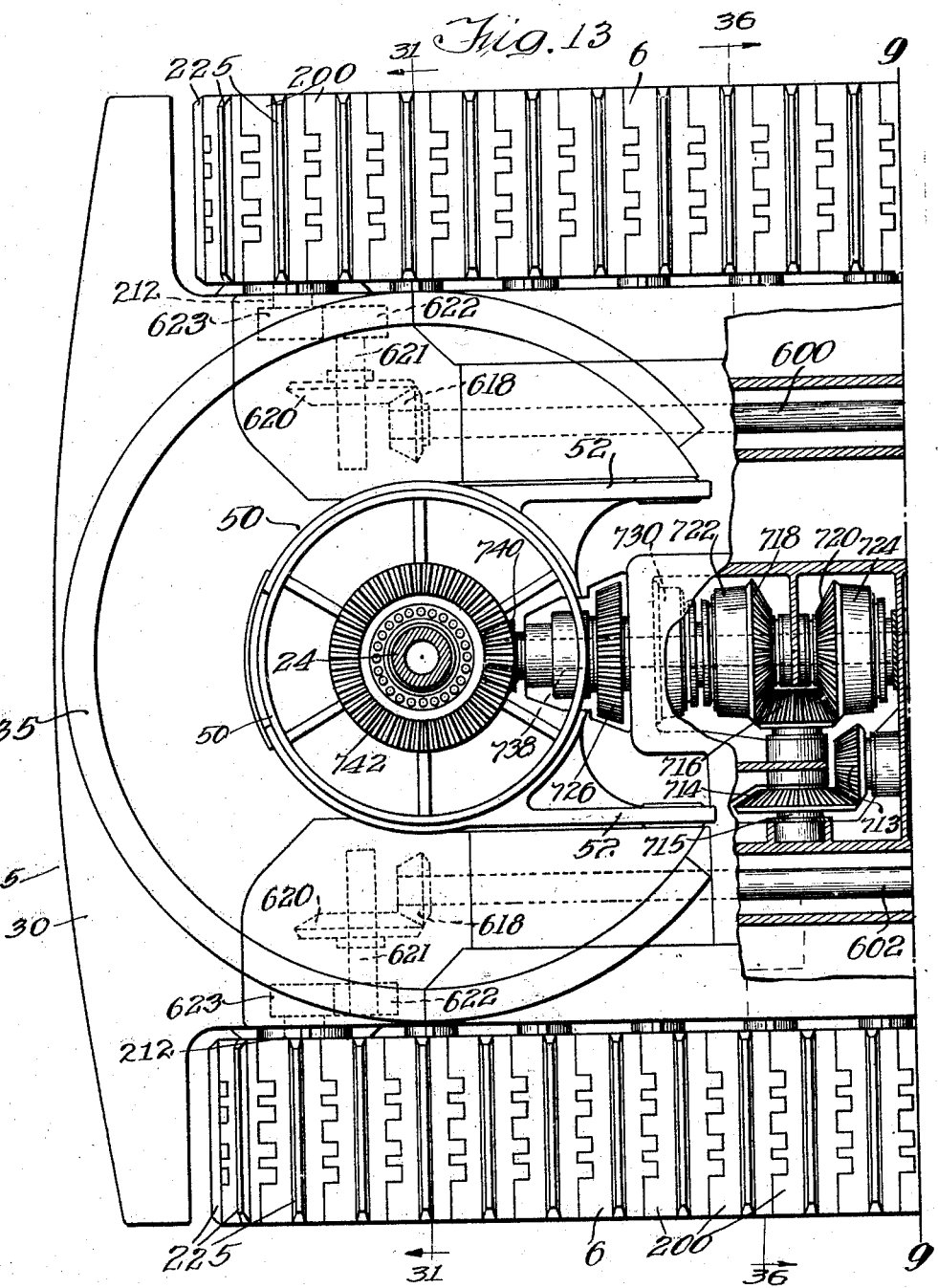

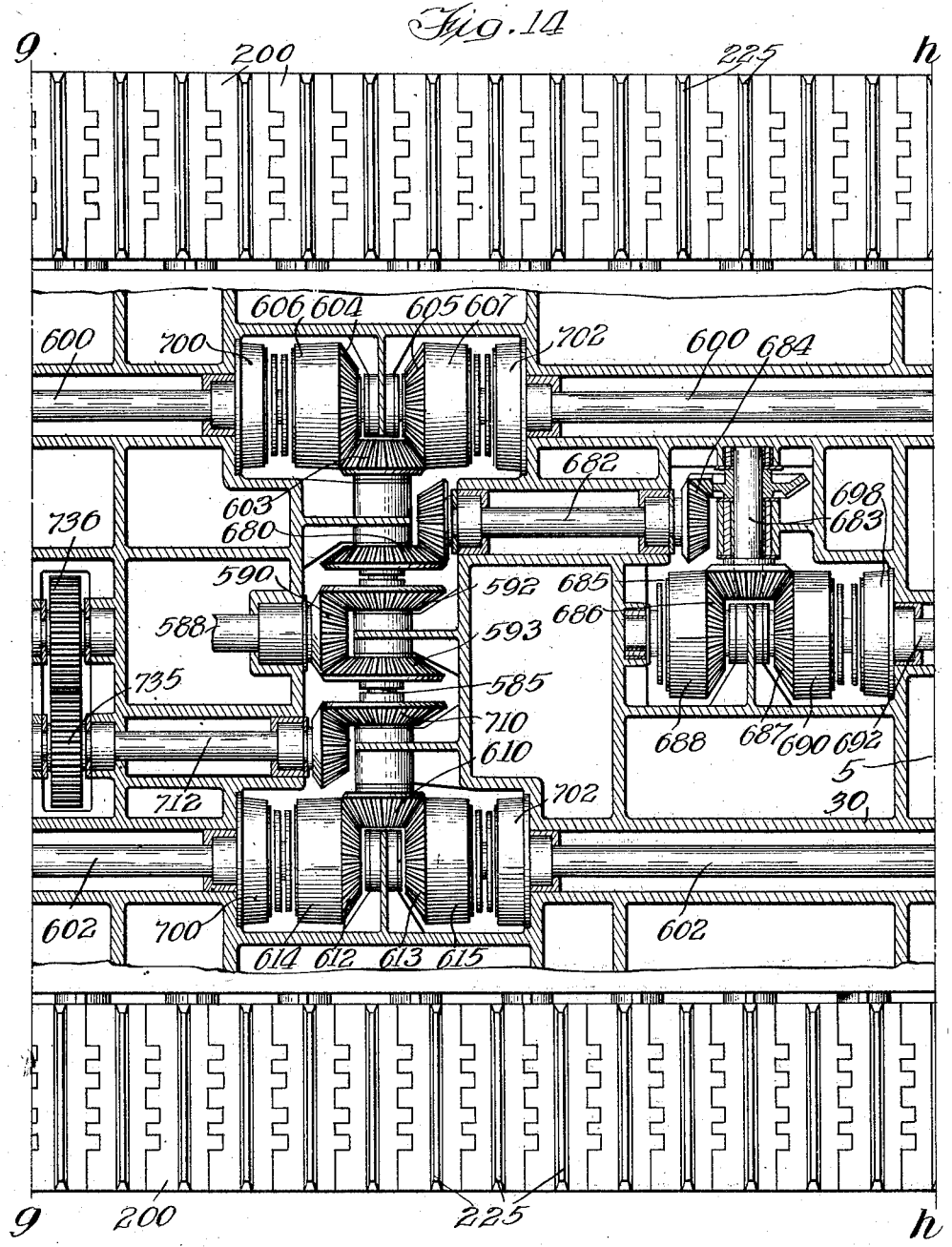

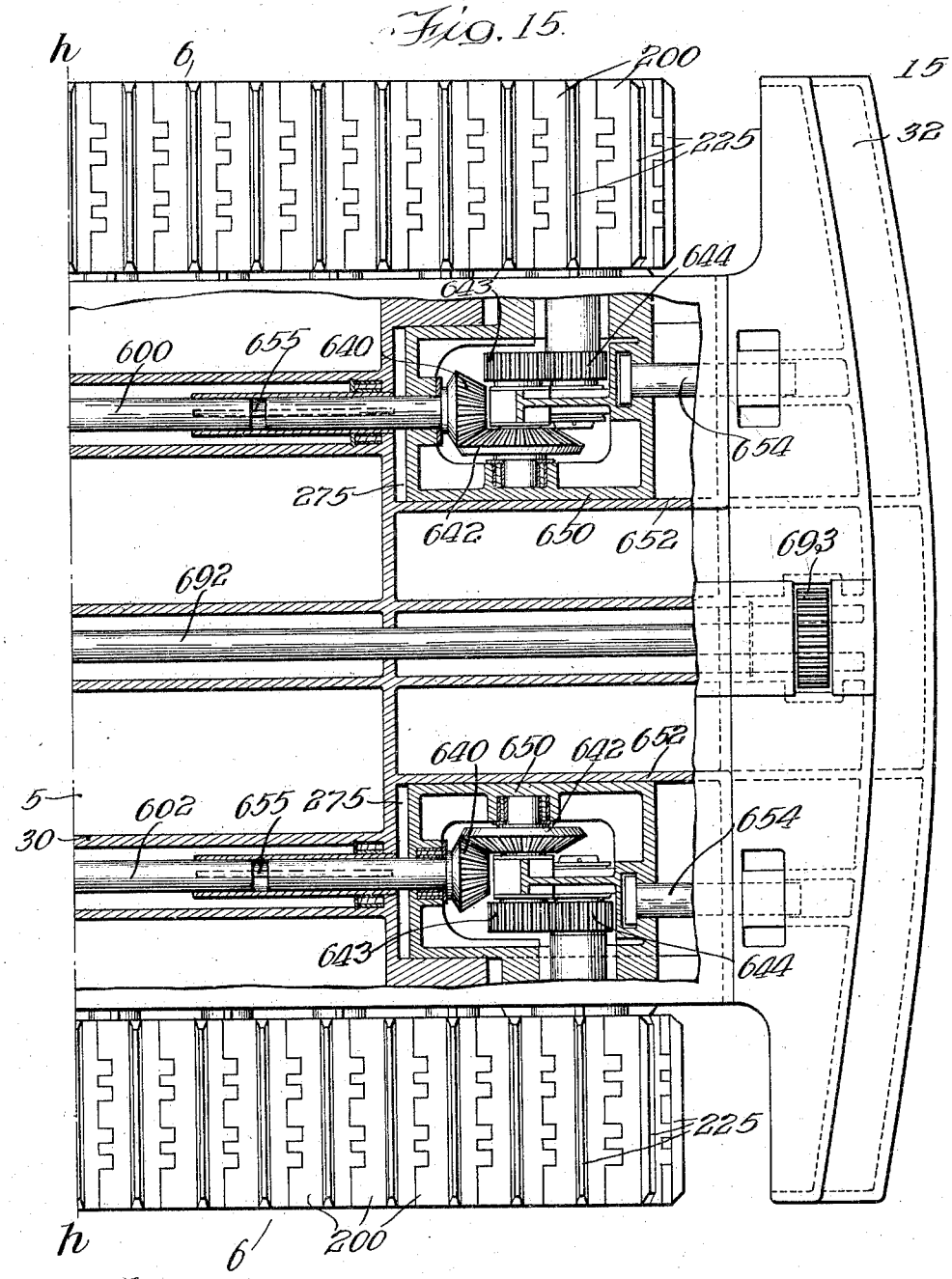

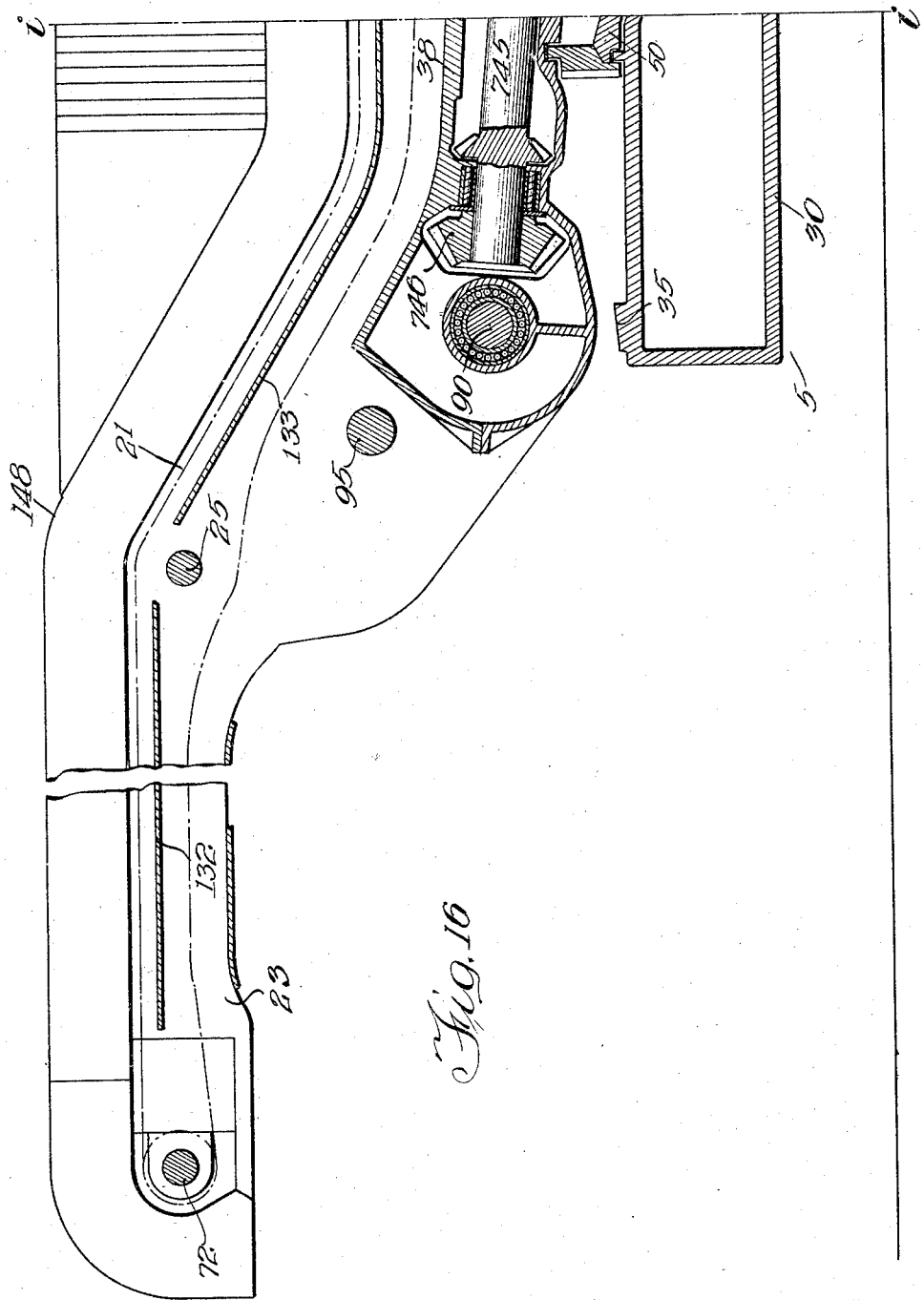

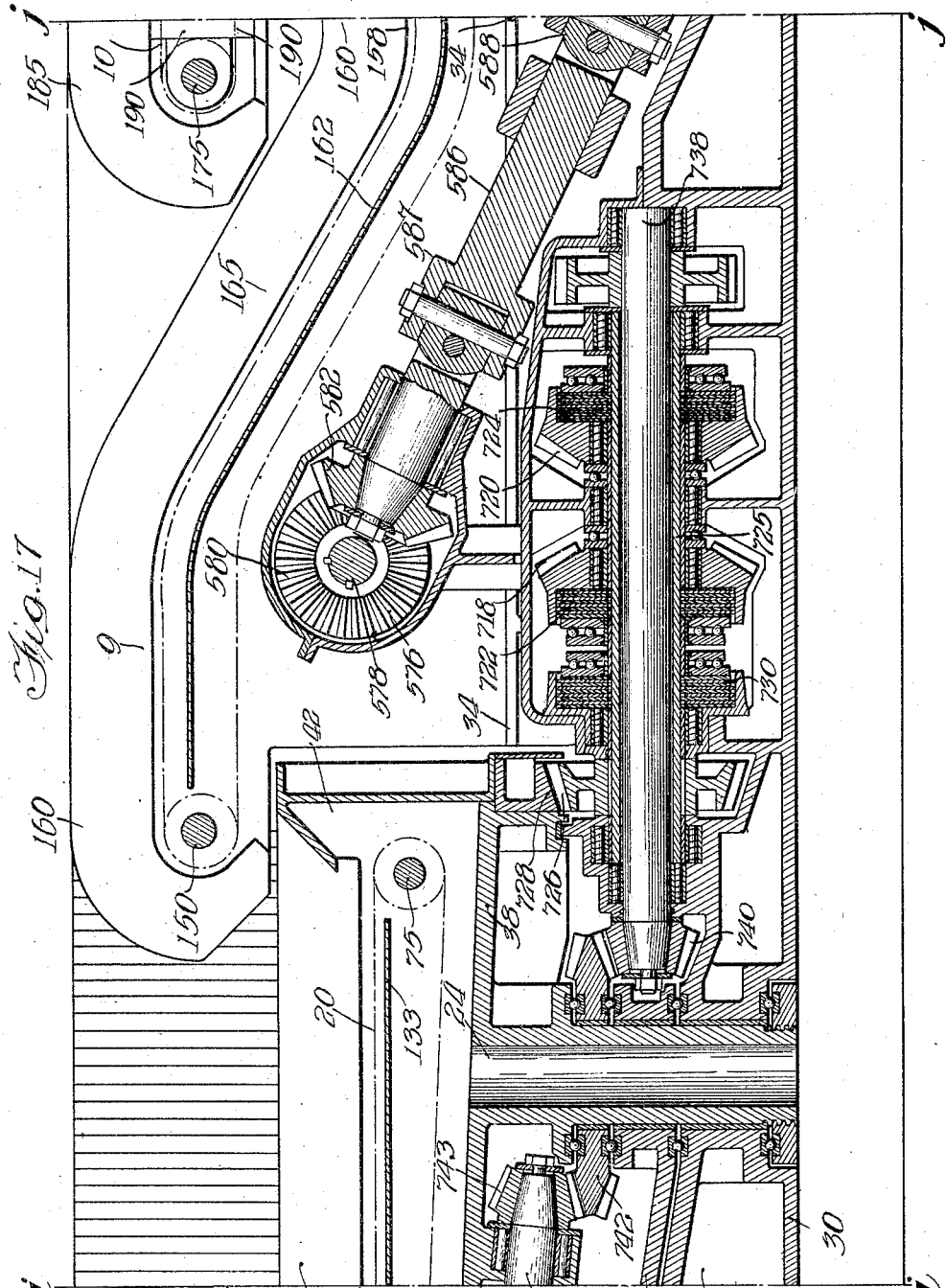

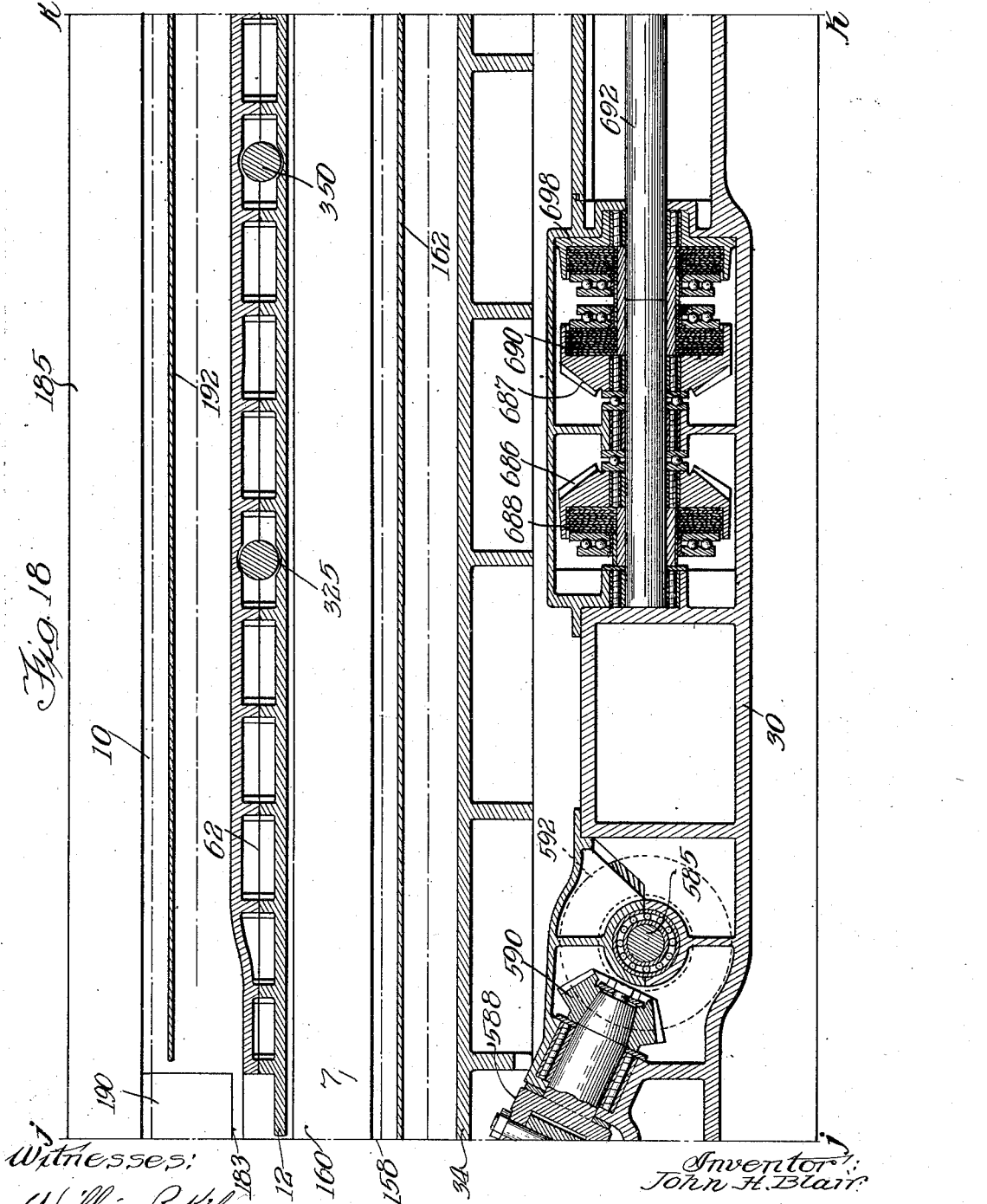

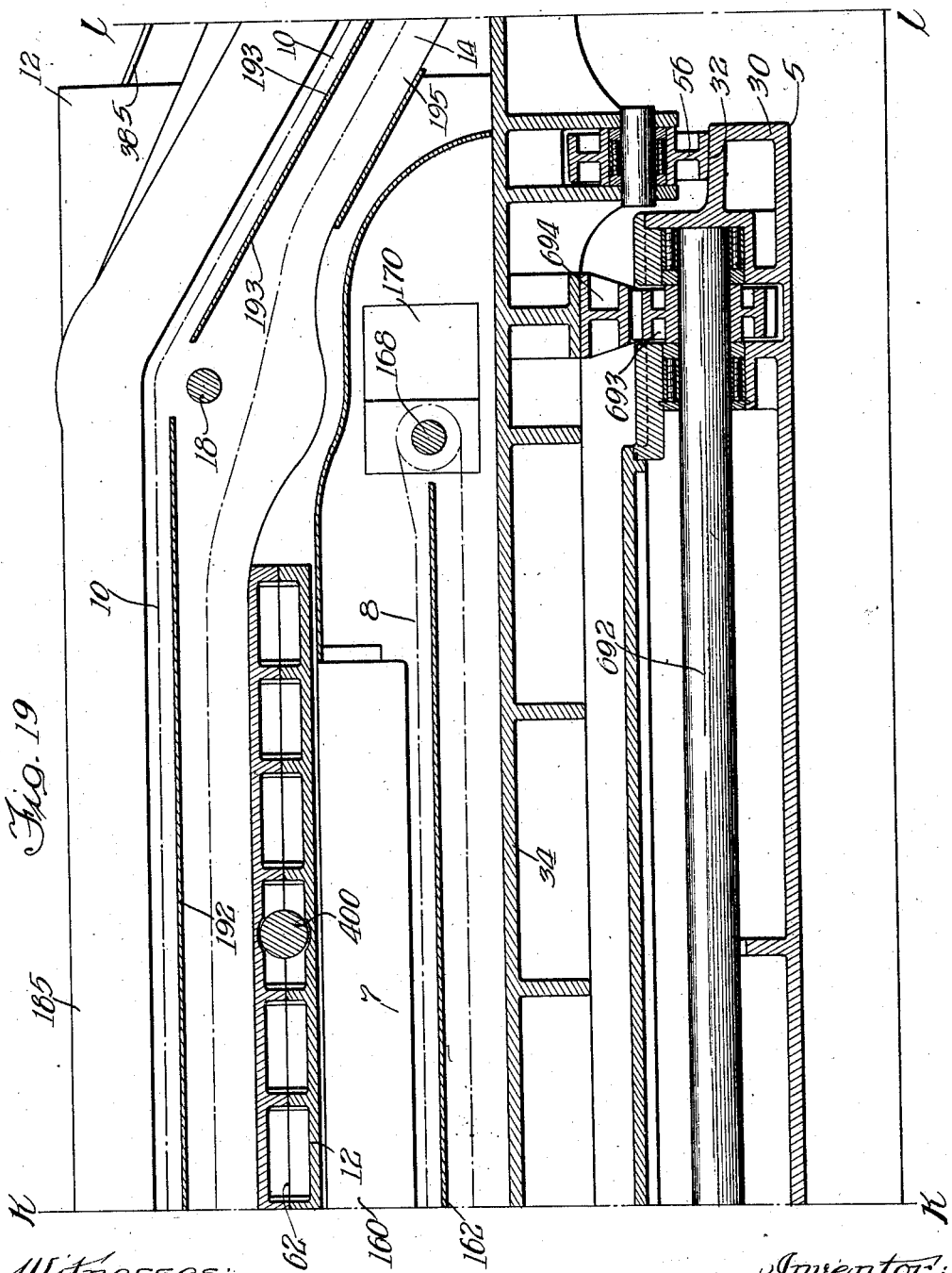

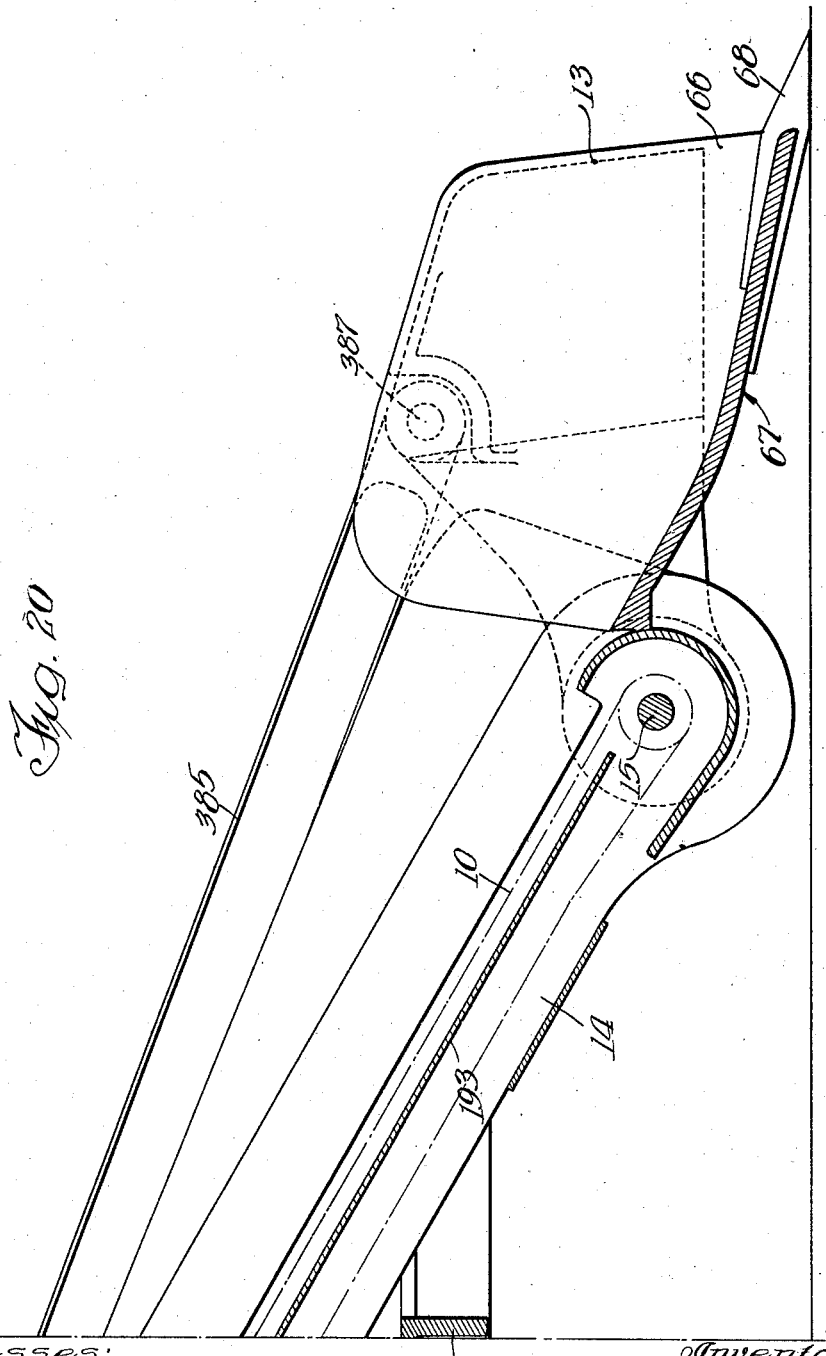

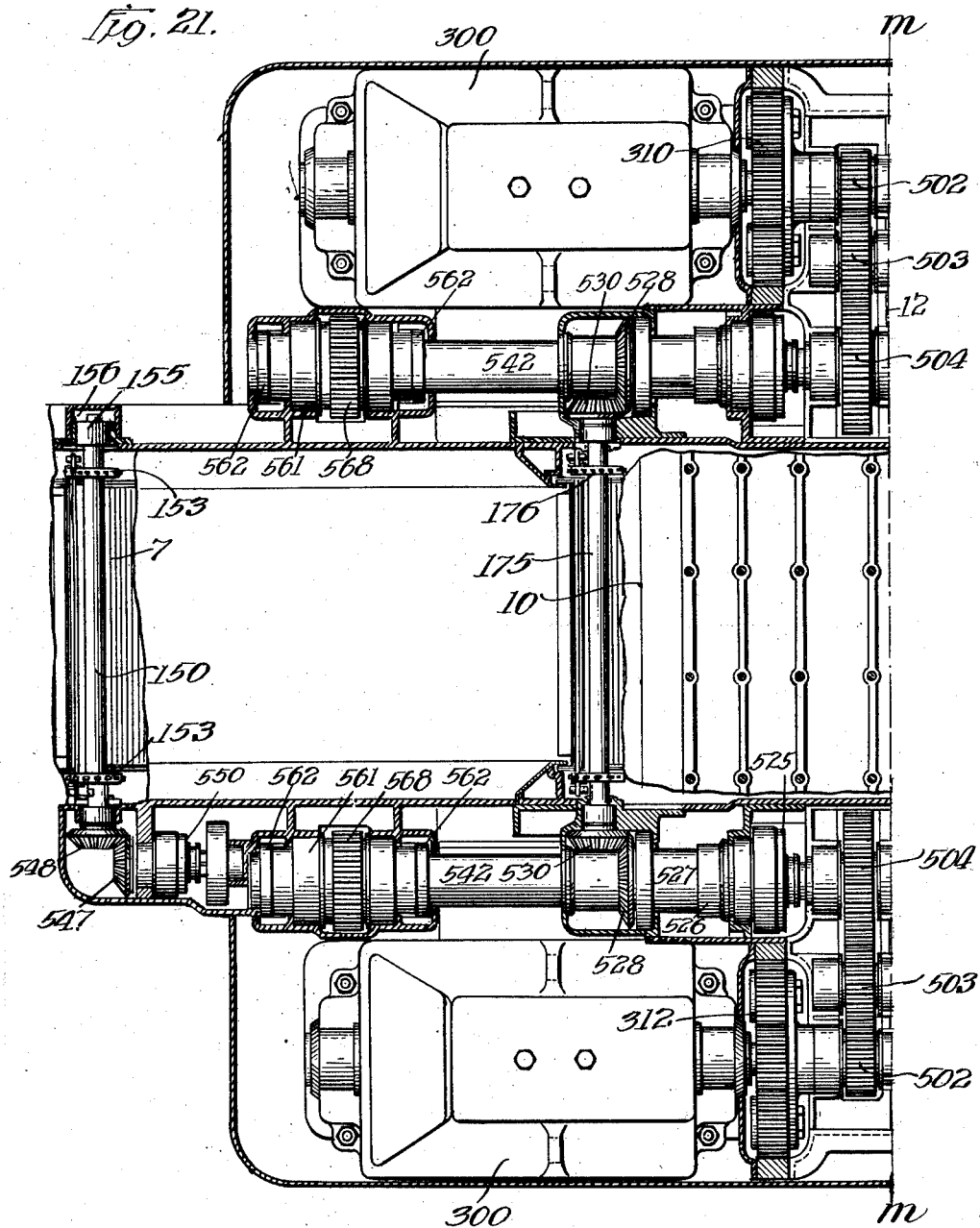

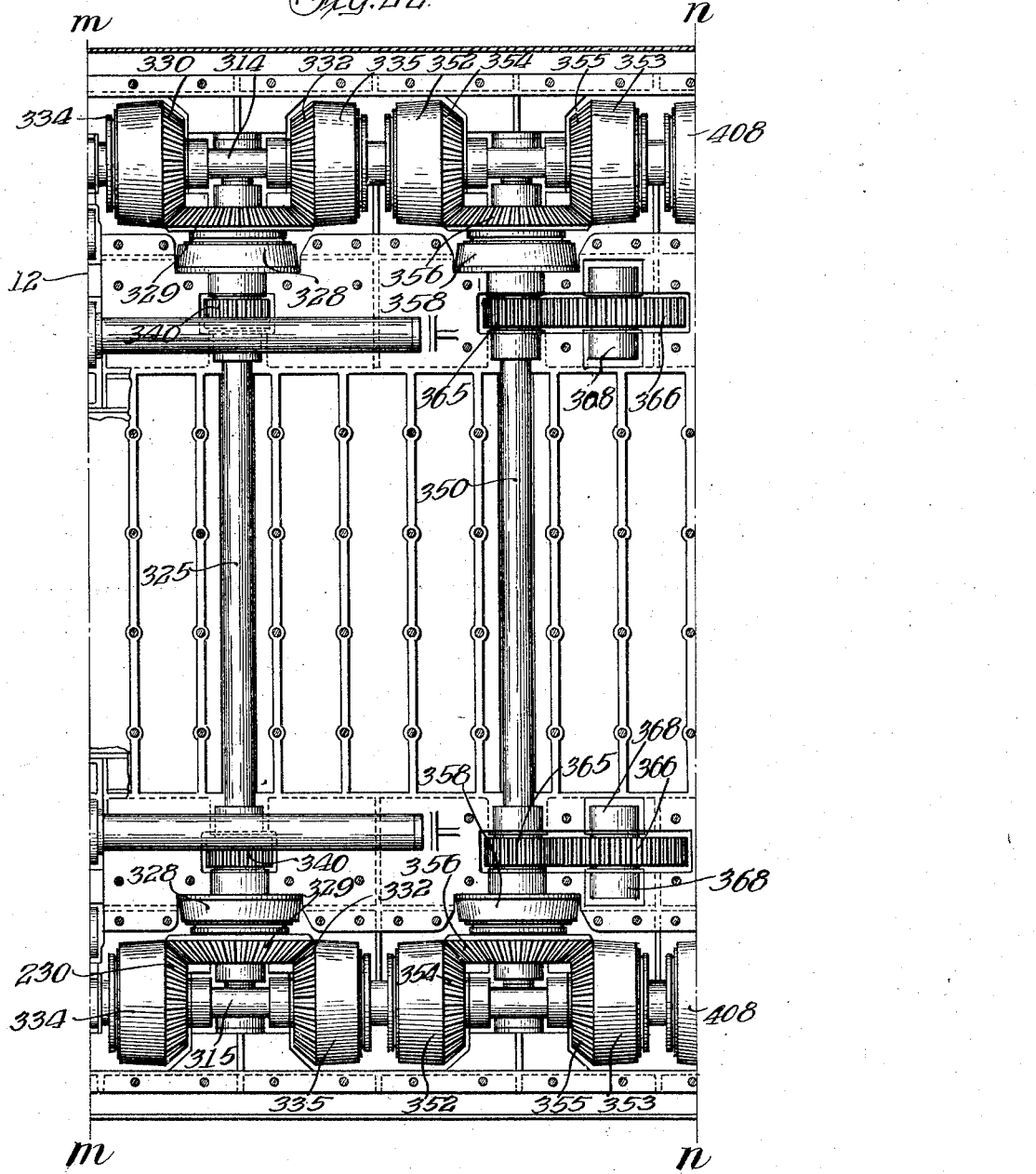

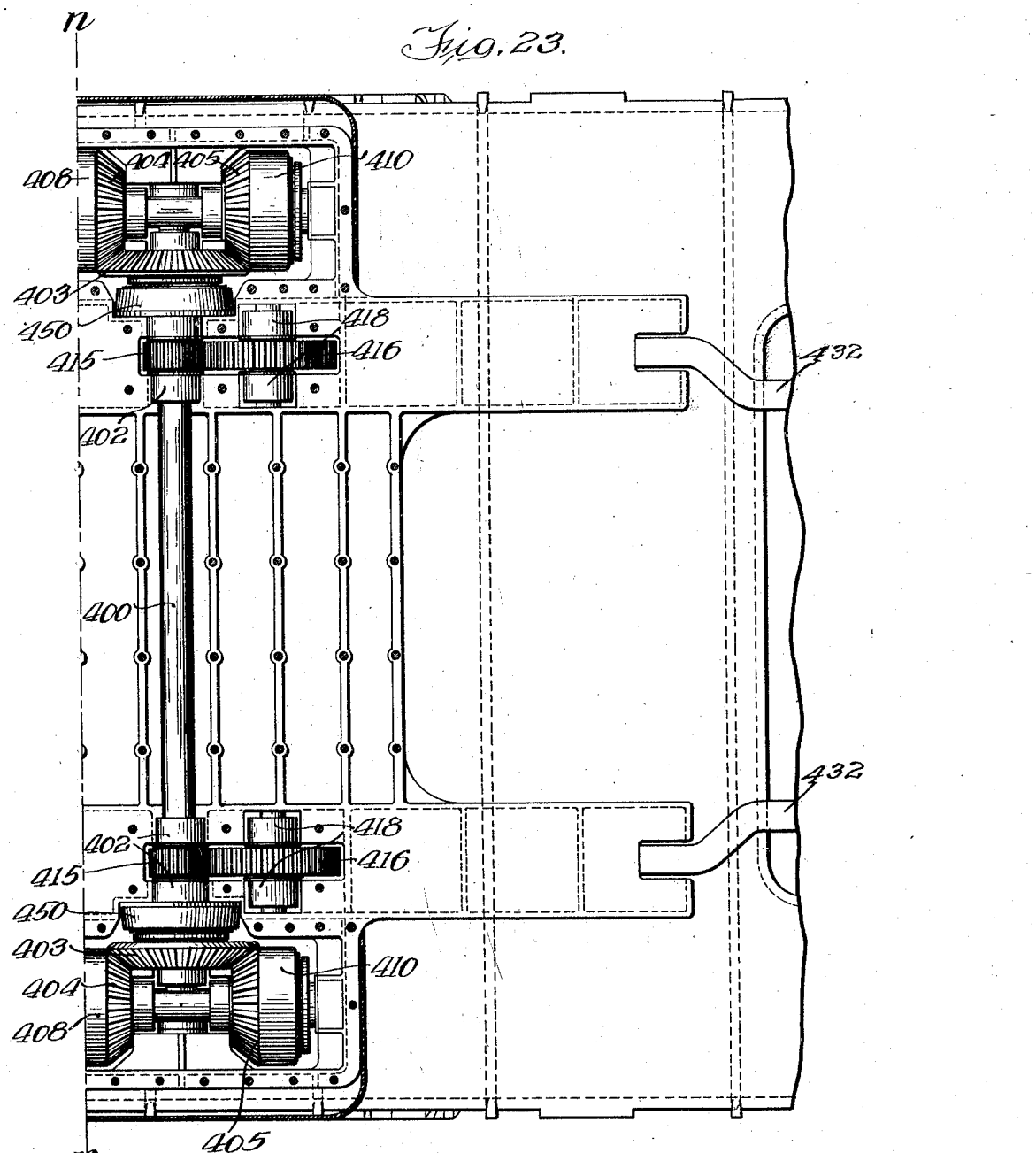

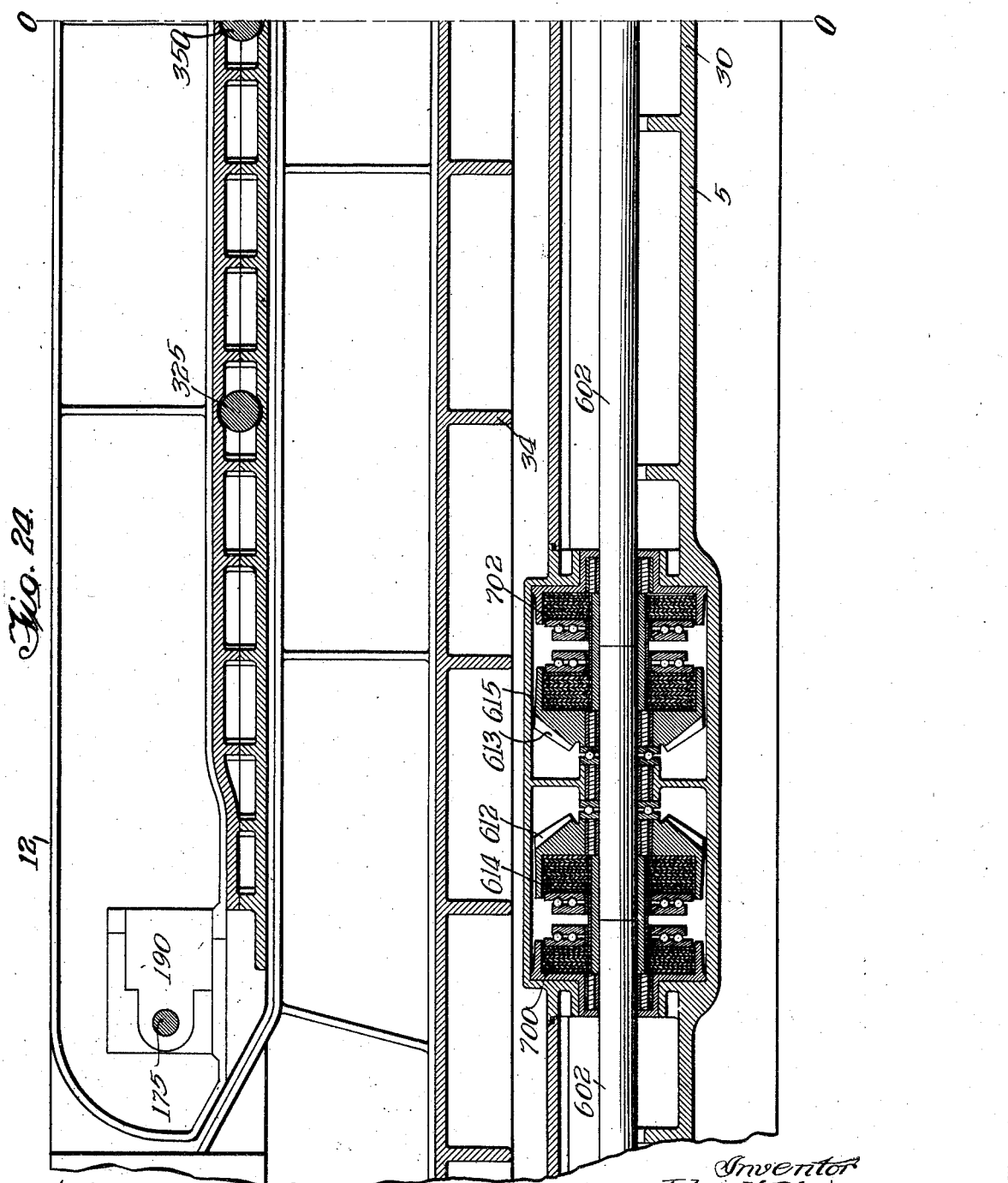

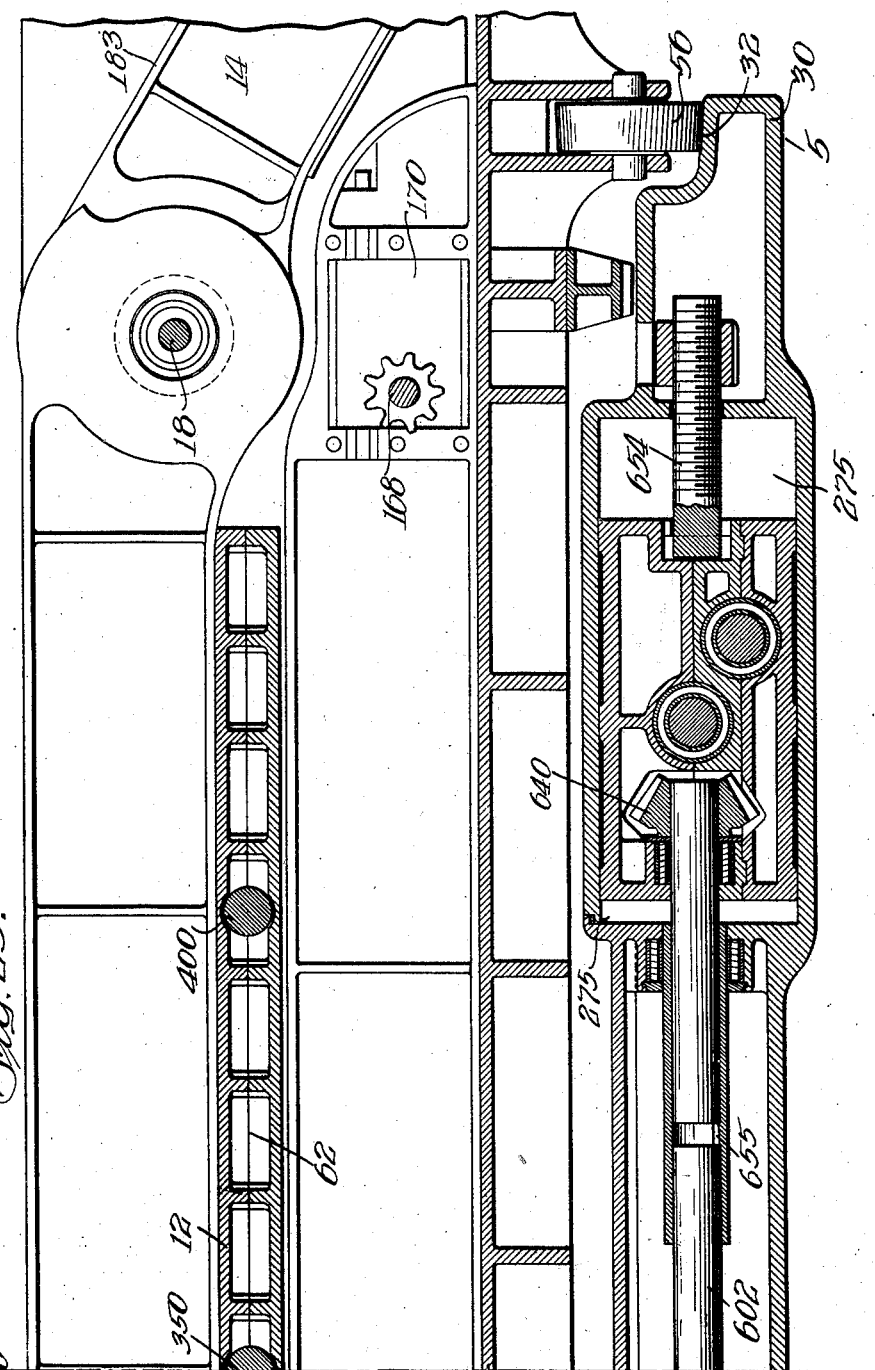

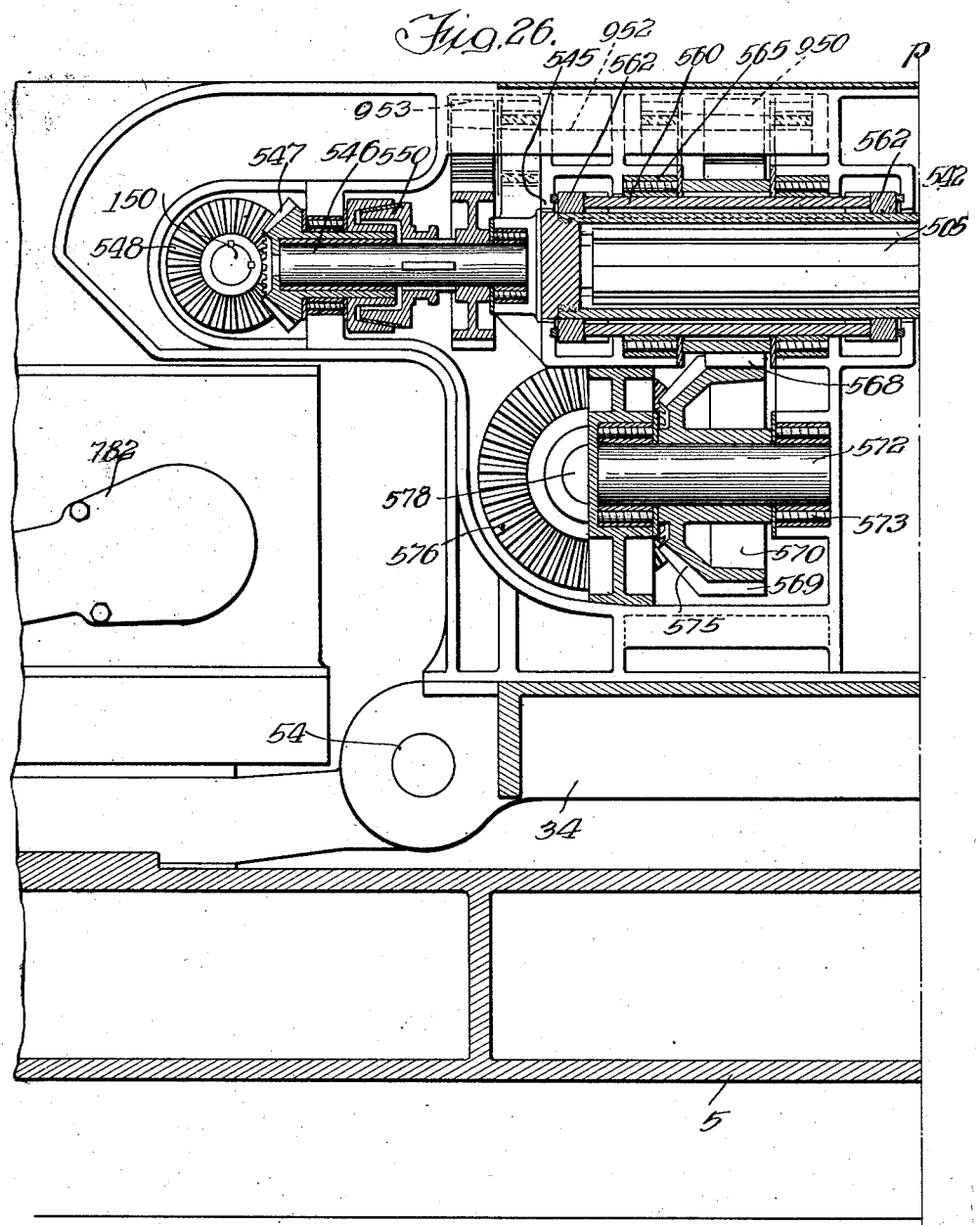

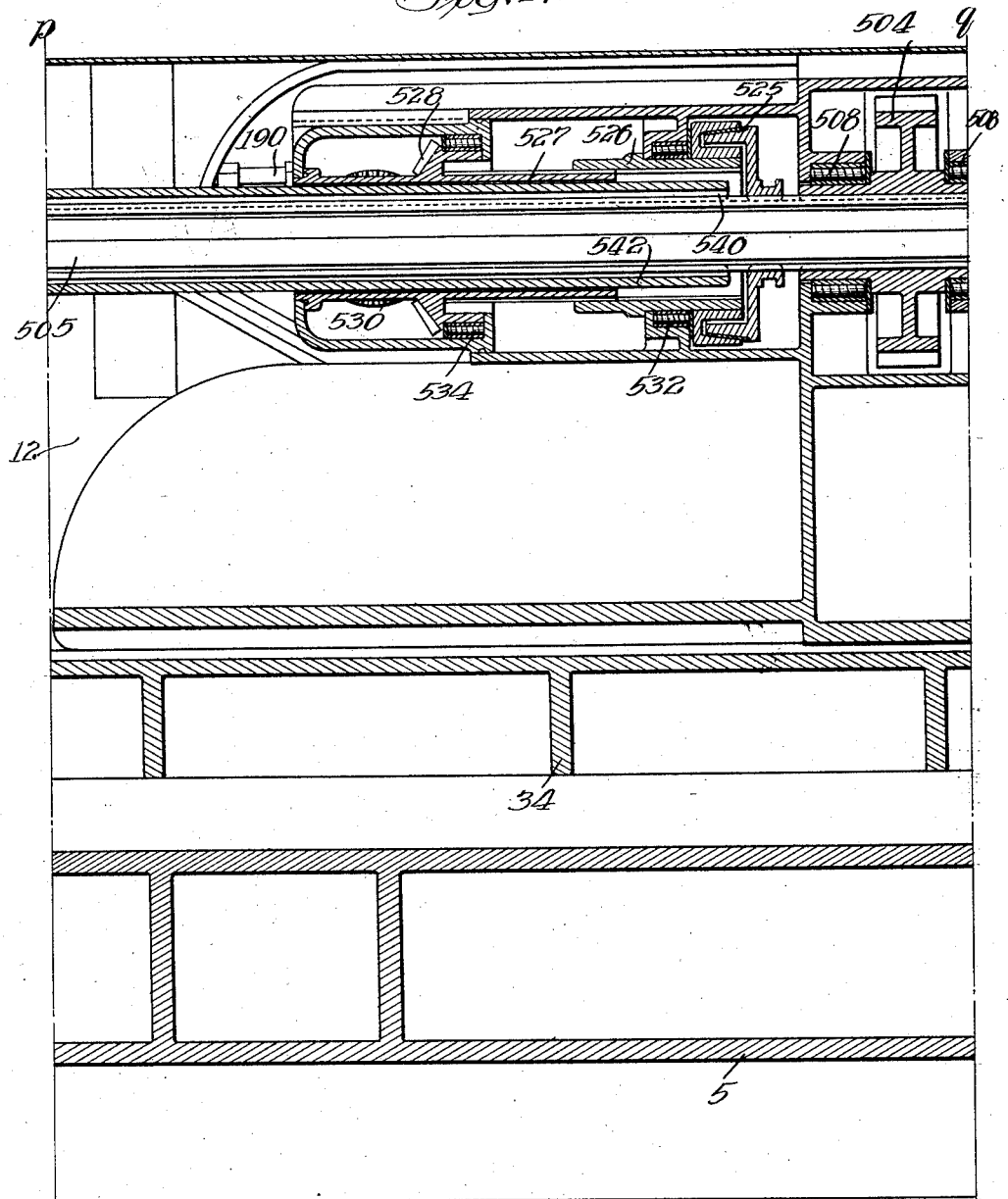

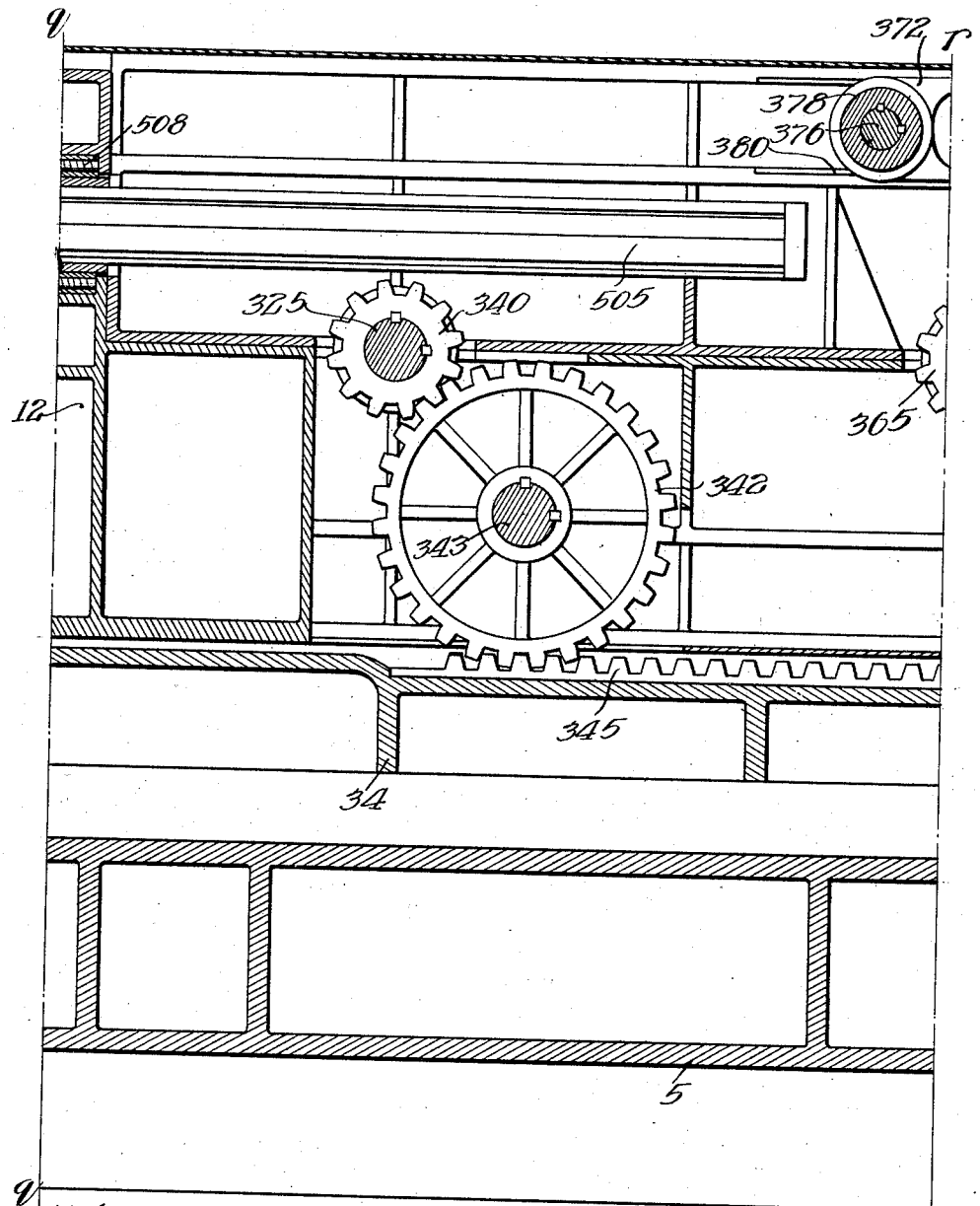

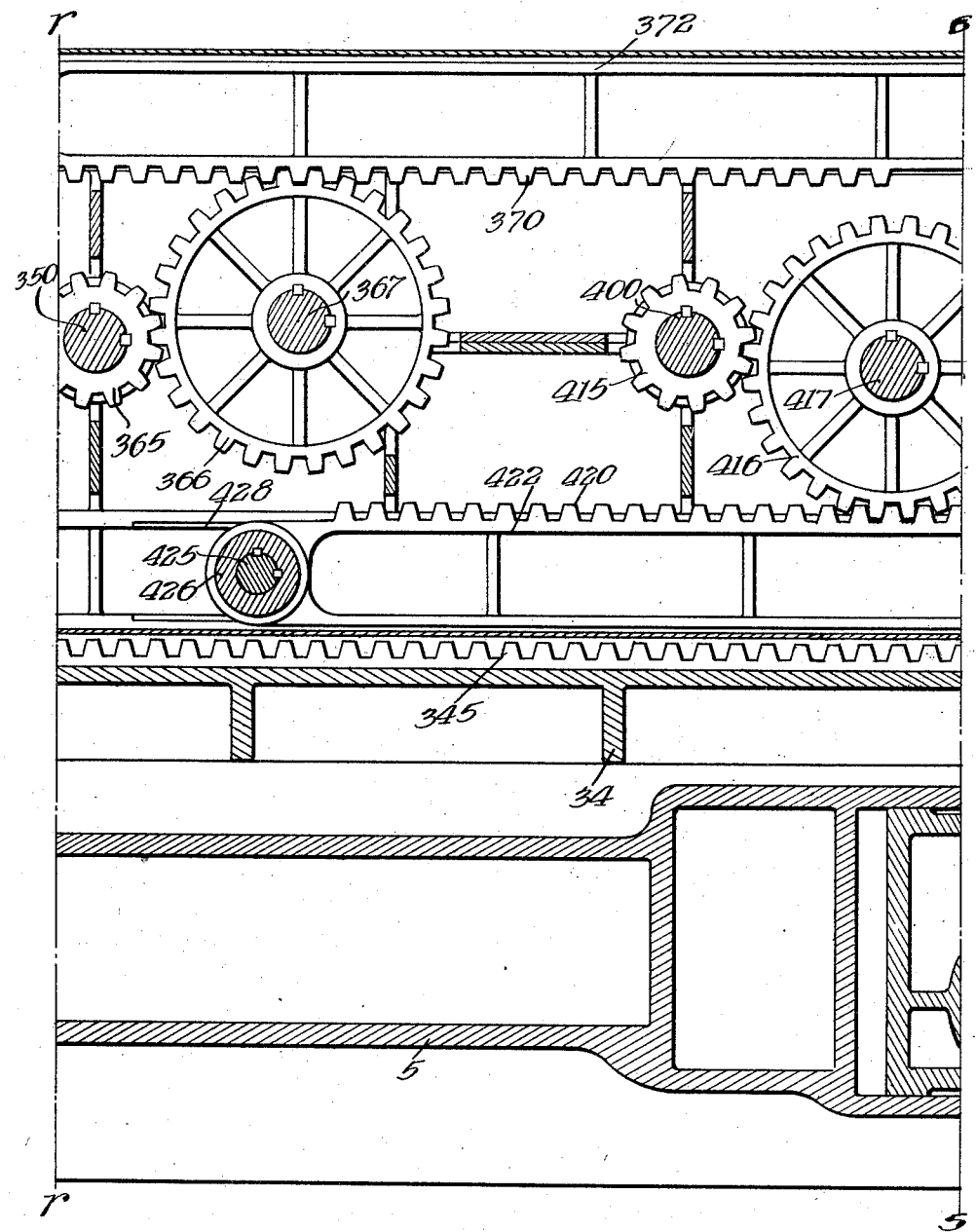

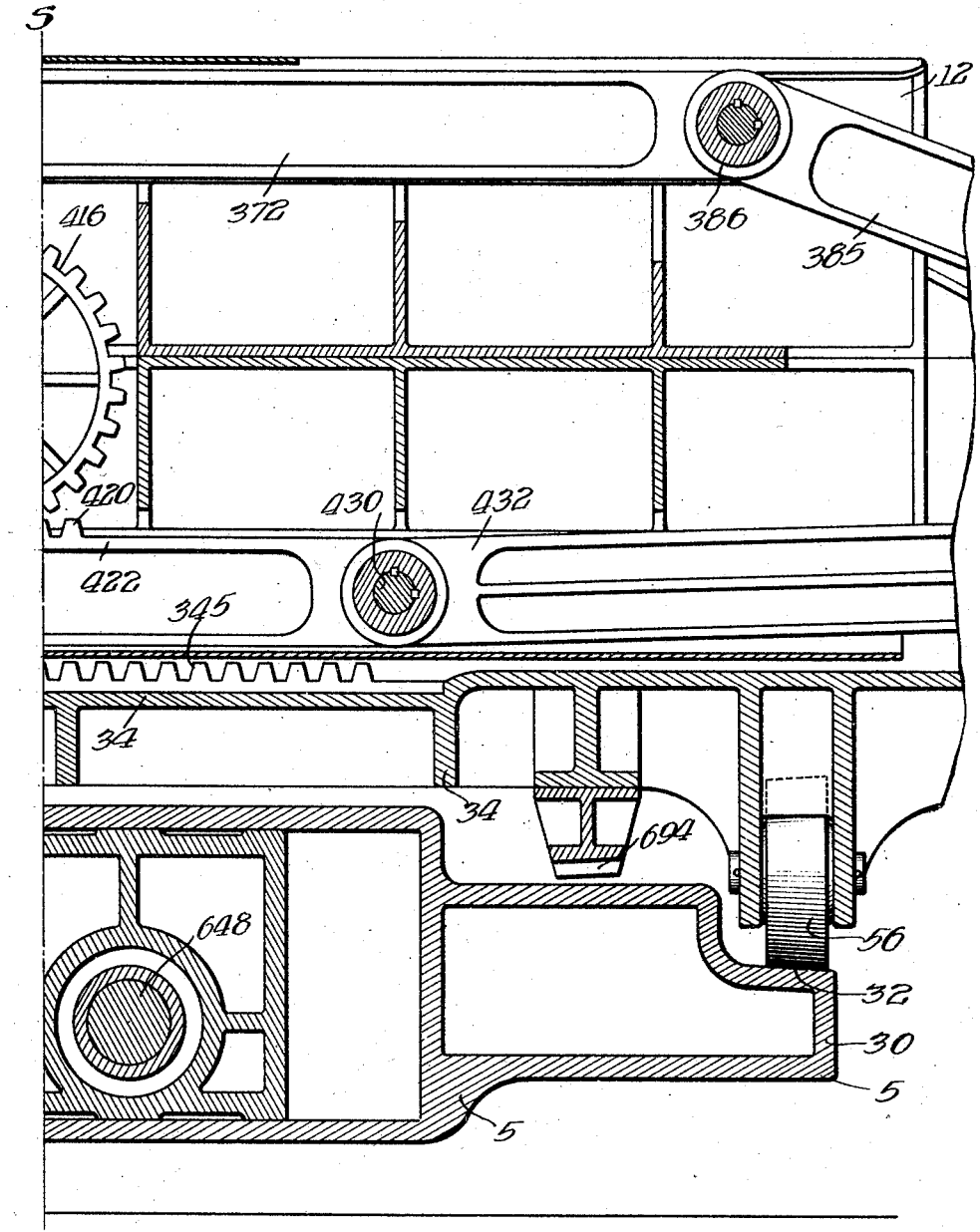

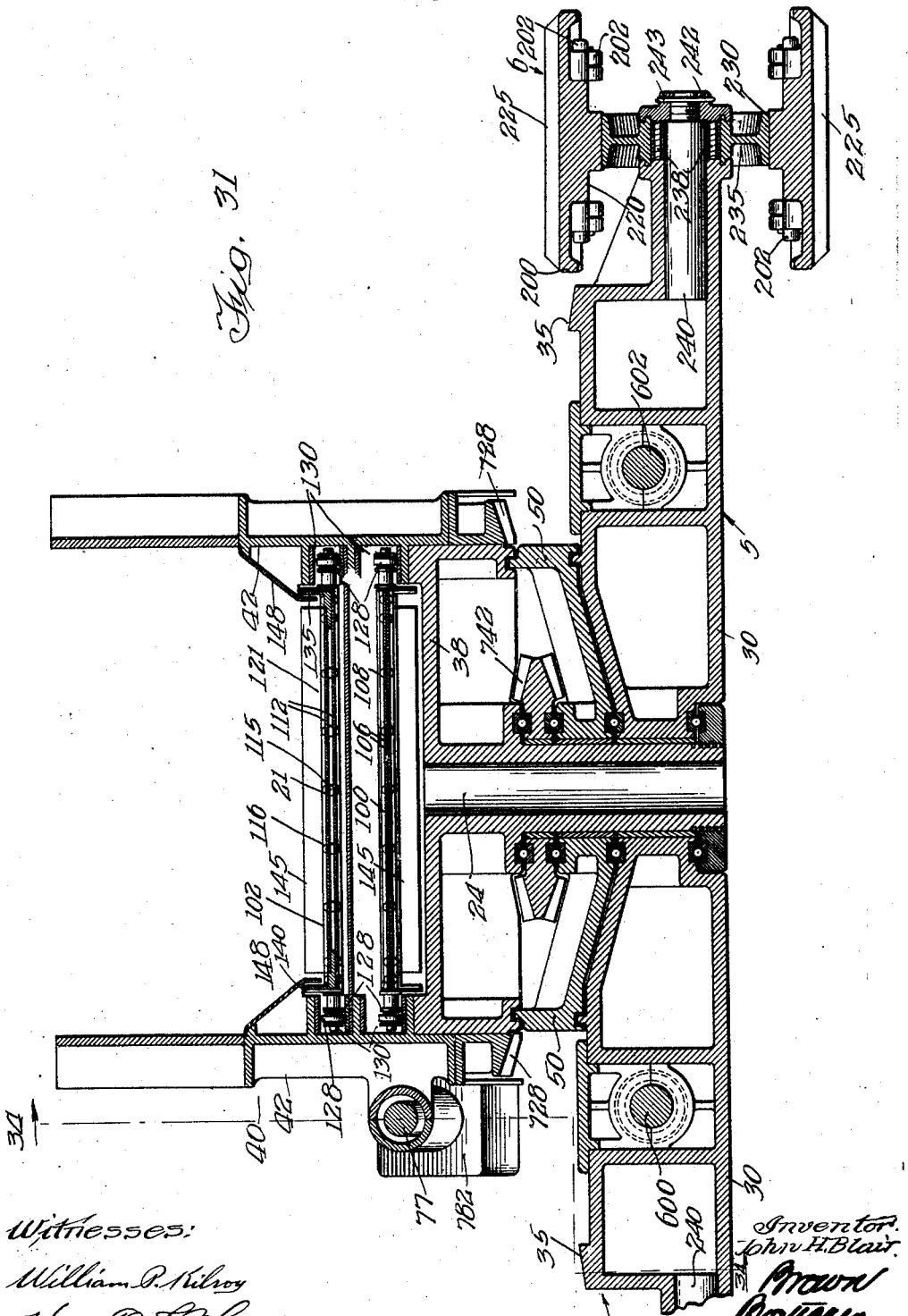

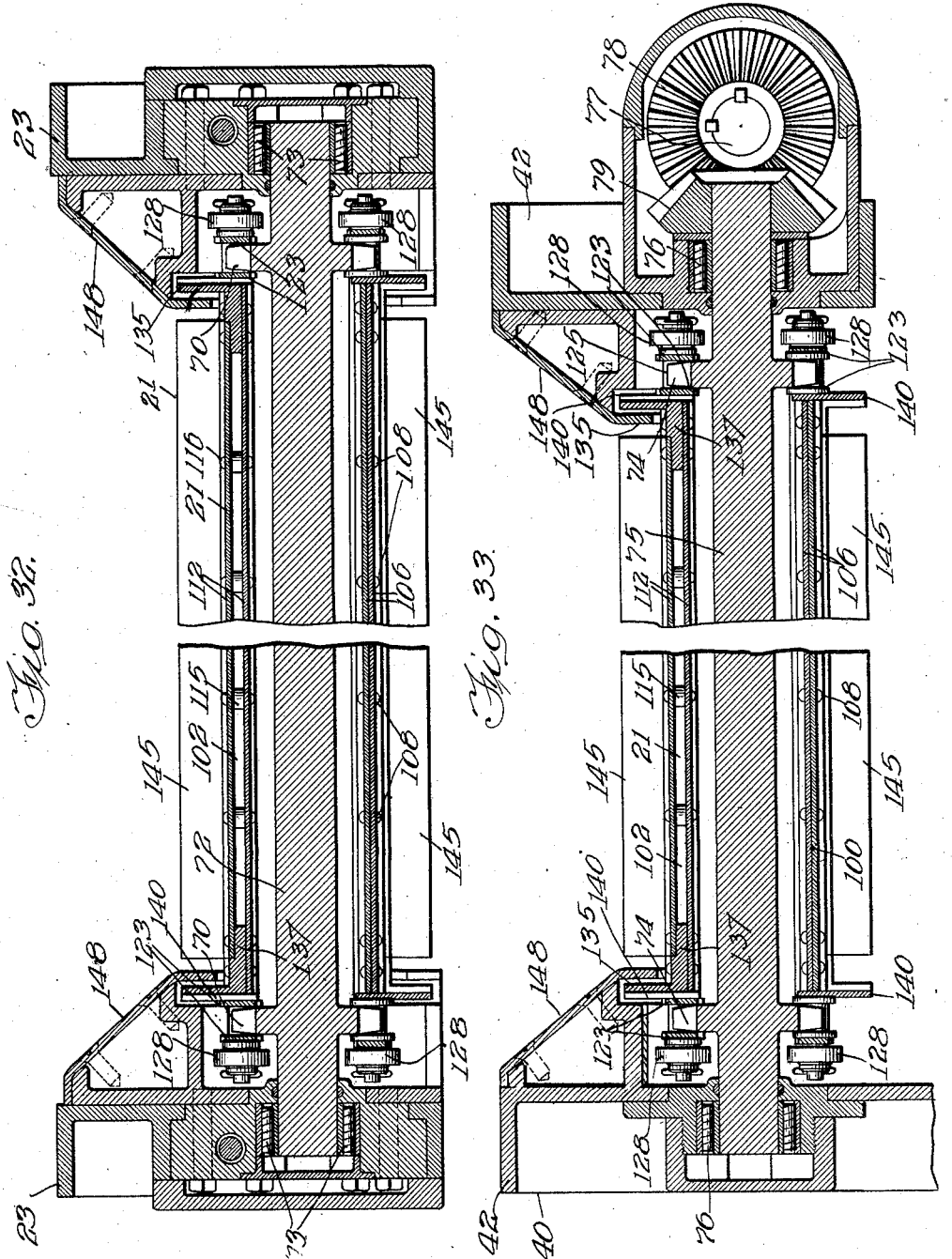

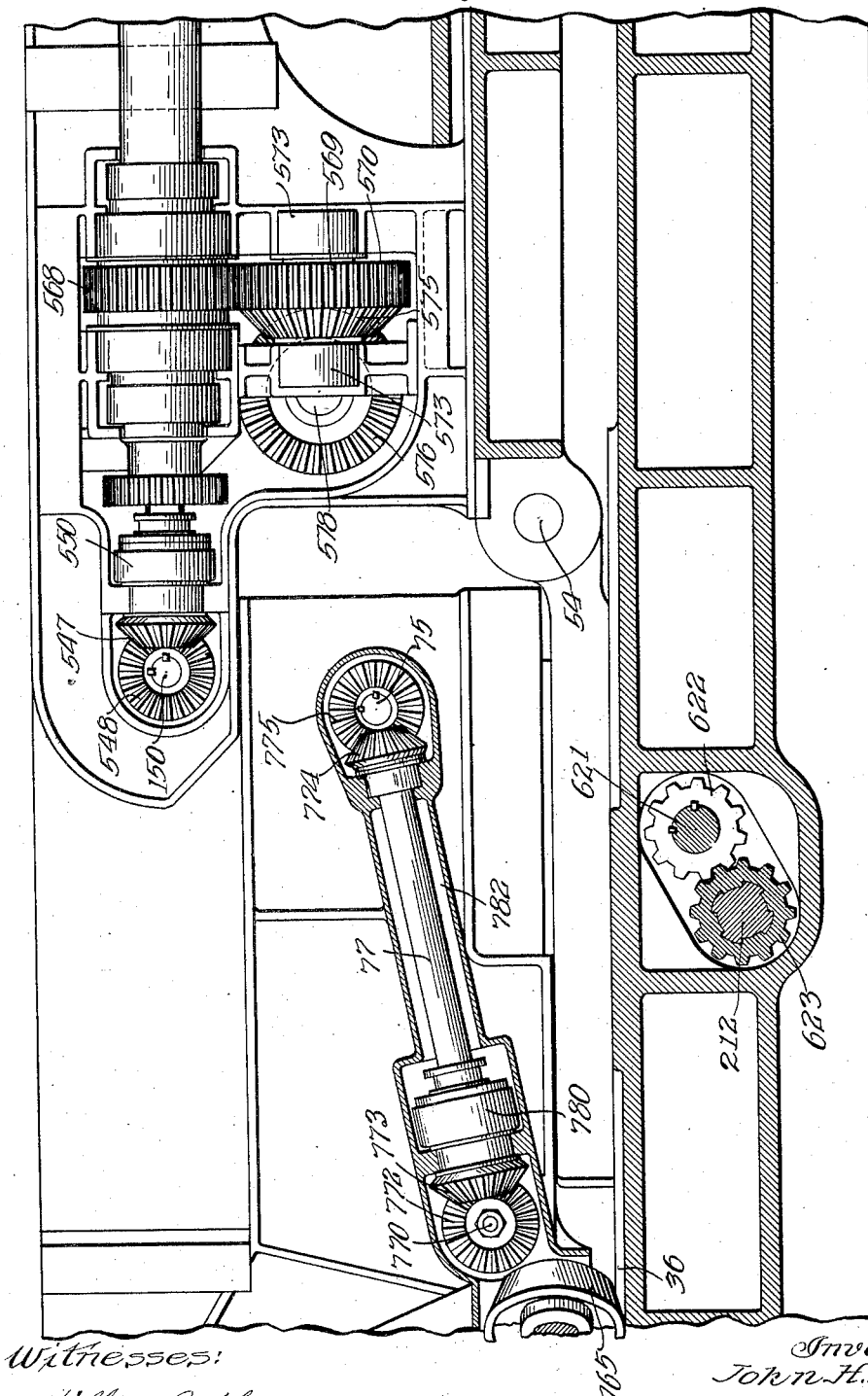

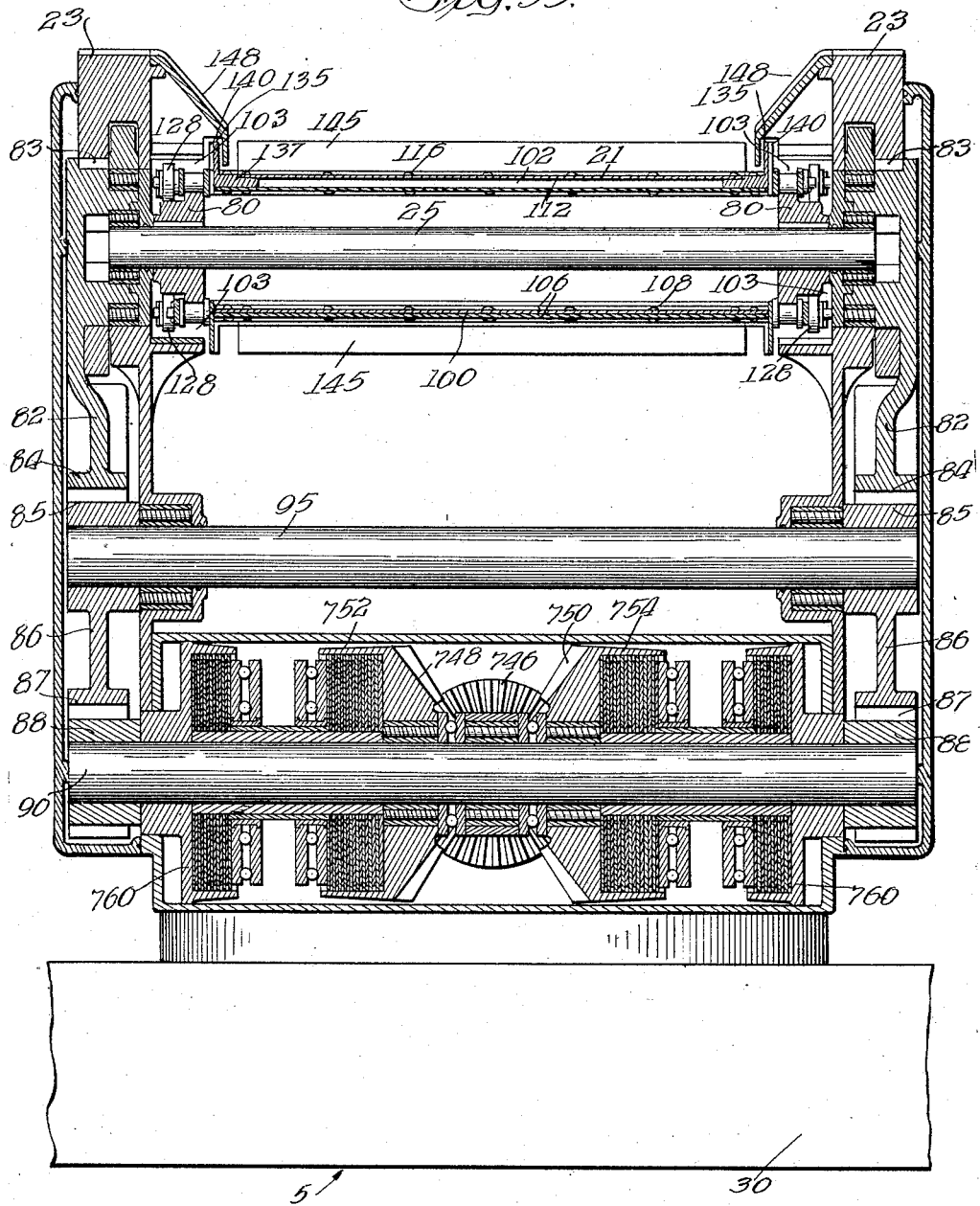

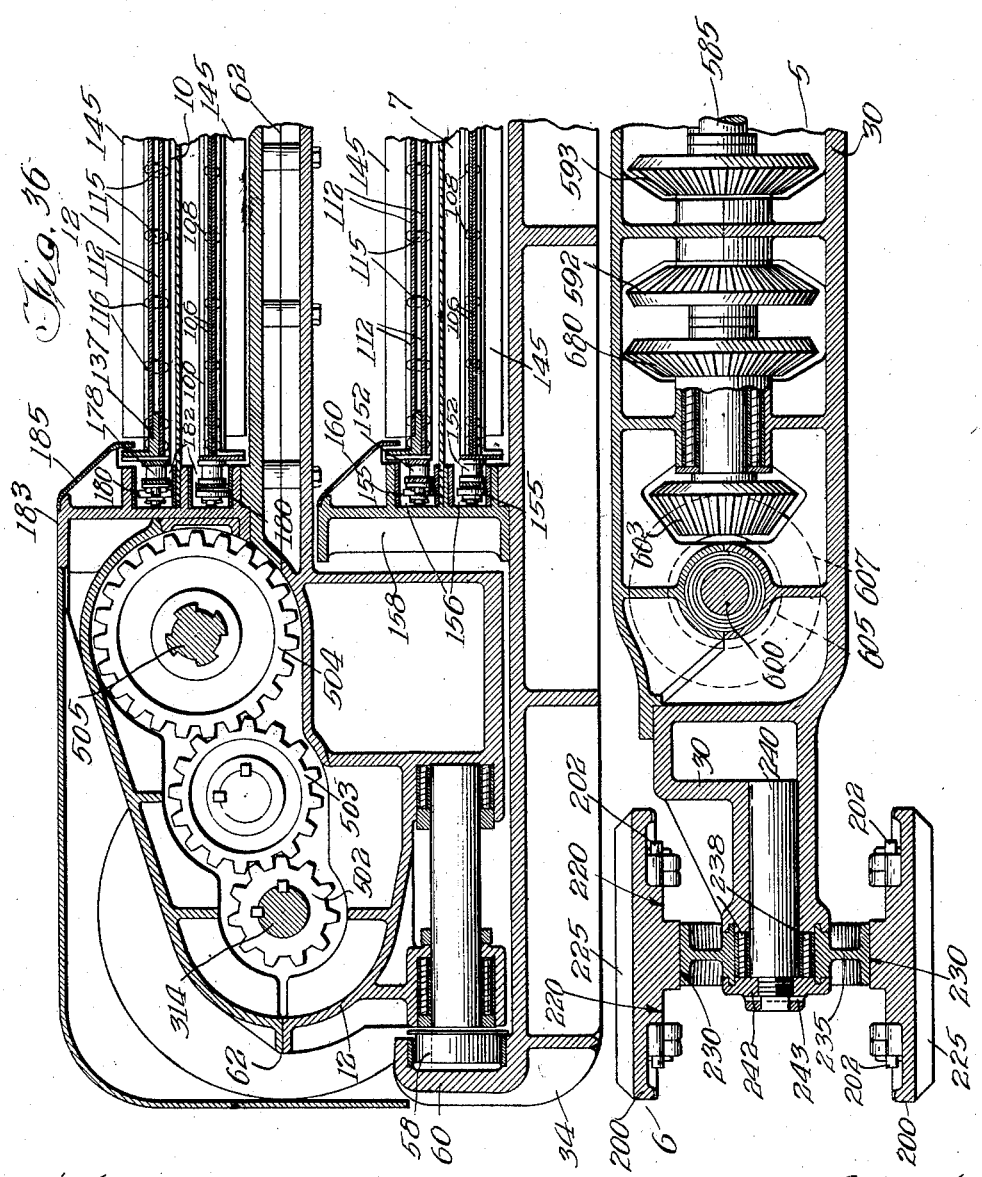

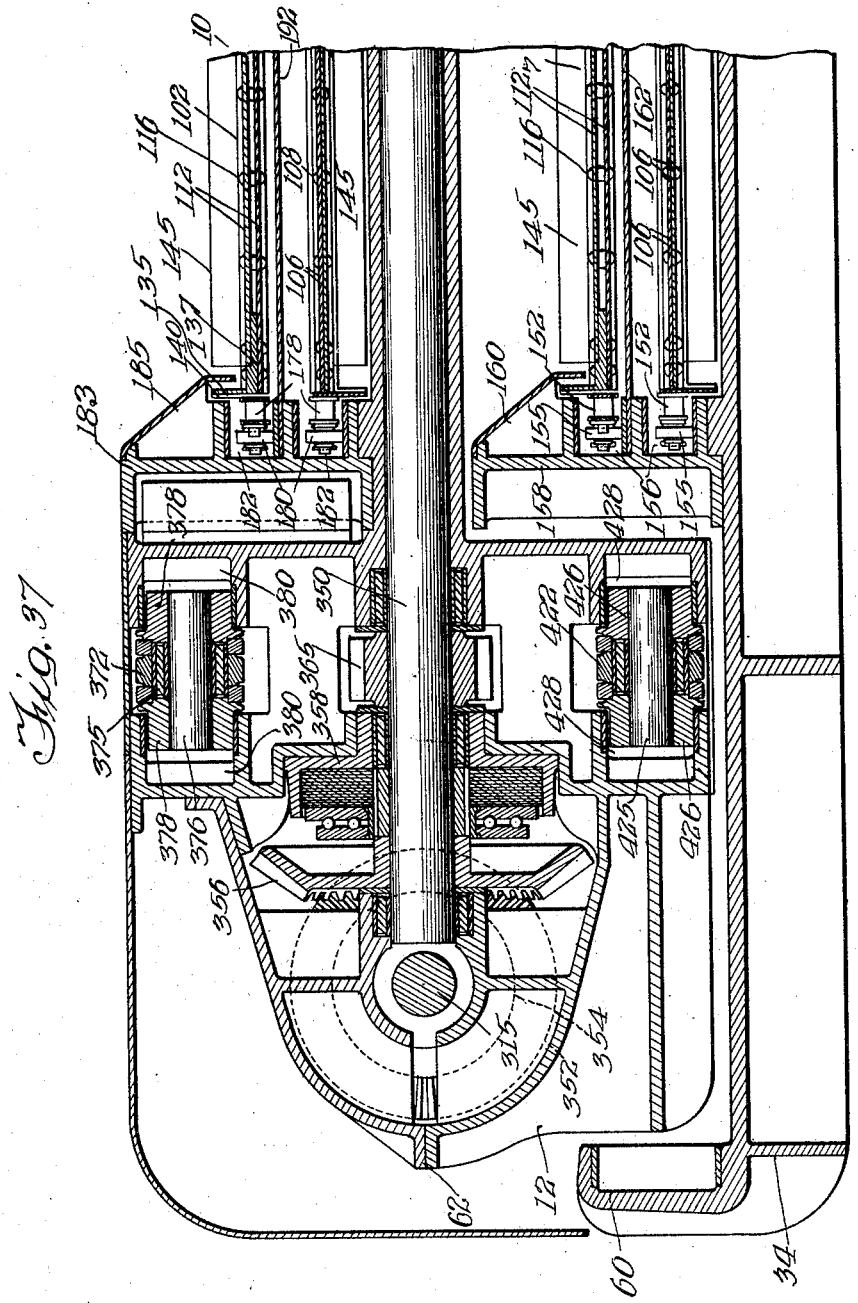

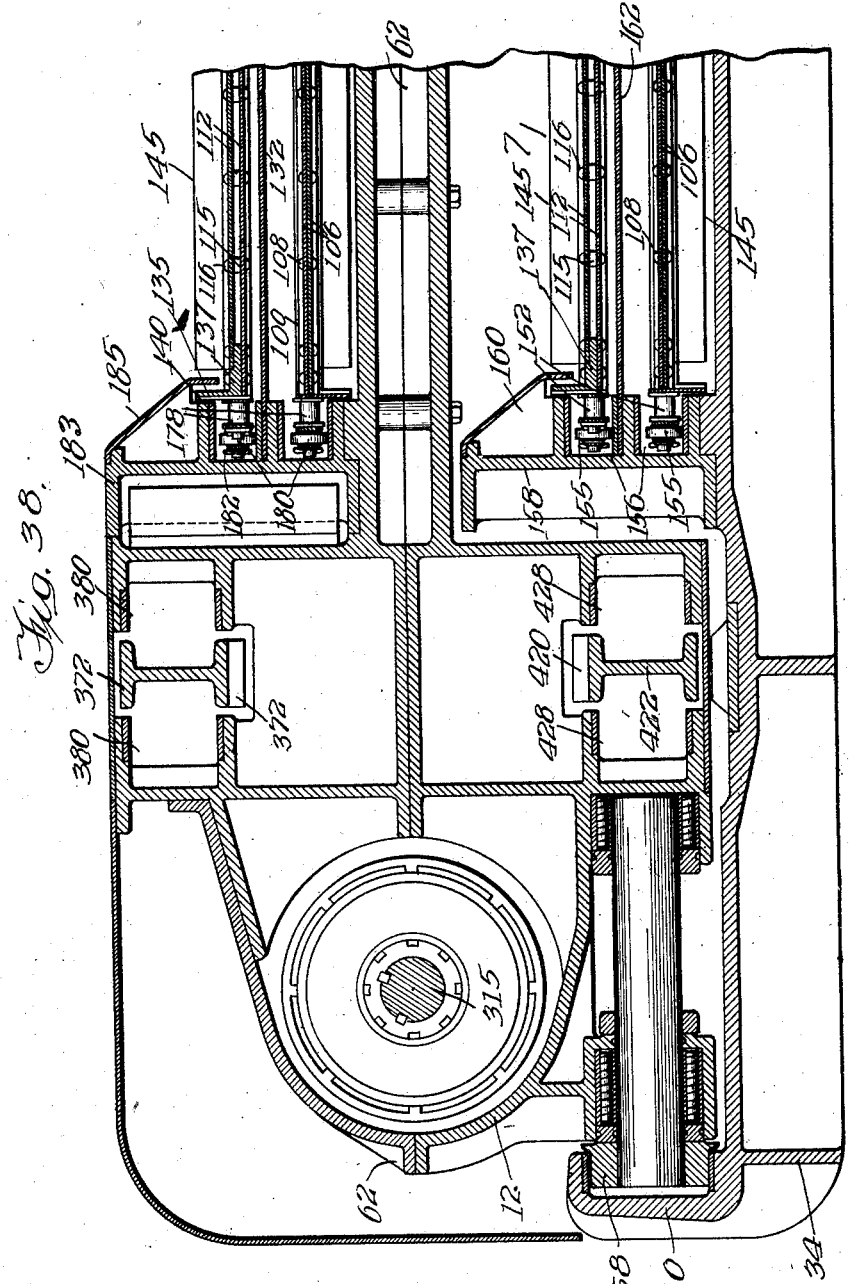

March 11, 1930.    J. H. BLAIR    1,749,968
EXCAVATING AND LOADING MACHINE
Filed April 26, 1926    45 Sheets-Sheet 35
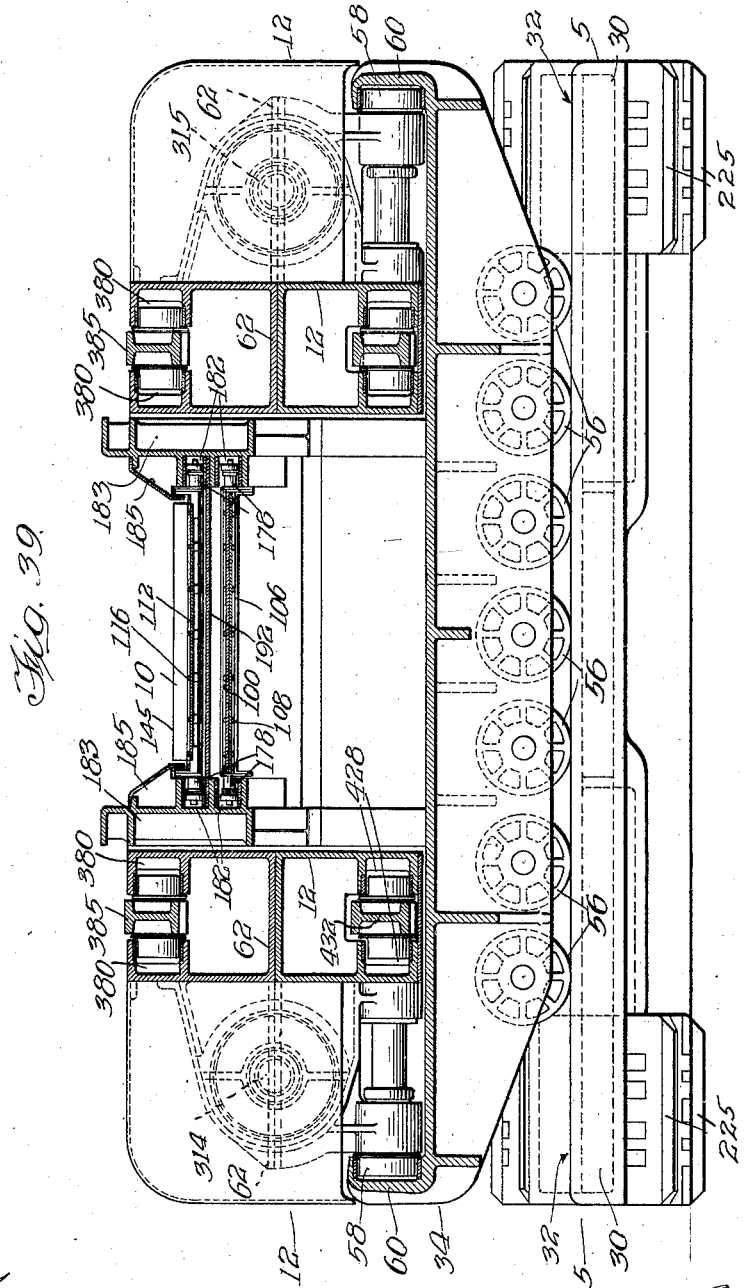

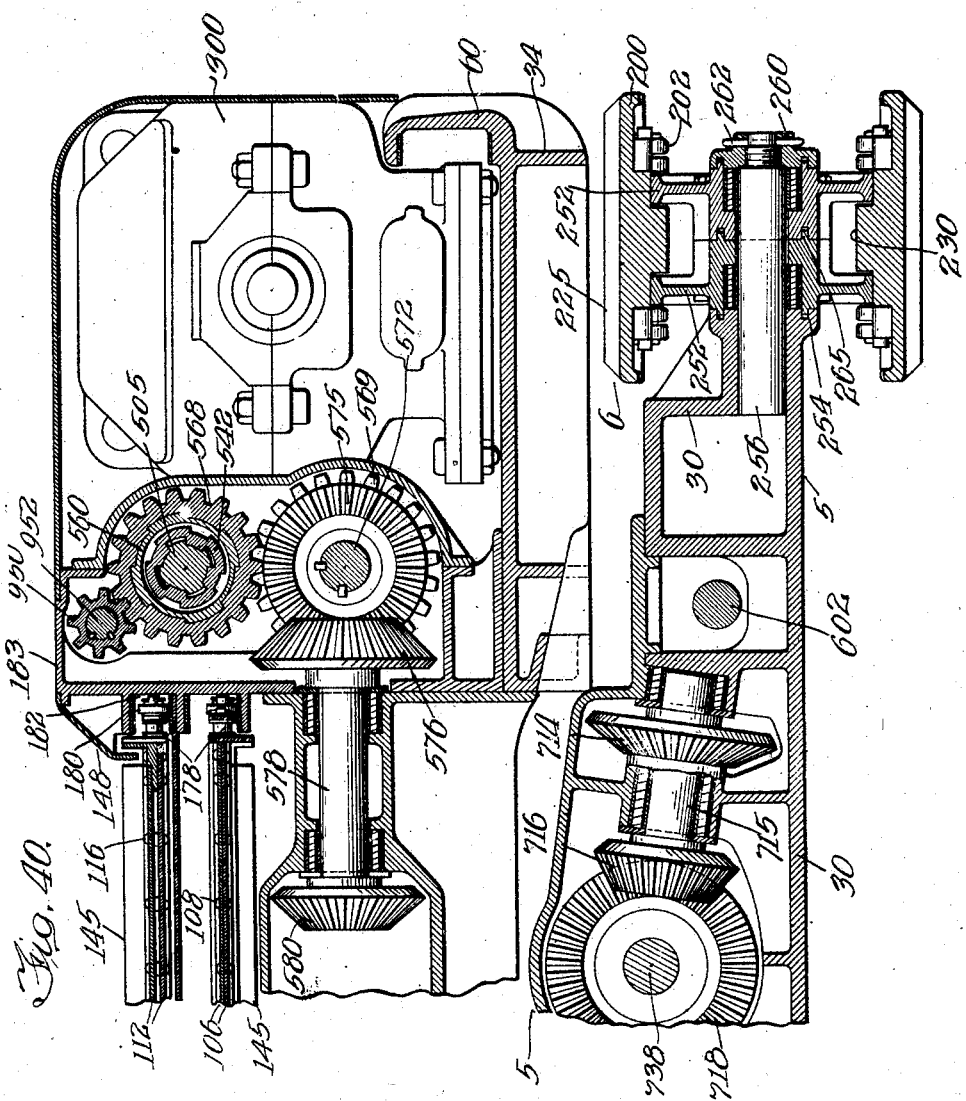

March 11, 1930.　　　　J. H. BLAIR　　　　1,749,968
EXCAVATING AND LOADING MACHINE
Filed April 26, 1926　　　45 Sheets-Sheet 37
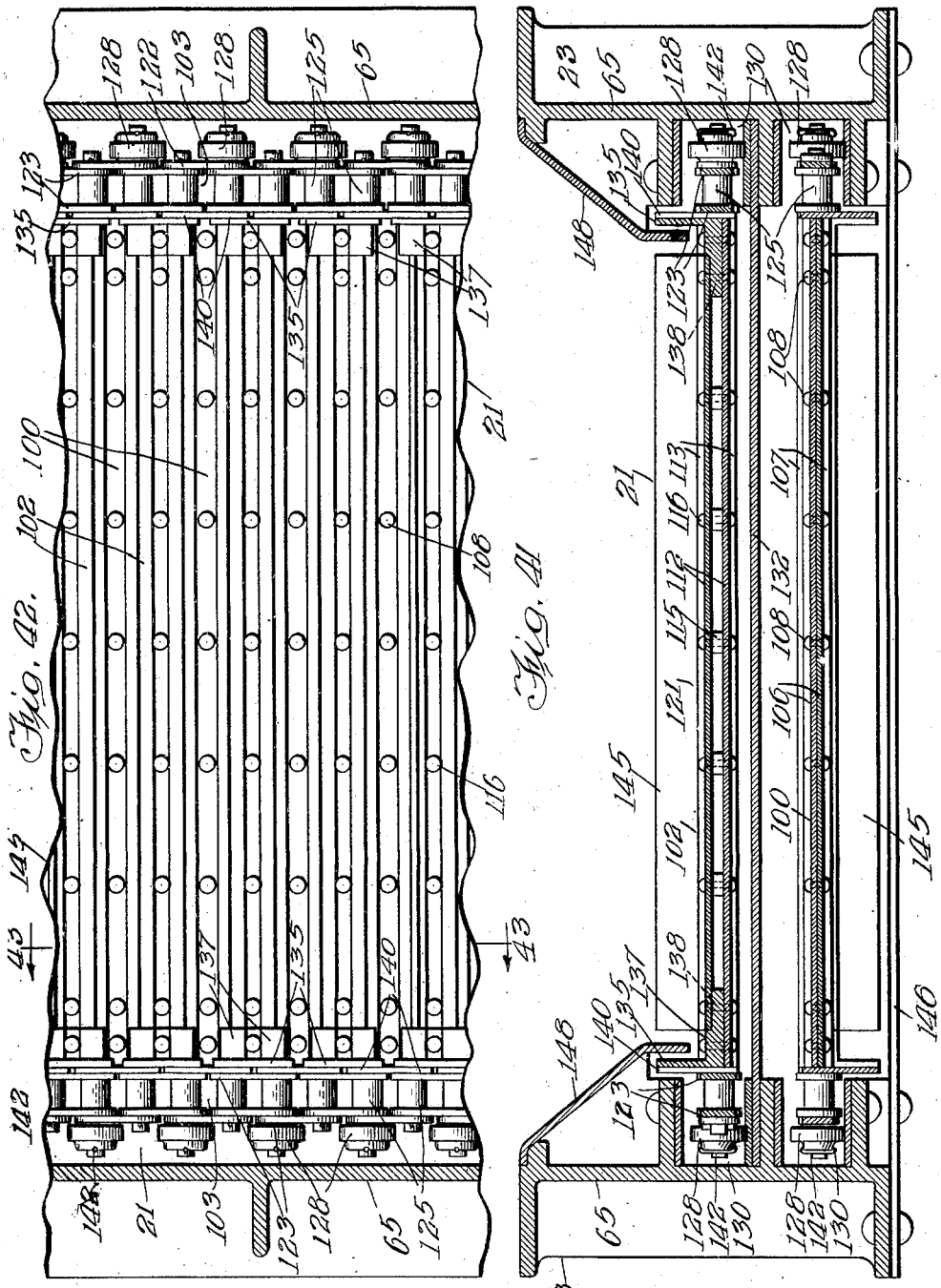

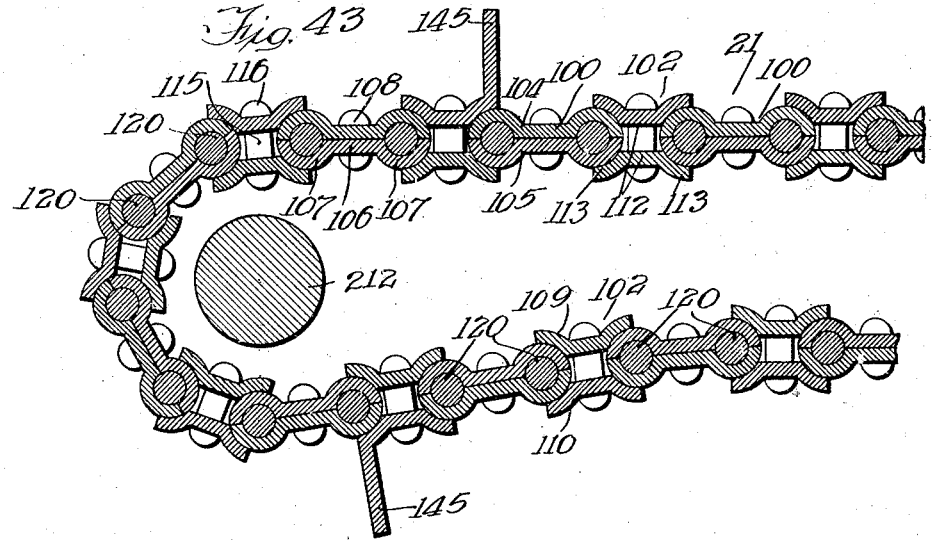
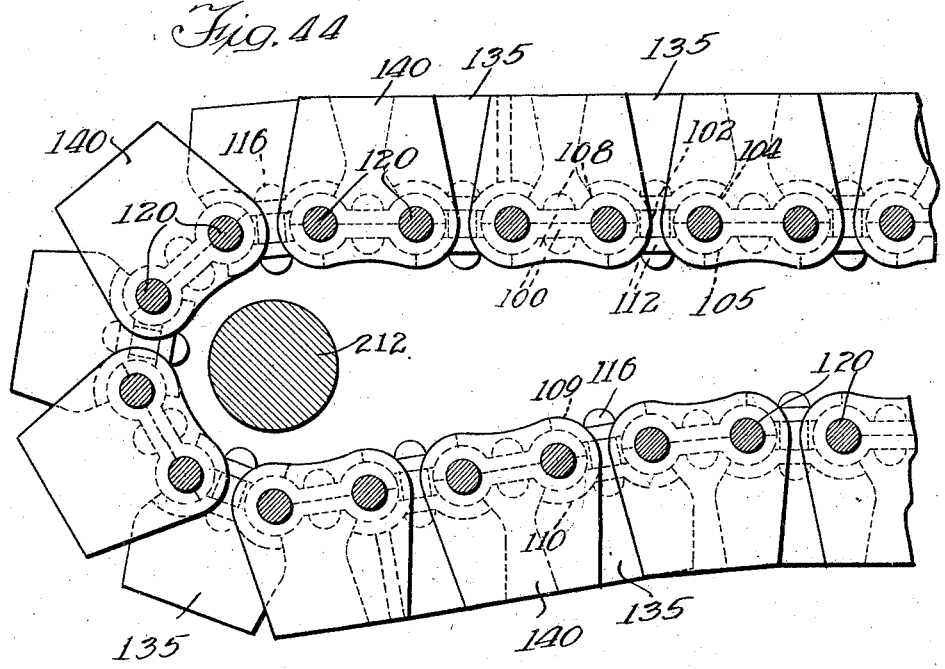

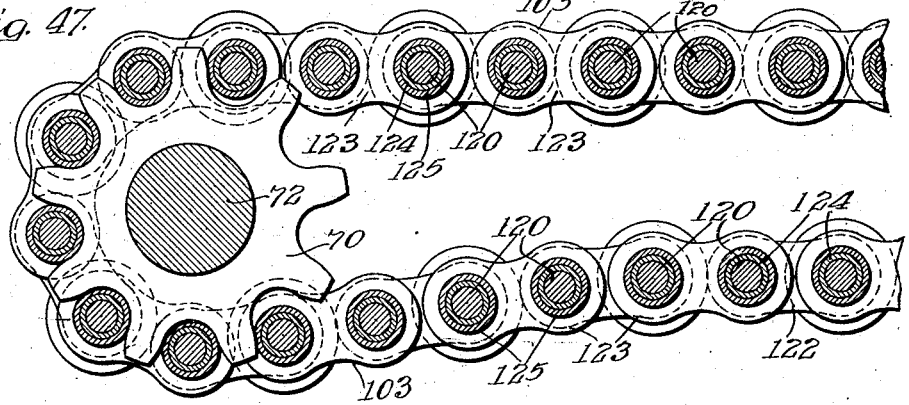
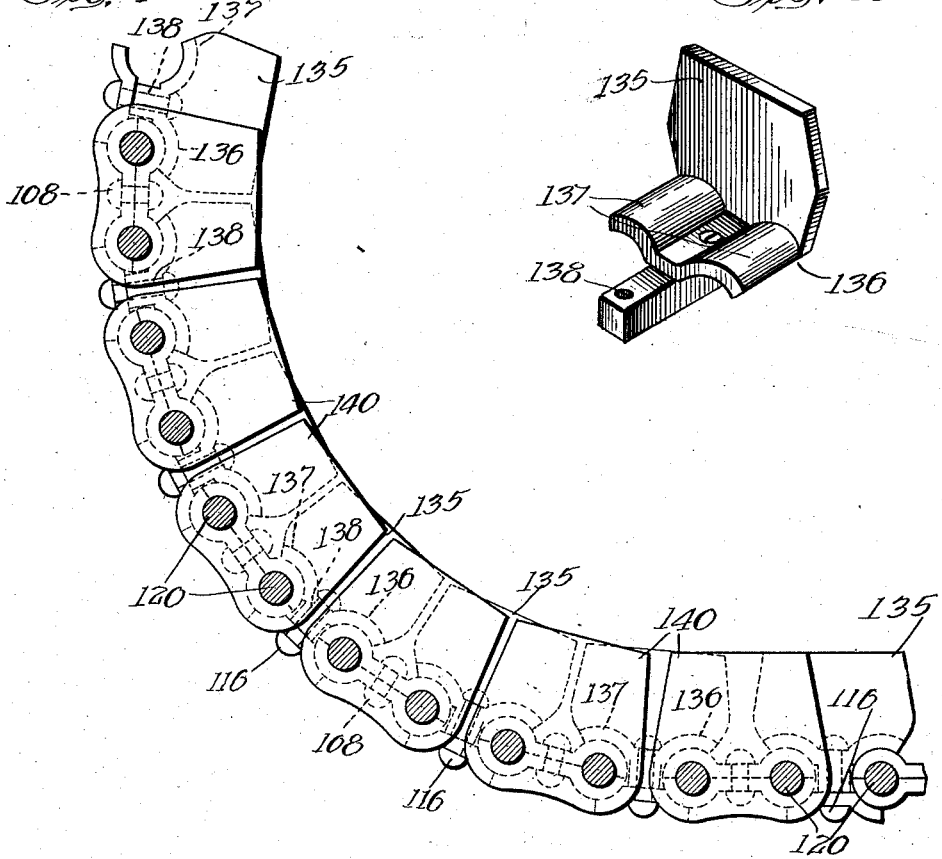

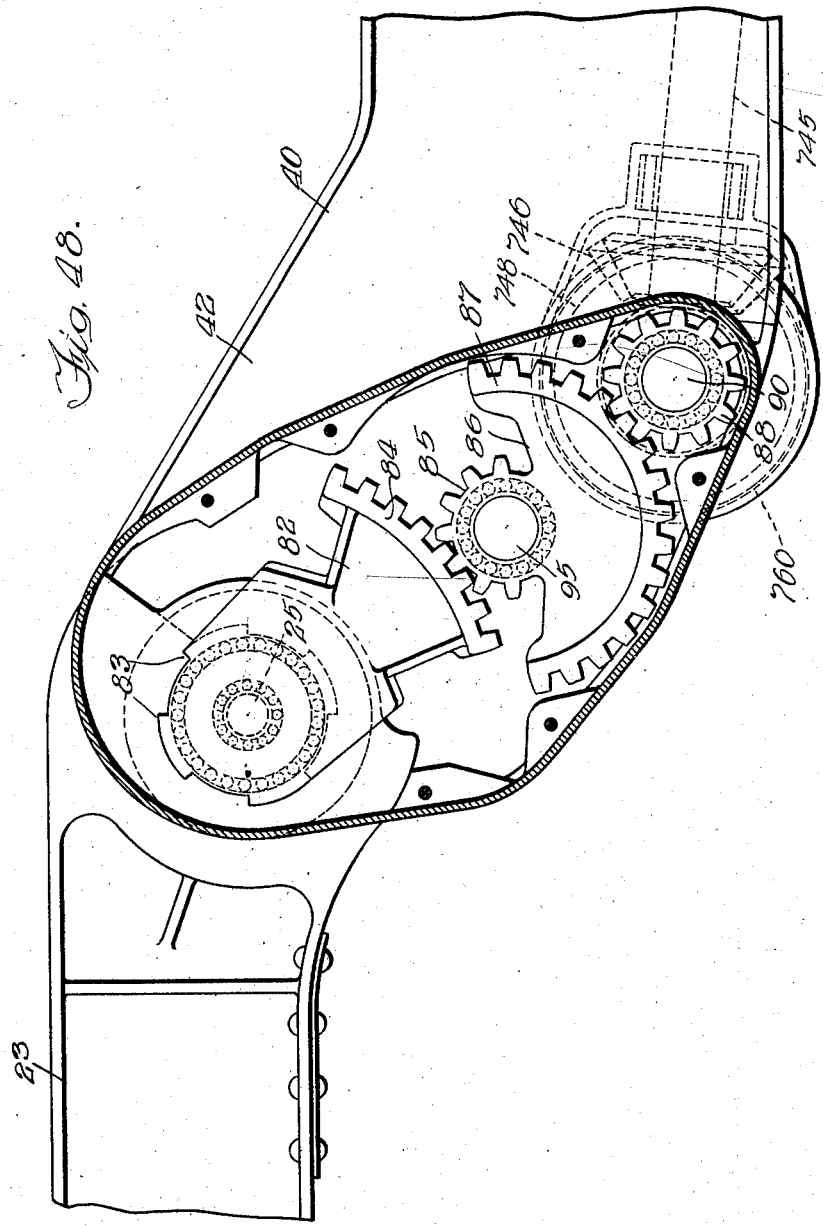

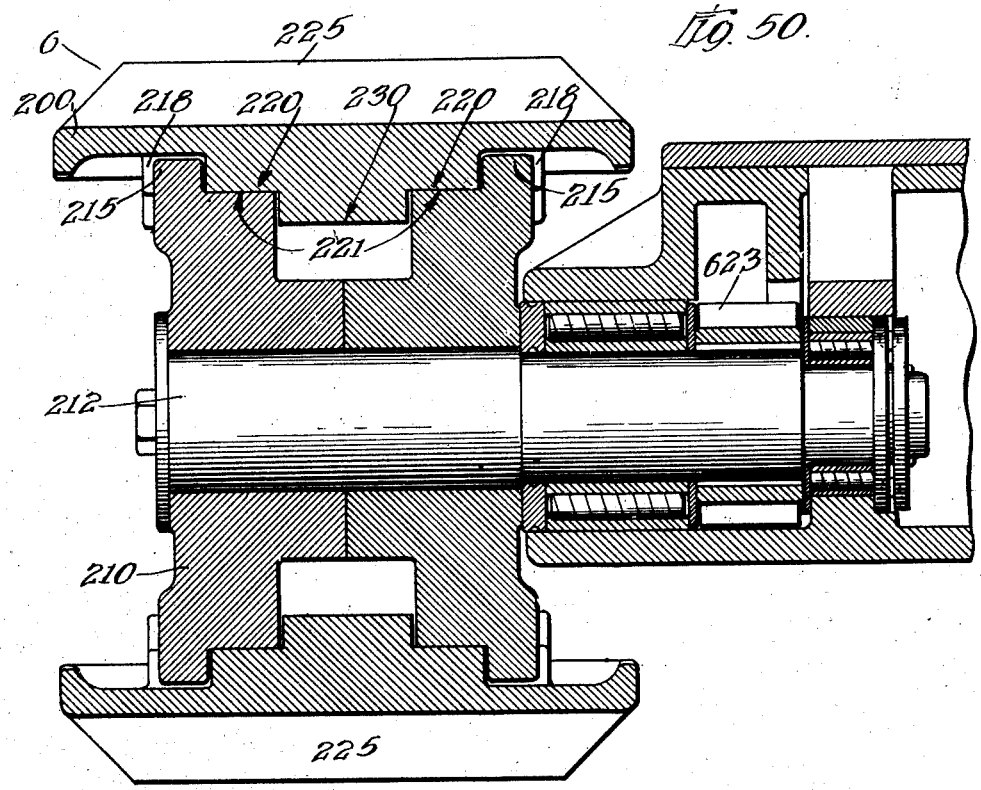
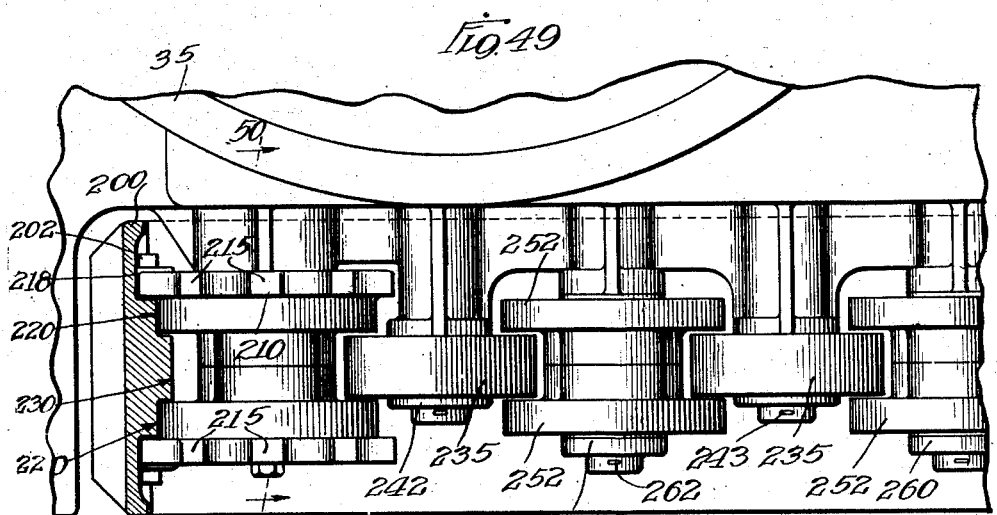

March 11, 1930.   J. H. BLAIR   1,749,968
EXCAVATING AND LOADING MACHINE
Filed April 26, 1926   45 Sheets-Sheet 42

Witnesses:
William P. Kilroy
Harry W. White

Inventor:
John H. Blair
By Brown, Boettcher-Dienner
Attys

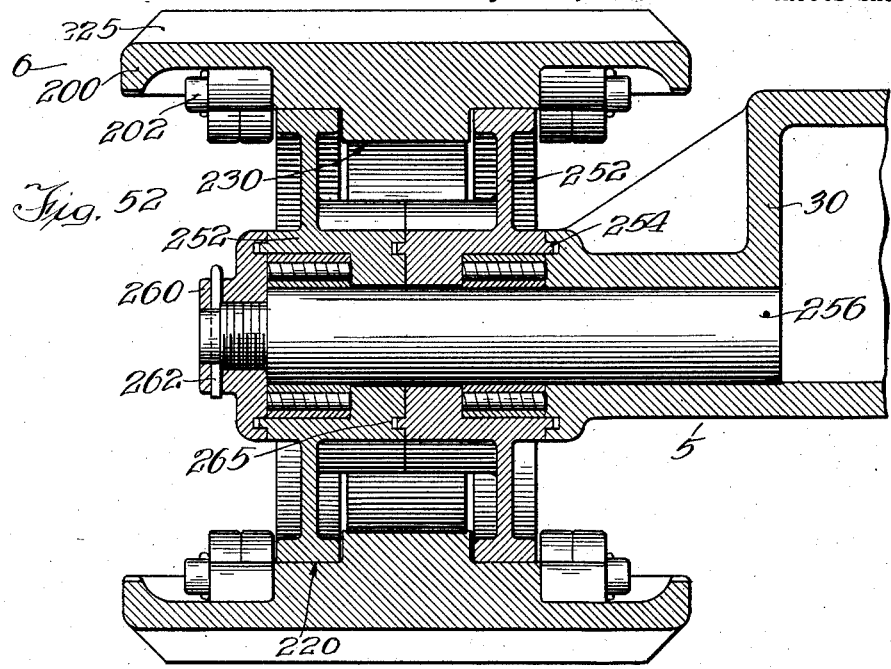
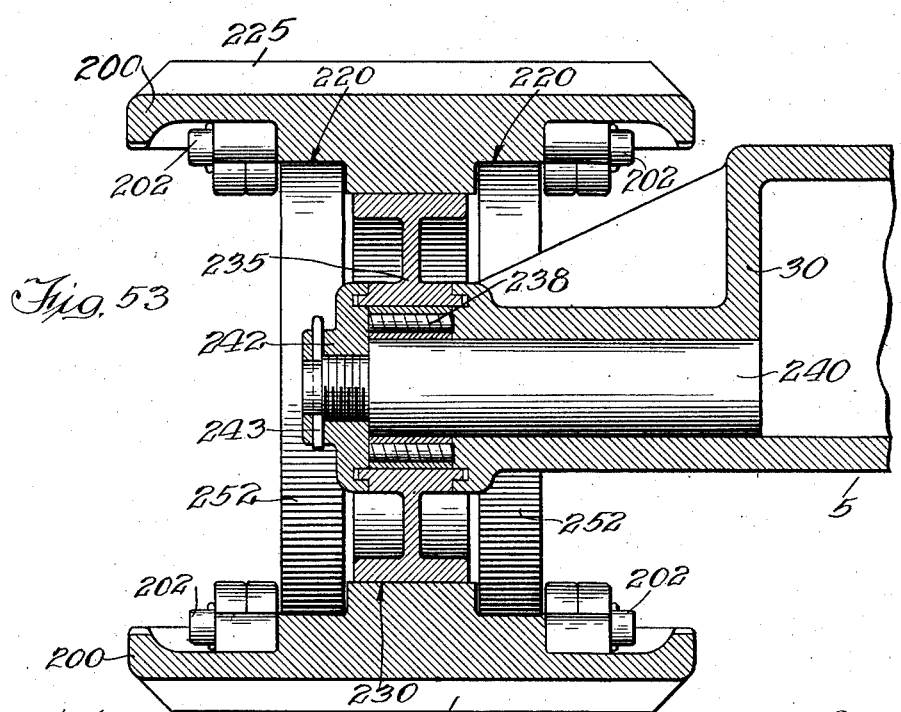

March 11, 1930.   J. H. BLAIR   1,749,968
EXCAVATING AND LOADING MACHINE
Filed April 26, 1926   45 Sheets-Sheet 44

Witnesses:
William P. Kilroy
Harry E. L. White

Inventor
John H. Blair
Brown Boettcher Dienner
By
Attys

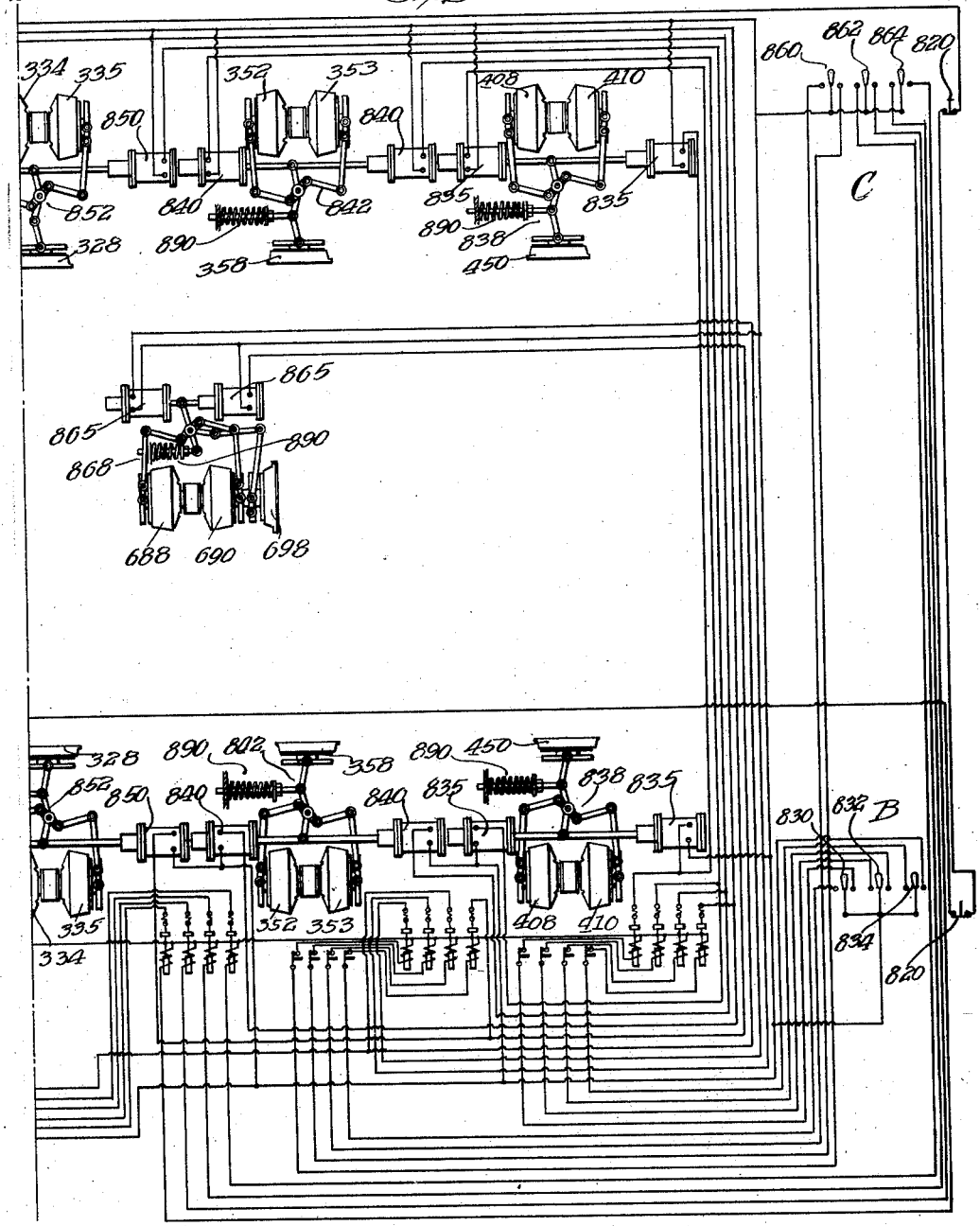

Patented Mar. 11, 1930

1,749,968

UNITED STATES PATENT OFFICE

JOHN H. BLAIR, OF CHICAGO, ILLINOIS

EXCAVATING AND LOADING MACHINE

Application filed April 26, 1926. Serial No. 104,527.

My invention relates to loading and excavating machines and, although not limited to any particular use or purpose, but adapted to be employed wherever found desirable, the present invention has particular utility in cutting tunnels, subways, and the like, and in various mine workings in which the head room and other clearances are limited.

I am aware that various swinging conveyors and bucket or shovel combinations have been provided in machines of this sort and that various attempts have been made to provide a machine which will operate in restricted places, but the machines which have been provided do not fully meet these ends and are not entirely satisfactory.

In the machines now in common use the bucket or shovel operates in at least some of the working positions thereof through a definite cycle. For example, the shovels of these machines commonly require a progressive movement through a definite orbit at all times, or the shovel and conveyor must both complete a cycle of movement to take up the material and deliver it to the conveyor.

I have observed that where the shovel or other material member must operate progressively through a definite orbit at all times, or where the shovel and conveyor must both complete a cycle of movement, even if in only some of the working positions of the shovel, the machine will not operate in restricted places as completely and satisfactorily as desired. There must always be sufficient clearance to complete the cycle regardless of whether or not the entire cycle would otherwise be necessary to take up the material and deliver it to the conveyor. For example, if the shovel takes up the material at the bottom of its orbital movement, there must always be sufficient overhead clearance, for example, to complete the cycle, whether or not the rest of the cycle would be necessary to complete the working operation. Where the conveyor and shovel must move together, even if only in some of the working positions of the shovel, and particularly where the conveyor and shovel both have a definite cycle of movement which must be completed, to deliver the material from the shovel to the conveyor, the use of the machine is again restricted to places where that complete cycle of movement may always be completed.

It is the object of my invention to provide an improved loading and excavating machine that will have greater utility and will better serve the purposes for which machines of this sort are intended, and particularly for use where the operating clearances are limited.

According to my invention I provide a machine in which the shovel or other material member is operable selectively throughout the entire range of operation of the machine. There is no definite cycle of movement of the material member, nor is there any definite cycle of movement of the conveyor and material member together in any of the operating positions of the material member. At the same time the shovel or other material member has a maximum range of working positions. It may be swung vertically or laterally, or it may be extended and retracted longitudinally. The shovel operates selectively to take up and deliver the material in any of the positions thereof, and the extension and retraction as well as the vertical and lateral swinging movements are all selective singly or in any desired combination.

In the preferred form of my invention I impart the selective movement to the material member, as well as the selective vertical swinging movement to the conveyor carrying the same, through a novel push and pull operation. The push and pull mechanism makes it possible to make the machine exceedingly compact vertically, and the push and pull members are always in tension or compression, providing a mechanism of great strength without great bulk for positively operating the shovel or other material member and the conveyor at all times.

In the particular embodiment of the invention which I have elected to describe, the swingable front conveyor delivers upon a main conveyor along the central part of the frame, and this main conveyor may, for example, deliver to a delivery conveyor section which is adapted to receive the material from the main conveyor and which may be swung up and down and laterally for delivering the material to any desired point. The front conveyor may be extended or retracted without interfering with the delivery from the shovel thereto or from the front conveyor to the main conveyor, and the rear part of the central main conveyor section may be adapted to be swung laterally about a pivot common with the forward part of the delivery section to permit moving the shovel laterally as well as vertically to any desired point.

I also provide for locking the various swinging parts of the machine against accidental swinging movement, and the extensible parts against accidental extensible movement, as where the machine is working on a grade, and I provide a machine which is simple and compact and which can be operated with facility and which is capable of expeditiously handling large quantities of materials.

Another object is the provision of an improved conveyor belt that is exceedingly flexible and will work upon a small sprocket and in restricted spaces, and which may be readily assembled and conveniently taken apart.

To acquaint those skilled in the art with the manner of constructing and practicing the invention, I shall now describe the same in connection with a specific loading and excavating machine embodying the invention.

In the drawings:—

Figures 1, 2 and 3 are parts of a side elevational view of the machine; (Figs. 1, 2 and 3 are to be laid beside each other from left to right with the line a—a of Fig. 1 on the line a—a of Fig. 2, and the line b—b of Fig. 2, on the line 6—6 Fig. 3 to make up a complete side elevational view of the machine);

Fig. 4 is a view similar to Fig. 3 showing the front extensible frame with the swingable front conveyor and associated material member in extended position;

Figs. 5, 6, 7, 8 and 9 are parts of a plan view of the machine on a somewhat enlarged scale; (Figs. 5, 6, 7, 8 and 9 are to be laid beside each other from left to right with the line c—c of Fig. 5 on the line c—c of Fig. 6, the line d—d of Fig. 6 on the line d—d of Fig. 7, the line e—e of Fig. 7 on the line e—e of Fig. 8, and the line f—f of Fig. 8 on the line f—f of Fig. 9 to make up a complete plan view of the machine);

Fig. 10 is a fragmentary plan view showing the lateral swinging movement of the delivery conveyor at the rear end;

Fig. 11 is a fragmentary plan view showing the lateral swinging movement of the front end;

Fig. 12 is a detail plan elevation of one of the tread plates;

Figs. 13, 14 and 15 are parts of a plan view of the intermediate base frame, partially broken away to reveal the driving mechanism; (Figs. 13, 14 and 15 to be laid beside each other from left to right with the line g—g of Fig. 12 on the line g—g of Fig. 13, and the line h—h of Fig. 13 on the line h—h of Fig. 14);

Figure 51:
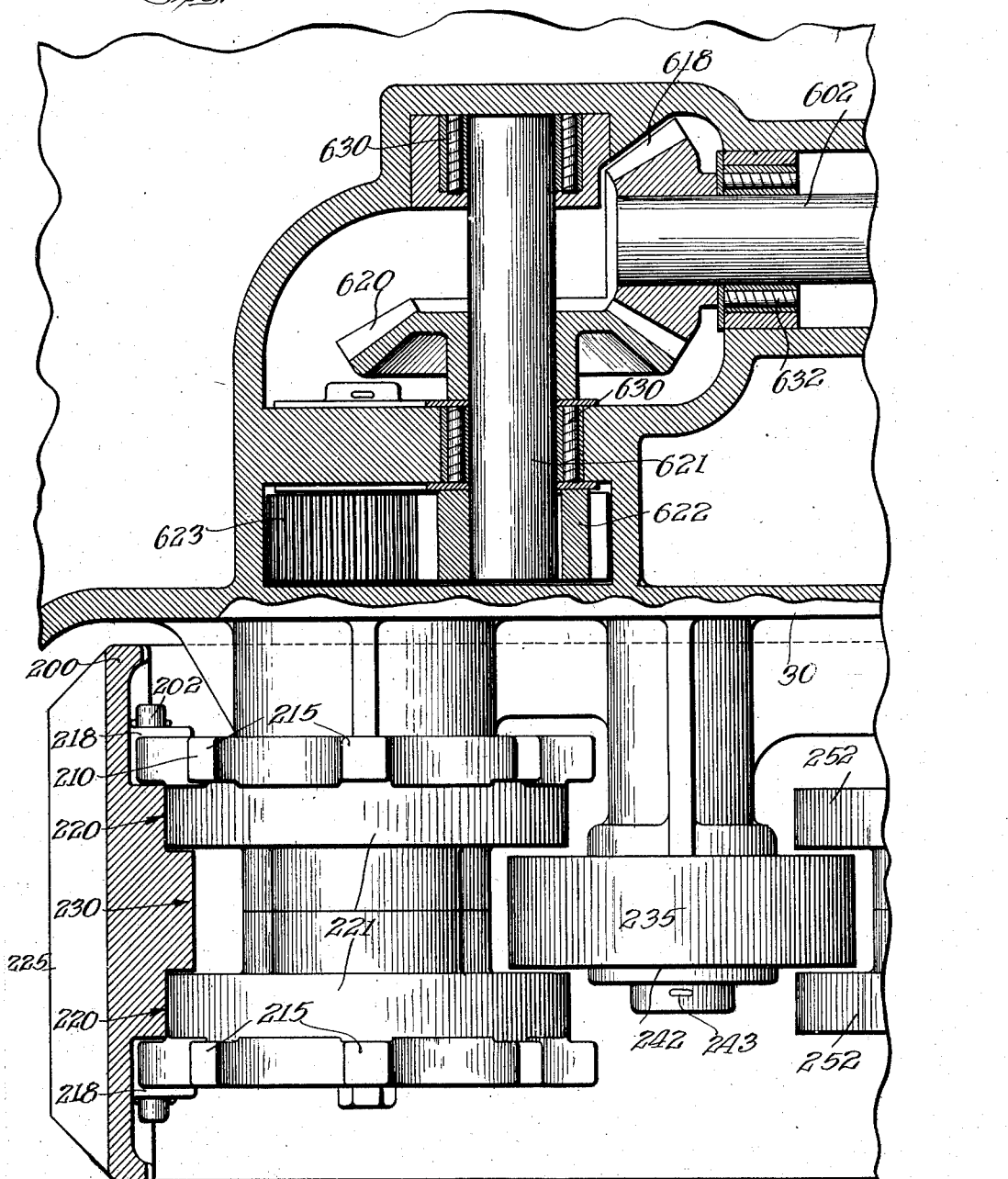

Figs. 16, 17, 18, 19 and 20 are parts of a longitudinal median section taken on the line 16—16 of Figs. 5 to 9; (Figs. 16, 17, 18, 19 and 20 to be laid beside each other from left to right with the line i—i of Fig. 16 on the line i—i of Fig. 17, the line j—j of Fig. 17 on the line j—j of Fig. 18, the line k—k of Fig. 18 on the line k—k of Fig. 19, and the line l—l of Fig. 19 on the line l—l of Fig. 20);

Figs. 21, 22 and 23 are parts of a horizontal section taken on the line 21—21 of Figs. 2 and 3; (Figs. 21, 22 and 23 to be laid beside each other from left to right with the line m—m of Fig. 21 on the line m—m of Fig. 22, and the line n—n of Fig. 22 on the line n—n of Fig. 23);

Figs. 24 and 25 are parts of a fragmentary vertical section taken on the line 24—24 of Figs. 5 to 8; (Figs. 24 and 25 are to be placed beside each other from left to right with the line o—o of Fig. 24 on the line o—o of Fig. 25);

Figs. 26, 27, 28, 29 and 30 are parts of a vertical section taken on the line 26—26 of Figs. 5 to 8; (Figs. 26, 27, 28, 29 and 30 are to be laid beside each other from left to right with the line p—p of Fig. 26 on the line p—p of Fig. 27, the line q—q of Fig. 27 on the line q—q of Fig. 28, the line r—r of Fig. 28 on the line r—r of Fig. 29, and the line s—s of Fig. 29 on the line s—s of Fig. 30);

Fig. 31 is a transverse section taken on the line 31—31 of Fig. 2 and showing the common king pin mounting about which the main front and rear delivery conveyors are swingable laterally;

Fig. 32 is a transverse section taken on the line 32—32 of Fig. 1;

Fig. 33 is a transverse section taken on the line 33—33 of Fig. 2;

Fig. 34 is a vertical section taken substantially on the line 34—34 of Fig. 31;

Fig. 35 is a transverse vertical section taken on the line 35—35 of Fig. 1;

Fig. 36 is a transverse section taken on the line 36—36 of Fig. 2;

Fig. 37 is a fragmentary transverse section taken on the line 37—37 of Fig. 3;

Fig. 38 is a fragmentary transverse section taken on the line 38—38 of Fig. 3;

Fig. 39 is a transverse section taken on the line 39—39 of Fig. 3;

Fig. 40 is a fragmentary transverse section through the side opposite that of Fig. 36 and taken on the line 36—36 of Fig. 2;

Fig. 41 is a transverse section through the delivery conveyor and its mounting taken on the line 41—41 of Fig. 1;

Fig. 42 is a fragmentary plan view of the conveyor;

Fig. 43 is a longitudinal section through the conveyor taken on the line 43—43 of Fig. 42, showing the portion of the conveyor trained over the sprocket at the outer end thereof;

Fig. 44 is a side elevational view of a pan conveyor embodying the invention with the connecting pins or rods in section;

Fig. 45 is a view somewhat similar to Fig. 44 showing the flexibility of the conveyor provided and the manner in which it permits re-curving;

Fig. 46 is a perspective view of one of the end pieces for the pan conveyor;

Fig. 47 is a longitudinal section through the sprocket or roller chain for driving the conveyor taken between the side links of the chain and showing the sprocket in co-operation therewith;

Fig. 48 is a fragmentary view partially in longitudinal section and showing the driving connection for swinging the rear delivery conveyor vertically;

Fig. 49 is a section through one end of the caterpillar tread showing the driving sprocket co-operating therewith;

Fig. 50 is an axial section through one of the driving sprockets for the tread taken on the line 50—50 of Fig. 49 and showing the driving spindle for the sprocket and the mounting thereof;

Fig. 51 is a fragmentary view somewhat similar to Fig. 49, but broken away and sectioned to show the driving connection to the tread driving sprocket;

Fig. 52 is an axial section through one of the outer tread guide rollers;

Fig. 53 is a similar view through one of the inner tread guide rollers; and

Figure 54:
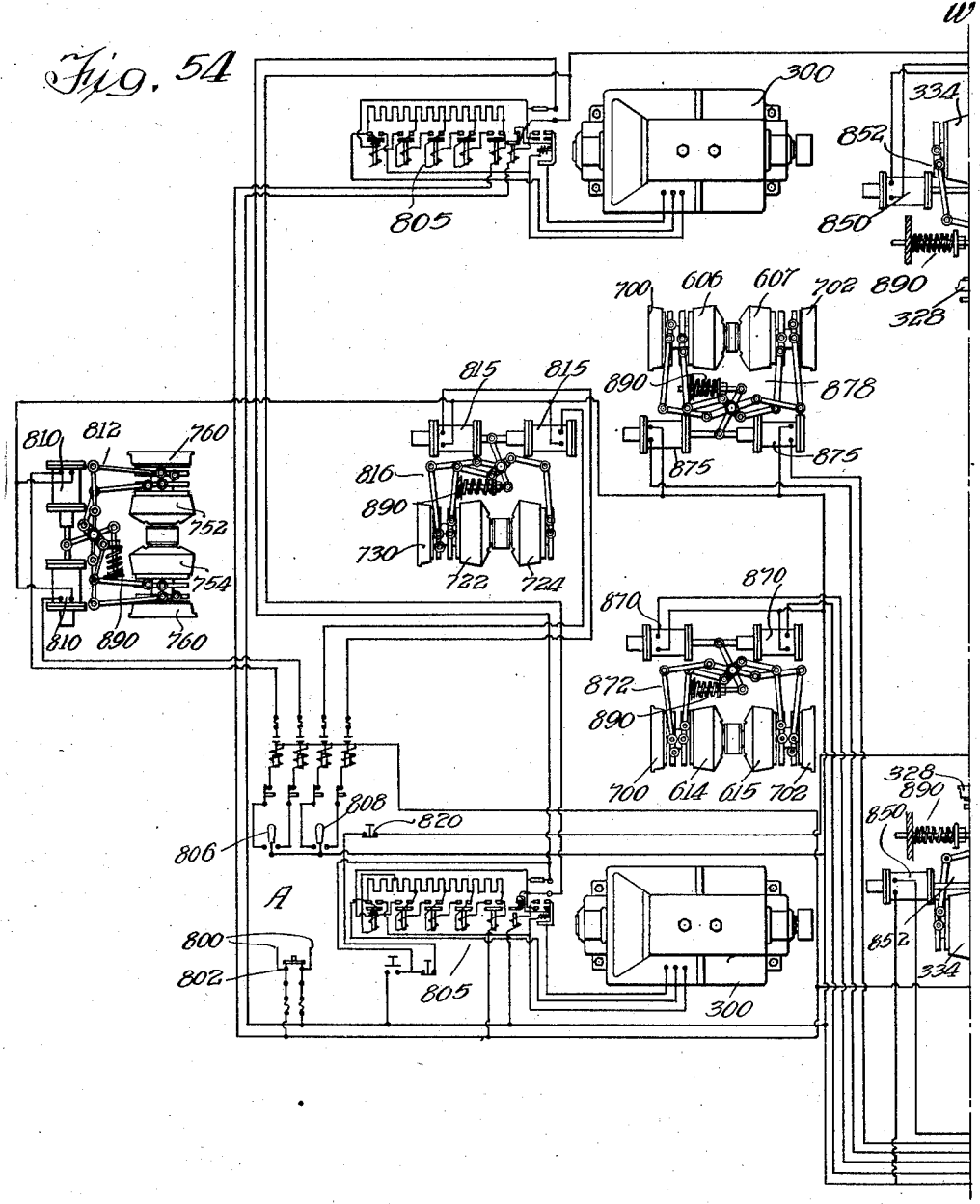

Figs. 54 and 55 are parts of a diagram of the electric circuits for operating the machine; (Figs. 54 and 55 are to be laid beside each other from left to right with the line w—w of Fig. 54 on the line w—w of Fig. 55).

Referring first to Figs. 1, 2 and 3 of the drawings, the machine comprises in general the main body part or base frame 5 mounted upon caterpillar treads 6, 6 for traveling over the ground and moving the entire machine to the desired position.

As shown in dotted lines in the side elevation of Figures 1, 2 and 3 and in dot and dash lines in the section of Figs. 16 to 20, the main conveyor section 7 lies along the central part of the main frame or truck 5 and this main conveyor 7 has a drop front 8 and a raised rear 9. The drop front 8 of the conveyor 7 receives material from the front conveyor section 10 which is mounted upon an extensible frame 12. The forward end of the frame 12 bears a shovel 13 suitably articulated at the front end of the swingable front conveyor arm to take up the material and deliver it to the front conveyor section 10.

The forward end of the front conveyor section 10 is adapted to be swung vertically up and down with the articulated arm 14 and shovel 13, as shown in dotted lines in Fig. 4, to permit shoveling the material from different depths or vertical positions. The shovel 13 may be swung selectively about its articulated or pivotal mounting 15 at the front or outer end of the arm 14. The shovel 13 may be swung selectively up or down through any range of movement about the pivot 15 to take up the material and deliver the same to the conveyor 10 without the necessity of a complete cycle or definite fixed orbital movement of the shovel about its pivot. This permits working the shovel, or other material member 13 at the forward end of the arm 14 selectively and through different ranges of movement about its pivot 15, which in turn permits working in restricted places and particularly up close to overhead roofs without the necessity of always allowing sufficient clearance for a complete cycle of movement of the material member 13.

The front conveyor carrying arm 14 is in turn pivoted or articulated at 18 on the front end of the extension frame 12 and is adapted to be swung selectively about the pivot 18 up and down in vertical directions. The arm 14 is adapted to be swung selectively up and down to position the material member 13 at any desired height or level, but like the material member 13 there is no definite cycle of movement required of the arm 14 in any of the working positions of the shovel 13, and it need not be swung from the working position of the shovel upwardly or to any other position to receive the material from the shovel. The shovel delivers the material to the conveyor 10 in any and all of its working positions without moving the arm 14 or the front conveyor 10, and the machine is thereby further adapted for working close to overhead roofs and up in corners and other restricted places.

I desire to point out at this time that although the material member 13 at the forward end of the machine is illustrated as a shovel or scoop, it is to be understood that the details of this material member may vary as desired, and in fact a cutter or other material member may be employed at this point. Therefore, while I have shown and shall describe this material member as a shovel, I intend, wherever I refer to this member in the specification or claims, as a material member, to include by such term any shovel, cutter, or other material member which it may be found desirable to employ at this point.

The frame 12 is extensible and retractable longitudinally of the machine, as shown in Fig. 4, to position the material member 13 at different points longitudinally of the machine. This extension and retraction is selective and the conveyor 10 by overlying and overlapping the main conveyor section 7 delivers the material from the front conveyor to the main or intermediate conveyor 7 in all of the extended and retracted positions of the front frame 12 and front conveyor 10. Again the shovel operates to deliver the material selectively to the conveyor 10 in all of the extended and retracted positions thereof without any accompanying vertical swinging movement of the conveyor 10, and without any definite cycle of operation of any of the parts.

The raised rear 9 of the main conveyor 7 overlies the drop front 20 of a delivery conveyor section 21 disposed at the rear of the machine and receiving the material from the main conveyor 7. The rear conveyor 21 has a conveyor arm 23 which may be swung up and down selectively in a vertical direction and the rear conveyor frame, together with the conveyor 21 is adapted to be swung laterally about a king pin 24 (Fig. 31), so that the material may be delivered from the machine to any desired vertical or lateral point. The pivot about which the rear conveyor frame 23 is adapted to be swung vertically is shown at 25 in Fig. 16. The intermediate conveyor 7, and front conveyor 10 swing as a unit about this pivot 24 to position the shovel or material member 13 in any desired lateral position. The swinging of the intermediate and front conveyors horizontally as a unit about the vertical pivot at the rear end of the intermediate conveyor gives a relatively wide range of lateral movement to the material member 13 with a minimum movement of the rear end of the conveyor 7, so that the conveyor 7 will always properly deliver to the conveyor 21 throughout the wide range of lateral movement of the material member 13. The king pin 24 forms a common pivot on the main frame or chassis for the rear end of the intermediate conveyor 7 and the frame associated therewith and for the front end of the delivery conveyor 21.

Having now described in a general way the main parts of the machine, I shall now proceed to a detailed description of the various parts or mechanisms starting first with the main frame or body part 5 and the particular tread or supporting and transporting mechanism therefor shown.

The main frame or body part 5 comprises a base casting 30 having an arcuate track 32 (Figs. 3, 4, 15 and 30), for the laterally swingable frame 34, and a track 35 at its rear end for the laterally swingable rear or delivery conveyor frame 23, 23.

Near its rear end and centrally between its opposite sides the base casting 30 carries the upright king pin 24 (Figs. 17 and 31). The king pin 24 is shown in the form of a hollow post integral with a head casting 38 (Figs. 16, 17 and 31), and it may be journalled through suitable bearings, as shown in the base casting 30. The head casting 38 forms the laterally turning head for the rear delivery conveyor and the rear frame part 40 (Fig. 48) of the rear delivery conveyor frame comprises side plates 42 (Figs. 17, 31 and 48), bolted or otherwise secured to the rear conveyor head 38 to be swung laterally by turning said head about the axis of the bolt or king pin 24.

The rear vertically swingable part or arm 23 is pivotally mounted or articulated upon a cross shaft 25 at the rear end of the arms 42 to be swung up and down vertically about the axis of the shaft 25.

Revolvably mounted upon the king pin 24 below the head casting 38 is a second head casting 50 having a pair of forwardly extending arms 52, as shown in Fig. 13, to which the rear end of the main intermediate conveyor frame 34 is attached at 54, as shown in Fig. 2.

The main intermediate conveyor frame 34, which is revolvable laterally at its rear end upon the king pin 24, carries at its front end, as shown in Figs. 3, 19, 30 and 39, a plurality of rollers 56 which operate upon the arcuate track 32 at the forward end of the base casting 30. These rollers 56 support the front end of the intermediate frame 34 upon the base frame 30 and provide a free lateral swinging action of the frame 34 thereon.

Overlying the laterally swingable main conveyor frame 34, and mounted for sliding movement thereon so that it may be extended from the forward end of the frame 34 and retracted longitudinally thereof, is the extensible frame 12. This frame 12 carries along its opposite longitudinal sides suitable guide rollers 58 (Figs. 36 and 39), which guide rollers 58 bear in suitable channel tracks 60 formed longitudinally along opposite sides of the frame 34. This roller mounting of the frame 12 on the frame 34 facilitates longitudinal movement of the frame 12 and extension and retraction of the front conveyor 10. The castings or parts making up the frame 12 are preferably separated or parted as shown, for example, at 62 to permit disposing the various gearing and cross shafts therethrough, as will be hereinafter pointed out.

The front vertically swingable arm 14 comprises a pair of side members 183 (Fig. 39) pivoted for vertical swinging movement. as already pointed out, upon a cross shaft 18 at the forward end of the extensible frame 12. The shovel or other material member 13 is, as already pointed out, pivoted or articulated upon a cross shaft 15 at the front end of the arm 14.

The particular shovel 13 shown has lateral side walls 66 and a scoop bottom 67 with blades 68 along the outer or front edge thereof. As already pointed out, the particular details of this material member may be varied, or a cutter or any other suitable or desired material member may be employed at this point.

I shall now describe the particular conveyor system shown.

The rear conveyor 21 comprises an endless belt conveyor trained at its rear end about sprockets 70 on a cross shaft 72 (Figs. 16 and 32). The opposite ends of the cross shaft 72 may be journalled in bearings 73 at the rear end of the vertically swingable arm 23.

The opposite or forward end of the rear conveyor 21 is trained about sprockets 74 on a cross shaft 75, as shown in Fig. 33. The cross shaft 75 is journalled at its opposite ends in bearings 76 in the laterally swingable part 40 of the rear conveyor frame, and this cross shaft 75 forms the driving shaft for the rear conveyor, power being transmitted to this shaft from a shaft 77 (Fig. 33) through co-operating bevel gears 78 and 79.

Between its front and rear ends the rear conveyor 21 is trained over and supported by guide rollers or sprockets 80 (Fig. 35) on the cross shaft 25. The cross shaft 25 is, as already pointed out, carried by the rear end of the laterally swingable vertically fixed part 40 of the rear conveyor frame, so that as the vertically swingable part or arm 23 of said frame is swung up and down about the shaft 25, the rear end of the conveyor 21 may swing up and down with it about the rollers or sprockets 70. In the lateral swinging movement of the entire rear conveyor frame the conveyor 21, of course, swings laterally therewith, the close proximity of the pivot 24 at the forward end of said frame permitting a wire range of lateral movement of the rear end with a relatively small lateral movement of the front end of the rear conveyor frame.

Freely journalled upon each of the opposite ends of the shaft 25 (Figs. 35 and 48) is a segment arm 82. These arms 82 are keyed at 83 to swing the frame 23 vertically as the arms 82 are turned about the shaft 25. The segment arms 82 have teeth 84 which mesh with teeth 85 on intermediate segment arms 86, which arms 86 in turn have outer teeth 87 which mesh with pinions 88 on the cross shaft 90 for raising and lowering the rear end of the rear conveyor frame. The driving connection between the shaft 90 and the arm 23 thus includes a relatively great reduction and provides for securing a power multiplication, and a powerful application of the power to the arm 23 for raising and lowering the same. The cross shaft upon which the arms 86 are journalled is indicated at 95 in Figs. 16, 35 and 48.

The construction of the conveyor 21 is shown in detail in Figs. 42 to 47. It comprises alternate slats 100 and 102 connected along their adjacent edges through knuckle and socket joints and provided along their opposite ends with sprocket chains 103, which sprocket chains 103 form the parts of the conveyor which are trained about and engage with the driving and idler sprockets.

Whereas the slats 100 may, of course, be formed in one piece, if desired, these slats each preferably comprising a pair of stampings, forgings, or rollings 104 and 105 (Fig. 43), having flat intermediate portions 106 and rolled edges or margins 107. The substantially flat intermediate portions 106 are securely fastened together, as by means of rivets 108. The rolled margins 107 are of semi-cylindrical formation and are complimentary to form hollow cylindrical beads or knuckles along each of the opposite edges of the slats 100.

The slats 102 are likewise preferably of two piece formation comprising a pair of stamping, forgings, or rollings 109 and 110, each having substantially flat intermediate portions 112 and outwardly rolled marginal edges 113. The cylindrical beads or knuckles along the opposite edges of the slats 100 fit in the sockets provided by the rolled margins 113 of the slats 102, and provide a ball and socket joint between the slats. The substantially flat portions 112 of the slats 102 are spaced by suitable spacers or fillets 115 interposed between them, and the two pieces of each of these slats 102 are securely fastened together, as by means of rivets 116, the shanks of which may extend through the spacers or fillets 115.

The slats 100 and 102 are connected together by cross rods or pins 120 and the sprocket chains 103 along each of the opposite edges of the conveyor. The rods or shafts 120 extend through the hollow knuckles 107 and project at their opposite ends from the opposite sides of the conveyor. These projecting ends of the shaft 120 extend through the side links 122 of the sprocket chains 103 and through the spacer sleeves 124 between and spacing the side links 123 and the wear sleeves 125 which surround the spacer sleeves 124, as shown in Fig. 47, and co-operate with the driving and idle sprockets.

Outwardly of the sprocket chains 103 alternate shafts or rods 120 carry guide rollers 128. These guide rollers 128 operate in channel tracks 130 on the sides of the front and rear arms 40 and 23 of the rear conveyor frame, as shown in Fig. 41. The channel tracks 130 may be provided with replaceable wear surfaces, as shown in Fig. 41, and continuous web plates 132 and 133 are preferably provided between the upper and lower runs of the conveyor.

The particular conveyor shown is of the pan type in which case each end of the conveying sides of slats 102 is provided with an end flange 135. Although, of course, these end flanges 135 could be formed integrally with the slats, they are preferably carried by separate end pieces 136, as shown in Fig. 46. These end pieces 136 have curved bases 137 which supplement the socket portions 113 on one side, and are fastened through suitable apertures 138 to the supplemental slat members, the ends of which extend out for attachment thereto, as shown in Fig. 41.

Alternately disposed with respect to the side flanges 135 are the side pieces 140 which are mounted upon the ends of the rods or shafts 120, and at all times bridge the spaces or openings between the flanges 135. Each side piece 140 overlaps two adjacent side pieces 135, and these side plates 140 have butt engagement with the ends of the slats of the conveyor and are interposed between them and the adjacent links 123 of the sprocket chains 103, as shown in Fig. 42. Cotter pins 142, inserted through the ends of the shaft 120, secure them in place and the entire conveyor may be conveniently disconnected by removing the cotter pins along one side of the conveyor, and withdrawing the shaft 120. This permits conveniently increasing or decreasing the length of the conveyor and the resulting conveyor construction is exceedingly flexible, so that it will go around or work on an exceedingly small sprocket and in a small and compact space.

The side plate construction provides a pan conveyor without in any way decreasing the flexibility thereof. The conveyor is thus admirably adapted to work from the drop front to the raised rear along the tracks 130, and it is even adapted to recurve upon itself, as shown in Fig. 45. In working around a small sprocket, as shown in Fig. 44, the side plates may separate slightly, but the overlap will always be sufficient to hold the material in place upon the conveyor. Of course, the pan construction may be omitted, simply by omitting the side plates and an apron conveyor thus provided in the same manner. Suitable flights 145 may be provided on the slats 102 at the desired intervals for holding the materials where the conveyor is tilted or inclined, and for moving the material with the conveyor as well understood in the art. Suitable tie plates 146 extend across and bind the sides of the rear conveyor frame together, as shown in Fig. 41. The tracks and sprocket chains along the opposite sides of the conveyor 21 may be covered by suitable overhanging aprons 148, as shown in Figs. 32, 33 and 41.

The intermediate main conveyor 7 may be made up similar to the conveyor 21 and it is trained about and supported at its rear end upon a cross shaft 150 with the sprocket chains 152 along its opposite edges, as shown in Figs. 36, 37 and 38, in engagement with driving sprockets 153 fixed on the shaft 150, as shown in Fig. 21, the shaft 150 forming the driving shaft for the main intermediate conveyor. Like the rear conveyor, the main intermediate conveyor has guide rollers 155 on the projecting ends of its connecting pins or shafts, and these guide rollers 155 operate in channel tracks 156 formed on side members 158 provided for the main intermediate conveyor 7 on the laterally swingable intermediate frame 34, as shown in Figs. 36, 37 and 38. The channel tracks 156 may be provided with renewable wear surfaces as before, and the side members 158 may also, as before, be provided with overhanging aprons 160 covering these tracks and the sprocket chains 152 along the opposite edges of the conveyor 7. A continuous web plate 162 may extend between the upper and lower runs of the conveyor 7. The cross web 162 extends transversely or crosswise between the side members 158 and may be carried thereby, and the tracks 156 are inclined at 165 (Fig. 17) to incline the drop front of the main conveyor 7 up to the raised rear 9 thereof.

The front end of the conveyor 7 is trained about suitable sprockets (not shown), for example, on the cross shaft 168 (Fig. 19). This cross shaft 168 may have a suitable take-up device shown diagrammatically at 170 in Fig. 19 for tensioning or loosening the conveyor 7, as well understood in the art. The rear conveyor 21 may have a similar or any other suitable tensioning or take-up device.

The rear end of the front conveyor 10 is trained about and carried by a cross shaft 175 with the sprocket chains along its opposite edges in driving engagement with suitable sprockets 176 fixed on the cross shaft 175 (Fig. 21), which cross shaft 175 forms the main drive shaft for the front conveyor. The cross shaft 175 is journalled in suitable bearings on the front extensible frame 12 of the machine.

The sprocket chains along the opposite edges of the front conveyor are indicated at 178 in Figs. 36, 37 and 38, and the extending ends of the connecting pins or shafts of this front conveyor carry suitable guide rollers 180, which guide rollers 180 operate in suitable channel tracks 182 formed on the sides of suitable side members 183 provided on the extensible frame 12 for the front conveyor. The tracks 182 and the sprocket chains 178 along the sides of the conveyor 10 may, as before, be covered by suitable overhanging aprons 185 along the tops of the inner sides of the side members 183.

The front or outer end of the front conveyor 10 is trained about and supported by the cross shaft 15 upon which the shovel or material member 13 is pivoted or articulated. Suitable sprockets may, of course, be provided on this shaft for co-operation with the sprocket chains along the sides of the conveyor.

The upper or front conveyor 10 may be provided adjacent the shaft 175 with a suitable tensioning or take-up device designated diagrammatically at 190 in Figs. 17 and 18. Extending between the side members 183 and between the upper and lower runs of the front conveyor 10 is a horizontal cross web 192, and extending between the sides of the swingable front arm 14 is a cross web 193 which, in effect, forms a continuation of the cross web 192 on the other side of the pivot 18, as shown in Figs. 19 and 20. The tracks 182 along the side members 183 of the extensible frame 12 extend substantially horizontally, and the swingable front arm 14 is provided with tracks inclined, as indicated at 195 in Figs. 19 and 20, from the front end of the conveyor 10 toward the tracks 182. The inclined tracks along the arm 14 form continuations of the tracks 182, and the continuous conveyor is thereby at all times properly guided from its vertically swingable front end to its rear end about the shaft 175. The flexibility of the conveyor, especially with the construction employed, which is preferably similar to that described in connection with the rear conveyor 21, permits its front or forward end to swing up and down vertically with the vertically swingable arm 14 about substantially the shaft 18, and the swingable front portion of the front conveyor is guided properly along the extensible frame 12 to the rear end thereof at all times by the track arrangement thus provided. It is to be understood that the rear horizontal raised portion of the front conveyor 10, as well as the front swingable portion, swings as a unit with the entire intermediate conveyor 7 and with the extensible frame 12 and main laterally swingable frame 34 laterally about the king pin 24 to move the material member 13 through a wide range of lateral positions.

The entire machine is supported upon and moved under its own power, as will be hereinafter pointed out, from place to place by the underlying caterpillar treads 6, 6, one along each side thereof.

While the treads 6, 6 may of course be varied the particular treads shown each comprises a plurality of transverse tread plates 200 pivotally connected (Figs. 49 to 53) at 202. Each of the treads shown is driven at both its front and rear ends providing, in effect, a four wheel drive, as shown in Figs. 13, 14 and 15. One of the rear driving sprockets is shown at 210 in Fig. 51, and the driving sprockets at the other four corners are substantially the same with a slight variation in the driving connection thereto at the front to provide a drive which will be cumulative at the front and rear. The tread driving sprockets 210 may be split for assembly, as shown in Figs. 50 and 51, with both halves keyed or otherwise fixed on the tread driving spindle 212 to turn therewith. Each tread is trained at each of its opposite ends about one of these driving sprockets 210 and each half of each sprocket has teeth 215, which engage with meshing teeth 218 on the tread plates 200 to drive the tread by the rotation of the sprockets 210. Just inwardly of each set of teeth 218 each tread plate 200 has a bearing portion 220, and these bearing portions 220 bear on co-operating reduced bearing portions just inwardly of each set of teeth 215 on the sprockets 210. These co-operating bearing portions on the sprockets 210 are designated at 221 in Figs. 50 and 51.

The outer surface of each tread plate 200 may have suitable ground engaging lugs or cleats 225, and on the inner surface inwardly of the bearing surfaces 220 is an intermediate or central bearing surface 230. These intermediate or centrally disposed bearing surfaces 230 on the tread plates 200 bear upon and are guided over guide rollers or wheels 235.

A plurality of these guide rollers 235 are spaced longitudinally along the side of the machine, as shown in Figs. 2, 3 and 49. As shown in Fig. 53, each of these rollers 235 is rotatably journalled through suitable bearings 238 upon spindles 240 suitably secured in the base castings or base frame 5. The hubs of the rollers 235 may have annular grooved engagement with the hubs of the frame 5 in which the spindles 240 are secured, and similar co-operation with closure caps 242 covering the outer ends of the bearings 238. The caps 242 may be secured against accidental displacement, as by means of suitable pins 243.

Disposed along the side of the base frame of the machine, and alternating with the guide rollers 235, are a second series of somewhat larger diameter guide rollers 252 which bear on the bearing surfaces 220 of the tread plates 200, as shown in Figs. 52 and 53. The guide rollers 252 are preferably split for assembly, and they are journaled through suitable bearings 254 upon spindles 256 suitably secured in the base casting 5. An end cap 260 secured upon the reduced threaded end of the spindle 256, as by means of a pin 262, closes off the outer end of the outermost one of the two bearings 254. The adjacent ends of the hubs of the two parts of the roller 252 have inter-engagement at 265, as shown in Fig. 52, and as shown in Figs. 49 and 51, the two halves of the roller 252 overlap the rollers 235.

The rollers 235, by their alternate co-operation with the bearing surfaces 230 of the tread plates 200, together with the alternate co-operation of the staggered rollers 252 and sprocket roller portions 221 with the bearing surfaces 220, guide the treads 6 and hold them properly positioned at all times. The rollers 252, by their disposition at opposite sides of the intermediate or central bearing surfaces 230, hold the tread members positively against lateral displacement. The tread plates are adapted to be readily disconnected or disjointed for the purpose of increasing or decreasing the length of the tread by removing the pivotally connecting pins 202 and removing from or adding to the number of tread plates employed.

For the purpose of taking up any slack in the caterpillar treads 6, and for adjusting the tension of said treads, suitable take-up devices 275 are provided, one for the driving sprocket at the front end of each tread, as shown in Figs. 15 and 25. These take-up devices 275 will be described more in detail presently in connection with the transmission of the drive to the treads 6. Suffice it to say here that by means of these devices any slack may be conveniently taken up in either tread or the tension of either tread adjusted.

For the purpose of driving the treads 6 to propel the entire machine to and fro over the ground and for steering the same as will be pointed out presently, and for swinging the rear conveyor vertically and laterally, the intermediate main and front conveyors laterally together, the front end of the front conveyor vertically, and the material member 13 selectively about its pivot or articulated mounting on the forward end of the front swingable arm, I provide a common source of power.

While the particular source of power may, of course, be varied, the source employed in the particular machine shown comprises a pair of electric motors 300, 300. The motors which I contemplate employing in the particular machine shown are of 50 horse power rating mill type.

These motors 300 are mounted upon the extensible frame 12, as shown in Fig. 40, one on each side of the machine, as shown in Figs. 6, 7 and 21. Drivingly connected through suitable reduction gearing, one with each motor at 310 and 312 (Figs. 7 and 21), and extending longitudinally one along each side of the machine, are a pair of shafts 314 and 315.

These shafts 314 and 315 form the main drive shafts for racking the extension frame 34 out and in, for selectively swinging the bucket, shovel, or material member 13 about its pivot 15, and for swinging the front conveyor arm 14 vertically. The main transverse or cross shaft for racking the extension frame 12 out and in is designated at 325 in Figs. 22 and 28. The cross shaft 325 is provided at each of its opposite ends with a brake 328, preferably of the multiple disc type, although this, of course, may be varied, and with a bevel gear 329. Each of the bevel gears 329 meshes with a pair of bevel gears 330 and 332, which gears 330 and 332 are selectively connected with the drive shafts 314 and 315 to turn therewith by means of clutches 334 and 335, which may be of the multiple disc type. The drives at each of the opposite ends of the cross shaft merely provide a powerful balanced drive. They are operated, varied, connected and disconnected together.

By operating the clutches 334 as will be pointed out presently, the gears 330 are drivingly connected with their respective drive shafts, and through the gears 329 turn the cross shaft 325 in one direction. By operating the clutches 334 to disconnect the gears 330, and operating the clutches 335 to connect the gears 332 with their respective drive shafts, the cross shaft is obviously driven in the opposite direction. When the gears 330 and 332 are unclutched or disconnected, there is no drive transmitted to the cross shaft 325, at all.

Keyed or otherwise suitably fixed upon the cross shaft 325 for rotation therewith are a pair of pinions 340, each of which meshes with a larger gear 342 (Fig. 28), the gears 342 being suitably keyed or fixed upon a cross shaft 343 suitably journalled in the extension frame 12. The gears 343 mesh with racks 345 on the non-extensible laterally swingable frame 34, so that when the cross shaft 325 is turned in one direction, the gears 342 turn therewith, and by their engagement with the racks 345 rack or move the extensible frame 12 forwardly or outwardly to extend the material member 13 further from the machine. When the cross shaft 325 is driven in the opposite direction the gears 342 are turned in the opposite direction and by their engagement with the racks 345 retract or move the extensible frame 12 back in longitudinally upon the main frame of the machine to retract the material member 13 from its extended position.

Forwardly or outwardly of the cross shaft 325 is a second cross shaft 350 which is similarly selectively connected with the main drive shafts 314 and 315 to turn in one direction or in the other direction selectively, as desired, through two pairs of clutches 352 and 353, and associated bevel gears 354 and 355 which mesh with bevel gears 356, one on each of the opposite ends of the shaft 350. Adjacent the bevel gears 356 the opposite ends of the cross shaft 350 are provided with brakes 358. These brakes may be of the multiple disc type or otherwise, as before. They are normally on and prevent turning of the shaft 350 and movement of the material member 13 by gravity, for example. They hold this shaft and the material member and other parts actuated thereby positively in any position in which they are released, that is, any position in which said parts are when the drive from the motor to the shaft 350 is disconnected. Therefore, the only way in which the material member, for example, may be moved is by power from the motors 300, and when this power is not connected with the shaft 350, said shaft is positively locked by the brakes 358 against turning. The brakes 358 are adapted, as will be hereinafter pointed out, to be released simultaneously with the clutching of either of the gears 354 or 355 to the drive shafts.

The brakes 328 on the cross shaft 325 similarly operate to lock said shaft against turning except by power from the motors. In this way if the machine is operating on a grade the extensible frame 12 can never move accidentally in or out when the shaft 325 is not in driving connection with the motors 300.

Fixed on the cross shaft 350 to turn therewith are a pair of pinions 365, each of which meshes with a somewhat larger gear 366 fixed upon short transverse shafts suitably journalled in bearings 368 on the extension frame 12, as shown in Fig. 22. Each of the gears 366 meshes with a rack 370 formed on the under surface of a push and pull arm 372.

The push and pull arms 372 are disposed longitudinally of the machine, one on each side of the frame 12, as shown in Figs. 37 and 39. Their operating movement is always either in tension when the operation is through a pulling of said arms, or in compression when the operation is through a pushing of said arms. The arms 372 are journalled at their rear ends through bearings 375 (Fig. 37) upon spindles 376, which spindles 376 bear at their opposite ends suitable rollers 378. The rollers 378 operate in and are guided by tracks 380 formed on the extensible frame 12.

Links 385 pivoted at 386 to the forward or outer ends of the push and pull arms 372, extend forwardly or outwardly and are pivoted at their opposite ends at 387 (Figs. 3, 4 and 20) to the shovel or material member 13 eccentrically of the pivotal mounting 15 thereof. The links 385 also always operate in tension or compression to swing the material member 13 selectively to or fro about its pivoted or articulated mounting 15. When the cross shaft 350 is turned in one direction, the arms 372 are pulled or drawn rearwardly to swing the material member in a counter clockwise direction about its pivot 15, and when the cross shaft 350 is turned in the opposite direction the arms 372 are forced or moved outwardly to push the material member 13 in a clockwise direction about its pivotal mounting 15. Through the clutches 352 and 353 the material member 13 may be swung through any desired distance in either direction about the pivot 15.

The material member 13 may thus be operated selectively about its pivot without any necessity of completing an orbital or cycle of movement each time. It may be swung through any desired range and back. The pulling up or pushing back of the material member 13 about its pivot may be both through the same distance, or either may be greater or less than the other, and the forward swinging end of the conveyor 10 is always in position to receive the material from the material member with selective movements of said member and without any necessity for swinging the conveyor 10 with the movement of the material member, in any of the various operating positions of the material member. The material member 13 is operable wholly selectively in all of its working positions and in all of the extended and retracted positions of the frame 34, also in all of the angular positions of the front arm 14 and, as already pointed out, it is operable independently of the front swinging arm and independently of the extensible frame, or with either of them, to take up the material and deliver it to the front conveyor. This conveyor is operable selectively in all positions of the machine to deliver the material to the main or intermediate conveyor from which it is delivered to the rear delivery conveyor and delivered to the desired point.

Forwardly of the cross shaft 350 is a third cross shaft 400, suitably journalled on the extensible frame 34, at 402 (Fig 23). The cross shaft 400, like the cross shafts 325 and 350, has fixed on its opposite ends bevel gears 403, each of which meshes continuously with a pair of bevel gears 404 and 405, the bevel gears 404 operating cumulatively on opposite ends of the shaft 400 to turn the same in one direction, and the bevel gears 405 similarly operating cumulatively on opposite ends of the shaft 400 to turn this shaft 400 in the opposite direction.

Each of the gears 404 has a clutch 408, and each of the gears 405 has a clutch 410. These clutches may be of any suitable type, for example, of the multiple disc type, as explained in connection with the other clutches 334, 332, 352 and 353, and they are operable to selectively connect the gears 404 or 405 to the drive shafts 314 and 315, respectively. By throwing in the clutches 408, as will be described presently, the gears 404 are connected to the shafts 314 and 315 and turn the cross shaft 400 in one direction, and by throwing in the clutches 410 the other gears 405 are connected with the shafts 314 and 315 to turn the cross shaft 400 in the opposite direction, it being understood that when the clutches 408 are in, for example, and it is desired to turn the cross shaft 400 in the opposite direction, throwing of the clutches 410 in, releases the clutches 408 from the shafts 314 and 315.

Fixed on the cross shaft 400, as shown in Fig. 23, are a pair of spur pinions 415 which mesh with somewhat larger spur gears 416 mounted on relatively short transverse spindles 417 (Fig. 29), which are suitably journaled at 418 (Fig. 23) on the extensible frame 12. The spur gears 416 mesh with racks 420 on the upper surfaces of push and pull or rack arms 422 (Figs. 29, 30, 37 and 38). At their rear ends the push and pull or rack arms 422 bear pins 425 (Fig. 37), which pins 425 bear rollers 426 which operate as guide rollers for the push and pull arms 422 in suitable tracks 428 on the extensible frame 12 (Fig. 37).

At their front or forward ends the arms 422 are pivotally connected at 430 (Fig. 30) with push and pull links 432, the opposite or front ends of which links 432 are in turn pivotally connected at 434 (Figs. 3 and 4) with the front vertically swingable conveyor frame or boom arm 14.

By turning the front cross shaft 400 in one direction the arms 432 will be retracted to swing the conveyor arm 14 downwardly or in a clockwise direction about its pivot 18, and by turning the cross shaft 400 in the opposite direction the conveyor arm or boom frame 14 will be swung vertically upwardly or in a counter clockwise direction. The vertical swinging of the arm 14 is wholly selective in all of the operating positions of the machine, and by swinging it vertically the shovel or other material member 13 may be positioned at any vertical height or vertical position. The vertical swinging movement of the conveyor arm 14 and the swingable part of the front conveyor 10 associated therewith is not progressive and there is no orbital or cycle of movement which must be completed each time. Furthermore, the delivery of the material from the shovel or material member 13 to the front conveyor 10 may always be independent of any vertical swinging movement of the arm or frame 14 in all of the extended and retracted positions of the extensible frame 12, and in all other operating positions of the machine. In this manner the material member may be operated up close to corners and abutments and up close to overhead roofs, for example, without the necessity of ever allowing clearance for an orbital or a complete or definite cycle of movement of the material member, swingable frame 14, or extensible frame 12.

Like the arms 372 and links 385, the arms 422 and links 432 operate always either in compression or tension and provide relatively great strength and positiveness of action. These arms are all relatively free of severe twisting forces and the pinions 365 and cooperating gears 366 and pinions 415 and cooperating gears 416 reduce the speeds and provide powerful force applications for imparting the various movements.

To prevent the frame or arms 14 from falling by gravity from any of the positions into which they are moved, and to lock this swingable frame positively in any of its angular positions, the cross shaft 400 is provided adjacent the gears 403 with suitable brakes 450 which may, for example, be of the multiple disc type. These brakes are shown in Fig. 23 and they are normally engaged to lock the shaft 400 against turning, and are operated simultaneously with the throwing in of either of the two pairs of clutches 408 or 410 to fix their respective gears 404 or 405 to the shafts 314 and 315 for rotation therewith. In other words, these brakes operate to hold the shaft 400 and thereby the arms 14 and associated parts against movement whenever there is no power transmission to the shaft 400, and are released simultaneously with the making of a power connection to that shaft whenever such a connection is made for turning the shaft in either direction.

The main longitudinal drive shafts 314 and 315 on the extensible frame 12 have pinions or gears 502 fixed thereon adjacent the driving motors 300, and these pinions or gears 502 mesh with intermediate gears 503 which in turn mesh with gears 504 fixed on spline shafts 505, all as shown in Figs. 21, 36, 40 and 26. The gear 504 is shown in Fig. 27. There is preferably a similar gear and driving connection such as will now be described on each side of the machine, but it is believed that a description of one will suffice for both. The gears 504 are suitably journalled in bearings 508 on the extensible frame 12 and the driving engagement of the spline shafts 505 therewith is preferably a sliding driving engagement, so that the gears 504 may move with the extension and retraction of the frame 12 and, at the same time, maintain driving connection with the spline shafts 505, which in the embodiment of the invention shown remain substantially fixed in longitudinal or axial directions.

As shown in Fig. 27, the spline shafts 505 are drivingly connected through clutches 525, which clutches 525 when engaged or thrown in drive spline sleeves 526 having sliding driving engagement with spline sleeves 527. The sleeves 527 bear or have fixed thereon suitable bevel gears 528, which bevel gears 528 mesh with bevel gears 530 on the cross shaft 175 (Fig. 17). The cross shaft 175 forms the driving shaft for the front conveyor 10, as already pointed out, and the spline connection between the driving sleeves 526 and 527 provides a slip driving connection, so that the cross shaft 175 may be adjusted longitudinally of the machine by the take-up means shown diagrammatically at 190 without interfering with the driving connection from the spline shafts 505 to the front conveyor drive cross shaft 175. The clutch 525 may be thrown in or engaged manually, mechanically, electrically, or otherwise, and disengaged as desired, to selectively set up and terminate the drive to the front conveyor. The sleeve 526 may be journalled in bearings 532 (Fig. 27), and the interengaging sleeve 527 may be journaled in bearings 534.

The spline shafts 505 have slidable driving engagement at 540 (Figs. 26 and 27) with spline sleeves 542. This sliding driving engagement between the spline shafts 505 and spline sleeves 542 permits the outward and inward racking or extension and retraction of the frame 12 without interfering with the driving connection taken from the spline shafts 505.

At their rear ends the spline sleeves 542 bear loosely at 545 in the clutch rings 562. The clutch rings 562 are splined onto the sleeve 542 to turn therewith and have driving engagement (Fig. 26) with the opposite ends of a driving sleeve 560. Splined upon the sleeve 560 is the spur gear 568, and this gear meshes with and drives a pinion 950 which pinion is fixed or splined on and drives a countershaft 952. On the opposite end of the countershaft 952 and driven thereby is a pinion 953 which meshes with a gear 954 which is keyed upon and drives the shaft 546. The shaft 546 has a bevel gear 547 meshing with a bevel gear 548 on the cross shaft 150.

The cross shaft 150 is disposed at the rear end of the main intermediate conveyor 7 and forms the drive shaft therefor. The shaft 546 and gear 547 are connected and disconnected by a clutch 550 which permits connecting and disconnecting the drive to the main intermediate conveyor apron.

The manner of taking the driving connection from the spline sleeves 542, as above described, provides a floating driving connection between the sleeve 542 and the sleeve 560. This floating action at this point is exceedingly important in that the sleeve or shell 560 may thereby be relatively fixed or properly transmitting the drive to the base casting and the sleeve 542 may have a floating driving action in it. This permits any side, up and down lash or other play in the front extensible conveyor and permits the shaft 505 to float or weave with any such lash or relative movement, at the same time maintaining a proper driving connection to the base casting and caterpillar drives without imposing any objectionable stresses in the shafts or other drive parts.

The foregoing driving connection may be advantageously employed and has utility in other connections, particularly where it is desired that one drive or a source of power, for example, be rigidly supported or have a relatively fixed position and that another part or mechanism driven therefrom have a certain movement relative thereto. Another example of this would be in a railway locomotive or the like, where it is usually desirable that the power plant have a relatively fixed position and that some compensation be provided in the drive to the wheel trucks.

The spline tube or sleeve 560 may be journalled in bearings 565 and this sleeve drives a spur gear 568 thereon. The spur gear 568 meshes with the spur gear portion 569 of a gear 570 mounted on a shaft 572 suitably journalled in bearings 573. The gear 570 has a bevel gear portion 575 which meshes with and drives a bevel gear 576 keyed or fixed on a cross shaft 578 to turn said cross shaft 578 therewith.

As shown in Fig. 40, the cross shaft 578 is a relatively short shaft and at its opposite end it carries a bevel gear 580, which bevel gear 580 meshes with a bevel gear 582, as shown in Fig. 17, and as shown in Figs. 17 and 18, drives the universal driving connection through which the drive is imparted to the main cross shaft 585 in the base casting 30. The universal driving connection to the shaft 585 comprises, as shown in Figs. 17 and 18, an intermediate link 586 having universal connection at its opposite ends at 587 and 588, respectively, with the take-off gear 582 from the shaft 578 and with the pinion 590, which bevel gear or pinion 590 meshes with the bevel gears 592 and 593, as shown in Fig. 14, for transmitting the drive to the opposite longitudinal tread driving shaft 600 and 602, as shown in Figs. 13, 14 and 15. The main cross shaft 585 in the base casting may be sectionalized so that its opposite ends will be turned in opposite directions for transmitting the drive to the opposite treads in the proper directions through the gearing lay out, as shown.

One end of the cross shaft 585, referring now to Figs. 13, 14 and 15, bears a bevel pinion or gear 603 which meshes with a pair of bevel gears 604 and 605 on the shaft 600. The bevel gears 604 and 605 are provided with suitable clutches 606 and 607, respectively, for selectively connecting these gears to the shaft 600 to turn the shaft 600 selectively in one direction or the other. Turning of the shaft 600 in one direction drives the tread on that side in the direction to propel the machine forwardly, and turning in the opposite direction drives the same tread in the direction to propel the machine rearwardly. The shafts may be provided with brake means, as desired.

The opposite end of the cross shaft 585 bears a bevel gear 610 which similarly meshes with a pair of bevel gears 612 and 613 provided with clutches 614 and 615 for selectively driving the shaft 602 in either direction. The rear ends of the shafts 602 have bevel gears 618 which mesh with bevel gears 620 fixed on relatively short transverse shafts 621. Suitably fixed on the shafts 621 are spur pinions 622 which mesh with spur pinions 623 fixed on the driving spindles 212 for the rear driving sprockets 210 of the treads 6, as shown in Figs. 13, 50 and 51. As shown in Fig. 51, the shafts 621 may be journalled in bearings 630 and the rear ends of the shafts 600 and 602 may be journalled in bearings 632.

The forward ends of the shafts 600 and 602 carry bevel pinions 640 which mesh with bevel gears 642. The bevel gears 642 drive spur gears 643 as through the shafts upon which both are mounted and the spur gears 643 mesh with spur gears 644 fixed on and driving the driving sprocket spindles at the front of the treads 6. One of the driving sprocket spindles for the front ends of the treads 6 is shown at 648 in Fig. 30, and these spindles and the entire gear connection between them and the shafts 600 and 602 are, as shown in Fig. 15, mounted in sliding boxes 650, which boxes 650 are mounted for sliding movement in chambers 652 and are adapted to be moved longitudinally therein by the tread take-up devices 654 which are adapted for tightening or loosening the treads. Slip connections 655 may be provided between the front ends of the shafts 600 and 602 and the gearing to the tread sprockets to permit the take-up adjusting movement.

From the foregoing it will now be apparent that the two treads 6 may be driven in the same direction to propel the machine forwardly or in the opposite direction to propel the machine rearwardly, and that either tread may be driven relative the other to turn the machine. The driving connections provided to the treads permit turning the machine on the very spot in which it is standing and maneuvering of the entire machine to otherwise inaccessible places and always without any unnecessary movement is thereby provided for.

For swinging the swingable main frame 34 laterally and the extension frame, and intermediate and front conveyors and material member 13 laterally with it, I take-off at 680 (Fig. 14) through meshing bevel gears from the cross shaft 585 to a jack shaft 682, and from the jack shaft 682 to co-operating bevel gears 684 to a relatively short cross shaft 683. The shaft 683 has a bevel pinion 685 which meshes with a pair of reversing bevel gears 686 and 687 having clutches 688 and 690, respectively, for connecting the gears 686 or 687, selectively to the forwardly extending longitudinal shaft 692. As shown in Fig. 15, the front or forward end of the shaft 692 has a spur gear or pinion 693 which meshes with an arcuate rack 694, shown in Figs. 8 and 30, on the under surface of the laterally swingable main frame 34. By turning the shaft 692 in one direction the gear 693 by its meshing engagement with the arcuate rack 694 swings the frame 34 laterally in one direction, and by turning the shaft 692 in the opposite direction the frame 34 is swung laterally in the opposite direction. This lateral swinging movement is about the king pin 24 at the rear, as already pointed out, and the front and intermediate conveyors swing laterally together with the frame 34 and extensible frame 12 which carries the material member 13 with it laterally. In this manner the material member may be moved laterally into any desired position. The clutches 688 and 690 provide for swinging these parts laterally selectively in either direction, as desired, and as much as desired in either direction.

Adjacent the clutches 688 and 690, as shown in Fig. 14, the shaft 692 is provided with a brake 698, which may be of the multiple disc, or any other suitable type. This brake 698 is normally active to prevent lateral swinging of the frame 34, for example, where the machine is working on a lateral grade, as on the side of a hill. This brake 698 locks the shaft 692 against turning, and the frame 34 against lateral movement at all times during which power is not being transmitted for turning said frame, and upon throwing in or connecting either of the clutches 688 or 690 to transmit power to the shaft 692 and the brake 698 is released simultaneously therewith.

The two brakes for each of the shafts 600 and 602 are shown at 700 and 702 in Fig. 24.

For swinging the rear conveyor frame I take off at 710 (Fig. 14), through co-operating bevel gears to a shaft 712. The rear end of the shaft 712 has fixed thereon a bevel gear 713 which meshes with a bevel gear 714 on a relatively short transverse shaft 715. The shaft 715 has fixed thereon to turn therewith, as shown in Fig. 13, a second bevel gear 716 which meshes with a pair of reversing bevel gears 718 and 720. The gears 718 and 720 are provided with clutches 722 and 724, respectively, for fixing them selectively on the sleeve 725 (Fig. 17). By means of the clutches 722 and 724 the sleeve may be turned in either direction through any desired range. As shown in Fig. 17, fixed upon the sleeve 725 to turn therewith is a gear 726 which meshes with a rack 728 on the under surface of the front end of the rear swingably mounted part 40 of the rear conveyor frame to swing that part and the arm 23, that is, the entire rear conveyor frame and conveyor associated therewith, laterally in either direction about the king pin 24 to deliver the material from the machine to any desired lateral point.

The sleeve 725 is provided with a brake 730 for locking the rear conveyor frame against accidental lateral swinging, as for example, on the side of a hill or on a lateral grade.

As shown in Figs. 14, the shaft 712 is provided intermediate its ends with a spur gear 735 which meshes with a spur gear 736 and drives the shaft 738 therethrough. As shown in Fig. 17, the shaft 738 extends through the driving sleeve 725 for swinging the rear conveyor laterally and at its rear end has a bevel pinion 740 fixed thereon to turn with the shaft 738. The gear 740 meshes with the bottom teeth of a ring gear 742 rotatably mounted upon the king post 24. Meshing with the upper teeth of the ring gear 742 is a bevel pinion 743 fixed on the front end of an upwardly inclined shaft 745, as shown in Figs. 16 and 17. The rear end of the shaft 745 has a bevel gear 746, as shown in Fig. 16, which meshes, as clearly shown in Fig. 35, with a pair of reversing bevel gears 748 and 750 on the cross shaft 90 (Fig. 35) for raising and lowering the rear conveyor vertically. The gears 748 and 750 are provided with clutches 752 and 754 for connecting either selectively with the shaft 90 to turn the same selectively in one direction to raise the rear conveyor, and selectively in the other direction to lower the same. Brakes 760 are provided on the shaft 90 for holding it and the rear conveyor in any desired angular position, these brakes being released with the setting up of a power connection for swinging the rear conveyor either upwardly or downwardly.

The rear conveyor frame has rollers 765 (Figs. 2 and 34), which operate on the tracks 36 in the lateral swinging movement thereof.

For driving the rear conveyor 21 there is a cross shaft 770 having a bevel gear or pinion 772 (Fig. 34), which meshes with a co-operating bevel gear 773 on the rear conveyor drive shaft 77, which shaft has at its opposite end a bevel pinion 774 meshing with a bevel gear 775 on the rear conveyor sprocket shaft 75. The shaft 77 is provided, as shown in Fig. 34, with a clutch 780 for establishing and disconnecting the drive to the rear conveyor. The shaft 77 and associated gearing is in the machine shown disposed along the outer side thereof and may be enclosed in a suitable housing 782.

It is to be understood that steam or any other suitable or preferred source of power may be employed instead of the electric motors 300 for operating the various parts of the machine and for imparting the various operating movements.

Also, whereas the machine of my present invention is not limited to being electrically controlled, it may be electrically controlled, and I shall now describe in connection with the circuit diagrams of Figs. 54 and 55 the circuit connections and instrumentalities for controlling the same electrically, as I have provided for doing.

As shown in Fig. 54, the incoming line wires 800 lead from a suitable source and are connected in thru a main switch 802 for throwing in and out the entire operating and control systems.

In the particular system shown, three operators may be employed upon the machine, one in position A of Fig. 54, and the others in positions B and C of Fig. 55. Each electric motor 300 is provided with an automatic starter 805, each preferably of the push button type, as well known in the art.

Adjacent the operator's position A are a pair of switches 806 and 808. Each of the switch arms 806 and 808 has an intermediate "off" position, as shown, and each is movable selectively into co-operation with one of two contacts. Engagement of the switch arm 806 with one of its contacts closes the circuit of one of the solenoids 810, which throws in or engages one of the clutches 752, 754, for raising or lowering the rear conveyor frame. Engagement of the switch arm 806 with its other contact energizes the other solenoid 810 for moving the rear conveyor frame vertically in the opposite direction. Assume that one solenoid 810 throws in the clutch 752 for raising the rear conveyor frame, the other solenoid 810 throws in the clutch 752 for lowering the same, and the operation is wholly selective at all times. The brakes 760 of which there are two, for the particular shaft, with which they are associated, are released together with the associated brake 760, of which there are two, one for each throwing in of either clutch 752, 754 and act cumulatively when the clutches are released.

The other switch arm 808 similarly has an intermediate "off" position and two contacts with which it is engageable, which contacts similarly control a pair of solenoids 815, one for each of the clutches 722 and 724 for swinging the rear conveyor frame laterally. As before, one solenoid 815 throws in or engages one clutch 722, 724 for swinging the rear conveyor frame laterally in one direction and the other solenoid 815 controls the other clutch for swinging this rear conveyor frame in the opposite direction. The single brake 730 is normally engaged, as already pointed out, and is automatically released with the throwing in of either clutch by the toggle mechanism 816 between the solenoids and the clutches and brakes.

Thus the operator from his position at the station A raises and lowers the rear conveyor frame vertically and swings the same laterally.

Each of the stations A, B and C is provided with a suitable switch 820, shown as of the push button type, and each of these switches 820 is adapted for opening both motor circuits, as shown, so that both of the motor circuits may be opened by either of the three operators.

Adjacent the operator's station B are three switches 830, 832 and 834. One of these switches controls the two pairs of solenoids 835 which are operable to selectively throw in or engage the clutches 408 and 410 in pairs for raising and lowering the front swingable arm 14. As before, the brakes 450 are normally engaged and are adapted to be released simultaneously with the throwing in of either pair of clutches by the toggle means 838 provided between the solenoids and the clutches and brakes. Another one of the switches at the operator's position B controls two pairs of solenoids 840 for selectively throwing in the clutches 352 and 353 for swinging the shovel or material member 13 vertically upwardly or vertically downwardly about its pivot. The toggle mechanisms between the solenoids 840 and the clutches 352 and 353 and brakes 358 are designated at 842.

The other switch at the operator's position B controls a pair of solenoids 850 for selectively throwing in or engaging the clutches 334 or 335 for racking or moving the extensible frame 12 inwardly or outwardly to extend or retract the same. The toggle mechanisms between the solenoids 850 and the clutches 334 and 335 and brakes 328 are designated at 852.

Like the operator's position B, the operator's station C is provided with three switches 860, 862 and 864. One of these three switches 860, 862, 864, controls a pair of solenoids 865 for selectively throwing in or engaging the clutches 688, 690 for swinging the intermediate and front conveyor frames laterally, selectively as desired. The toggle mechanism between the solenoids 865 and the clutches 688 and 690 and the brakes 698 is designated at 868.

Another one of the switches at the station C controls a pair of solenoids 870 for selectively engaging the clutches 614, 615, which operate to drive one of the treads 6 forwardly or reverse, selectively, as desired. The toggle mechanism between the solenoids 870 and the clutches 614 and 615 and brakes 700 and 702 is designated at 872.

The other switch at the operator's station C controls a pair of solenoids 875 for selectively engaging the clutches 606, 607, for driving the other tread 6 forwardly or reverse, selectively, as desired. The toggle mechanism between the solenoids 875 and the clutches 606 and 607 and brakes 700 and 702 is designated at 878.

From the foregoing it will now be apparent that the operator from his position at the station A operates the controls for raising and lowering and swinging the rear conveyor laterally. The operator B operates the swingable front conveyor arm 14, the extension and retraction of the frame 12, and the selective swinging movement of the shovel, bucket, or material member 13. The operator C operates the two caterpillars 6, 6 selectively, and controls the lateral swinging of the front end of the machine. With the arrangement shown, the caterpillars may be driven forwardly or rearwardly together, either one may be driven independently of the other, or either one may be driven forwardly with an accompanying reverse movement of the other. Forward movement of one tread 6 with an accompanying reverse movement of the other tread 6, provides for turning the machine sharply and it may in fact, be turned around on the very spot on which it is standing. This is important in maneuvering the machine in restricted places and without lost motion.

The springs 890, one of which is shown associated with each pair of solenoids and clutches, may be adapted for throwing the clutches out and the associated brake or brakes in or on to maintain the brakes normally engaged and the clutches normally disengaged. In such case the operation of the solenoids opposes these springs 890 to throw the clutches in and the brakes out, or to disengage the brakes.

All movements of the various parts may be controlled and limited by suitable automatic limit switches for assuring safety and preventing excessive movements in the parts.

While I have described my invention with reference to the details of a particular embodiment, I do not intend to be limited to the details shown or described, except where I have clearly indicated that they are essential, as it is apparent that my invention may appear in a variety of forms and modifications.

The control and power may, as already pointed out, be other than electric, and the employment of a cutter and various other material members in place of the shovel or bucket 13 is contemplated. The conveyor arrangement and number of conveyors employed is advantageous in the particular machine shown, but this may, of course, be varied within the scope of my invention. For example, the selective operation of the material member 13 at the front end, whether it is bucket, shovel, cutter, or other member, is important, and the particular conveyor arrangement employed therewith and the operation and control of the same may be varied.

I claim:—

1. In a machine of the class described, the combination of a main frame, a laterally swingable frame thereon, an extensible frame on said laterally swingable frame, a swingable arm at the outer end of said extensible frame, and a material member pivoted for swinging movement at the outer end of said arm.

2. In a machine of the class described, the combination of a main frame, a laterally swingable frame thereon, an extensible frame on said laterally swingable frame, a swingable arm at the outer end of said extensible frame, a material member pivoted for swinging movement at the outer end of said arm, a first conveyor on the extensible frame and extending out and supported at its outer end by said arm for receiving material from said material member, and a second conveyor on the main frame for receiving the material from said first conveyor and delivering same therefrom.

3. In a machine of the class described, the combination of a main frame, a laterally swingable frame thereon, an extensible frame on said laterally swingable frame, a swingable arm at the outer end of said extensible frame, a material member pivoted for swinging movement at the outer end of said arm, a first conveyor on the extensible frame and extending out and supported at its outer end by said arm for receiving material from said material member, a second conveyor on the main frame for receiving the material from said first conveyor and delivering same therefrom, and a discharge conveyor having a rear vertically swingable portion and mounted for lateral swinging movement.

4. In a machine of the class described, the combination of a main frame, a laterally swingable frame thereon, an extensible frame on said laterally swingable frame, a swinging arm at the forward end of said extensible frame, a material member pivoted for swinging movement at the outer end of said arm, a source of power, disconnectible operating connections between said source of power and the movable parts of the machine, and brake means associated with each said operating connections and normally operable to hold said parts against movement.

5. In a machine of the class described, the combination of a main frame, a laterally swingable frame thereon, an extensible frame on said laterally swingable frame, a swinging arm at the forward end of said extensible frame, a material member pivoted for swinging movement at the outer end of said arm, a source of power, disconnectible operating connections between said source of power and the movable parts of the machine, brake means associated with each said operating connections and normally operable to hold said parts against movement, the brake means for the respective parts being released with the connecting of the associated operating connections therefor.

6. In a machine of the class described, the combination of a main frame, a laterally swingable frame thereon, an extensible frame on said laterally swingable frame, a swinging arm at the forward end of said extensible frame, a material member pivoted for swinging movement at the outer end of said arm, a source of power, disconnectible operating connections between said source of power and the movable parts of the machine, brake means associated with each said operating connections and normally operable to hold said parts against movement, a discharge conveyor, means for swinging said conveyor vertically and laterally, and means normally operative to hold said discharge conveyor against vertical and lateral swinging movement and released upon operation of said last means.

7. In combination, a first conveyor, a second conveyor overlapping and delivering thereto, means for extending and retracting said second conveyor, a shovel articulated for selective swinging movement at the outer end of said second conveyor, means for swinging the shovel end of said second conveyor vertically, and means for swinging said first and second conveyors laterally together.

8. In combination, a first conveyor, a second conveyor overlapping and delivering thereto, means for extending and retracting said second conveyor, a shovel articulated for selective swinging movement at the outer end of said second conveyor, means for swinging the shovel end of said second conveyor vertically, means for swinging said first and second conveyors laterally together, and a discharge conveyor receiving material from said first conveyor, and swingable vertically and laterally to discharge the material to any desired point.

9. In combination, a main frame, an extensible frame thereon, a conveyor on the main frame, a source of power on the extensible frame, and an extensible driving connection between the source of power on the extensible frame and the conveyor on the main frame.

10. In combination, a main frame, an extensible frame thereon, a rear discharge frame, a discharge conveyor on said last frame, a source of power on the extensible frame, and an extensible driving connection between the source of power on the extensible frame and the conveyor on the discharge frame.

11. In combination, a main frame, a first laterally swingable frame, a second laterally swingable frame, a common king pin for both said frames, a ring gear on said king pin, a driving gear meshing with said ring gear, a driven gear meshing with said ring gear for transmitting the power imparted thereto to said second laterally swingable frame, a take-off from the power transmission to said driving gear for swinging said last frame laterally, and means operatively connected with the driven gear for swinging said frame vertically.

12. In combination, a main frame, a first laterally swingable frame, a second laterally swingable frame, a common king pin for both said frames, a ring gear on said king pin, a driving gear meshing with said ring gear, a driven gear meshing with said ring gear for transmitting the power imparted thereto to said second laterally swingable frame, a take-off from the power transmission to said driving gear for swinging said last frame laterally, means operatively connected with the driven gear for swinging said frame vertically, clutch means for selectively connecting and disconnecting said operating connections, and brake means associated with the connections for swinging the frame vertically.

13. In combination, a main frame, an extensible frame thereon, a source of power on the extensible frame, a rear vertically and laterally swingable conveyor, and an extensible and flexible driving connection between the source of power on the extensible frame and said rear laterally and vertically swingable conveyor.

In witness whereof, I hereunto subscribe my name this 23 day of April, 1926.

JOHN H. BLAIR.